(12) United States Patent
Maghoul et al.

(10) Patent No.: US 11,692,972 B2
(45) Date of Patent: Jul. 4, 2023

(54) SYSTEMS AND METHODS FOR ULTRASONIC CHARACTERIZATION OF PERMAFROST, FROZEN SOIL AND SATURATED SOIL SAMPLES

(71) Applicant: University of Manitoba, Winnipeg (CA)

(72) Inventors: Pooneh Maghoul, Winnipeg (CA); Hongwei Liu, Winnipeg (CA); Ahmed Shalaby, Winnipeg (CA)

(73) Assignee: University of Manitoba, Winnipeg (CA)

( * ) Notice: Subject to any disclaimer, the term of this patent is extended or adjusted under 35 U.S.C. 154(b) by 19 days.

(21) Appl. No.: 17/371,472

(22) Filed: Jul. 9, 2021

(65) Prior Publication Data

US 2022/0299476 A1    Sep. 22, 2022

Related U.S. Application Data

(60) Provisional application No. 63/051,067, filed on Jul. 13, 2020.

(30) Foreign Application Priority Data

Jun. 17, 2021 (WO) ................ PCT/CA2021/050826

(51) Int. Cl.
*G01N 29/04* (2006.01)
*G01N 29/07* (2006.01)

(52) U.S. Cl.
CPC ........... *G01N 29/043* (2013.01); *G01N 29/07* (2013.01); *G01N 2291/0251* (2013.01)

(58) Field of Classification Search
CPC ........ G01N 29/44; G01N 29/04; G01N 29/30; G01N 29/52; G01N 29/28; G01N 29/42; G01N 29/07
See application file for complete search history.

(56) References Cited

U.S. PATENT DOCUMENTS

| 5,226,310 A * | 7/1993 | Steiger ..................... G01N 3/10 73/794 |
| 7,569,810 B1 * | 8/2009 | Troxler .................. G01N 33/24 250/269.1 |

(Continued)

FOREIGN PATENT DOCUMENTS

CN        108645676       * 10/2018

*Primary Examiner* — Helen C Kwok
(74) *Attorney, Agent, or Firm* — Kyle R Satterthwaite; Ryan W Dupuis; Ade & Company Inc.

(57) ABSTRACT

An ultrasonic sensing technique and a signal interpretation method based on a spectral element multiphase poromechanical approach overcomes critical gaps in permafrost, frozen soil, and saturated soil characterization. Ultrasonic sensing produces high-quality response signals that are sensitive to the soil properties. A transfer function denoting a ratio of induced displacement and applied force in the frequency domain, is independent of the distribution of the stress force applied by the transducer to the sample, and allows interpretation of the measured electrical signal using a theoretical transfer function relation to efficiently determine the most probable properties from response signals using an inverse spectral element multiphase poromechanical approach. This ultrasonic sensing technique enables rapid characterization of soil samples in terms of both physical and mechanical properties. The Quantitative Ultrasound (QUS) system can be used in a laboratory setup or brought on site for in-situ investigation of permafrost, frozen, and saturated soil samples.

18 Claims, 29 Drawing Sheets

(56) References Cited

U.S. PATENT DOCUMENTS

| | | | |
|---|---|---|---|
| 2009/0089025 A1* | 4/2009 | Doyle | G09B 23/28 |
| | | | 703/5 |
| 2009/0133476 A1* | 5/2009 | Michaels | G01N 15/0893 |
| | | | 73/38 |
| 2016/0302351 A1* | 10/2016 | Schildroth | A01B 79/005 |
| 2022/0151170 A1* | 5/2022 | Snow | G01N 29/07 |

* cited by examiner

FIG. 10E: 5500-6000 iteration

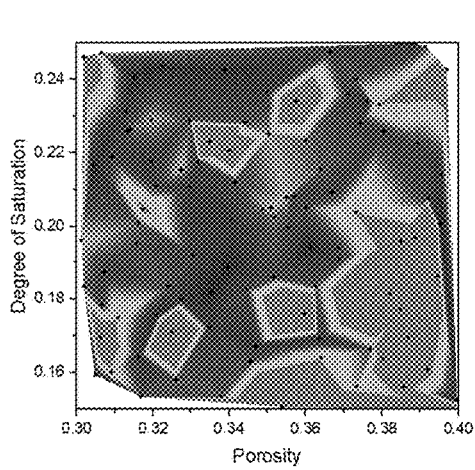
FIG. 10A: first 100 iteration
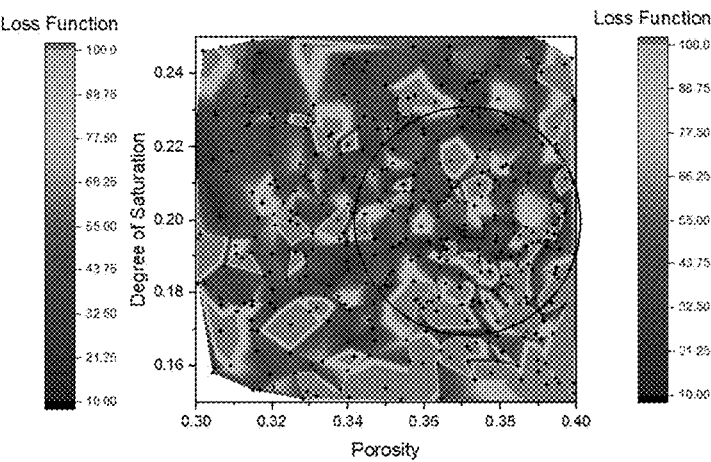
FIG. 10B: first 500 iteration
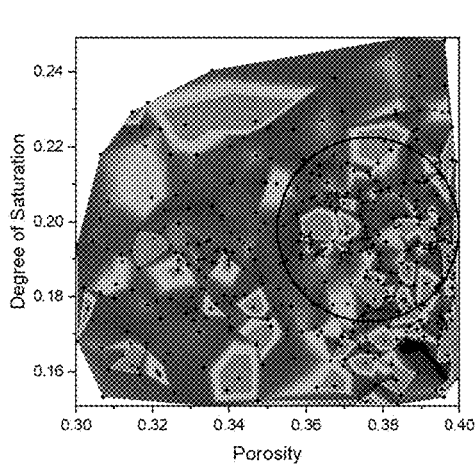
FIG. 10C: 500-1000 iteration
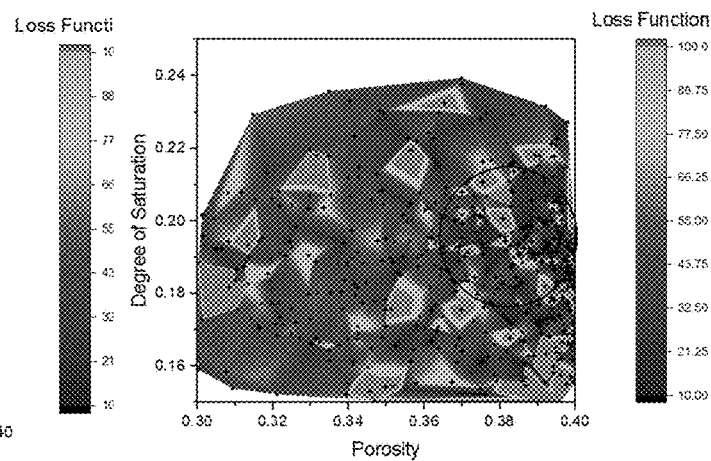
FIG. 10D: 1000-1500 iteration
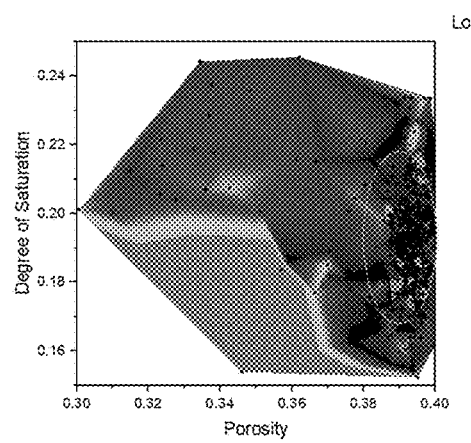
FIG. 10E: 5500-6000 iteration

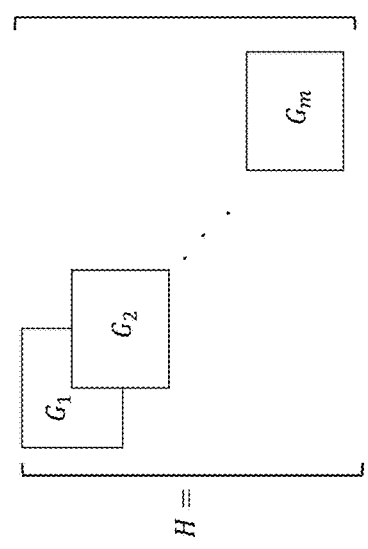
FIG. 11
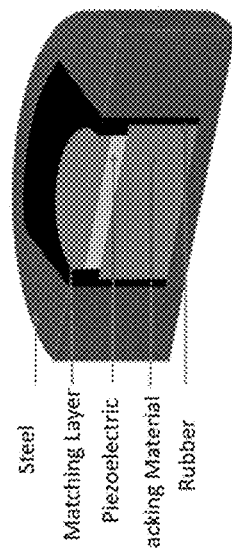
FIG. 12A
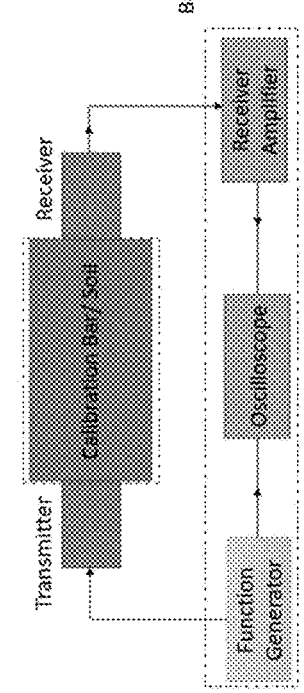
FIG. 12B
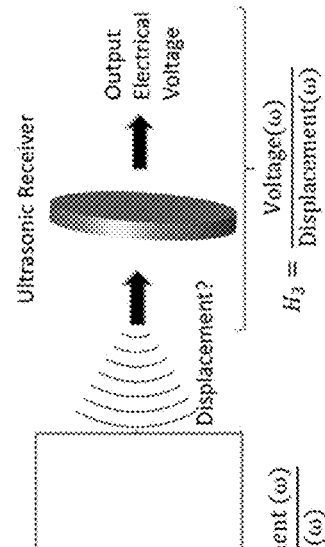
FIG. 12C
FIG. 12D
FIG. 12E

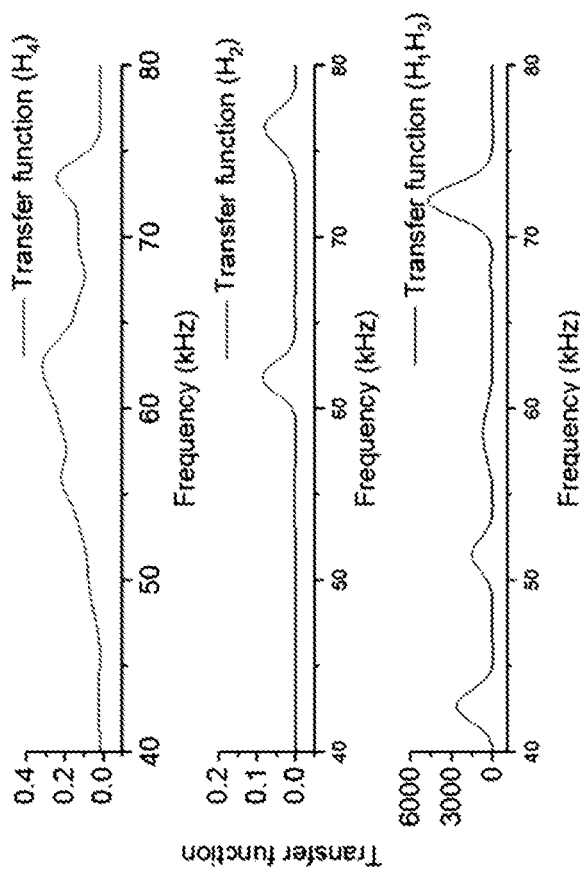
FIG. 13C
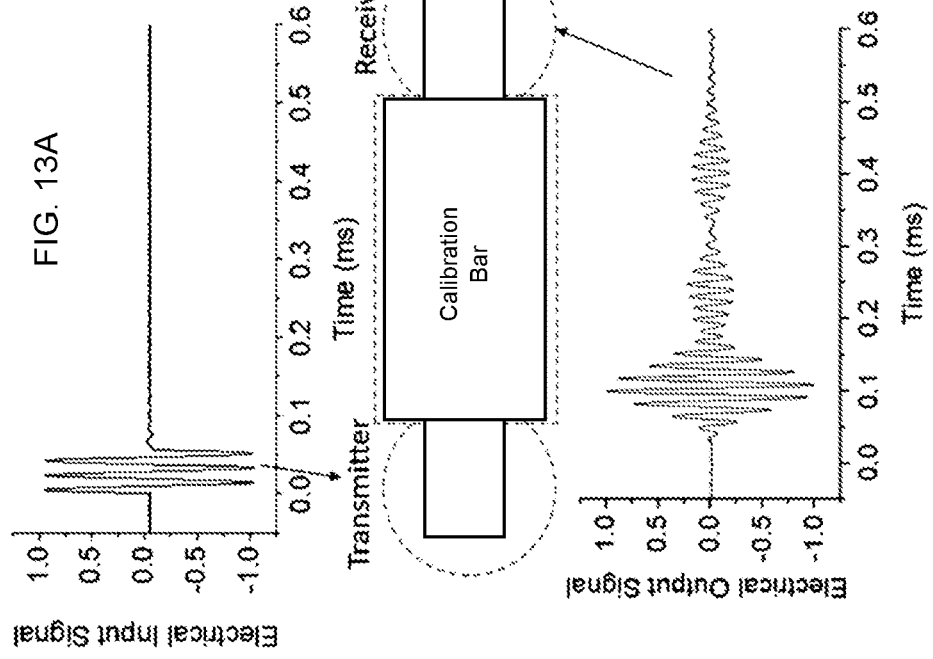
FIG. 13A
FIG. 13B

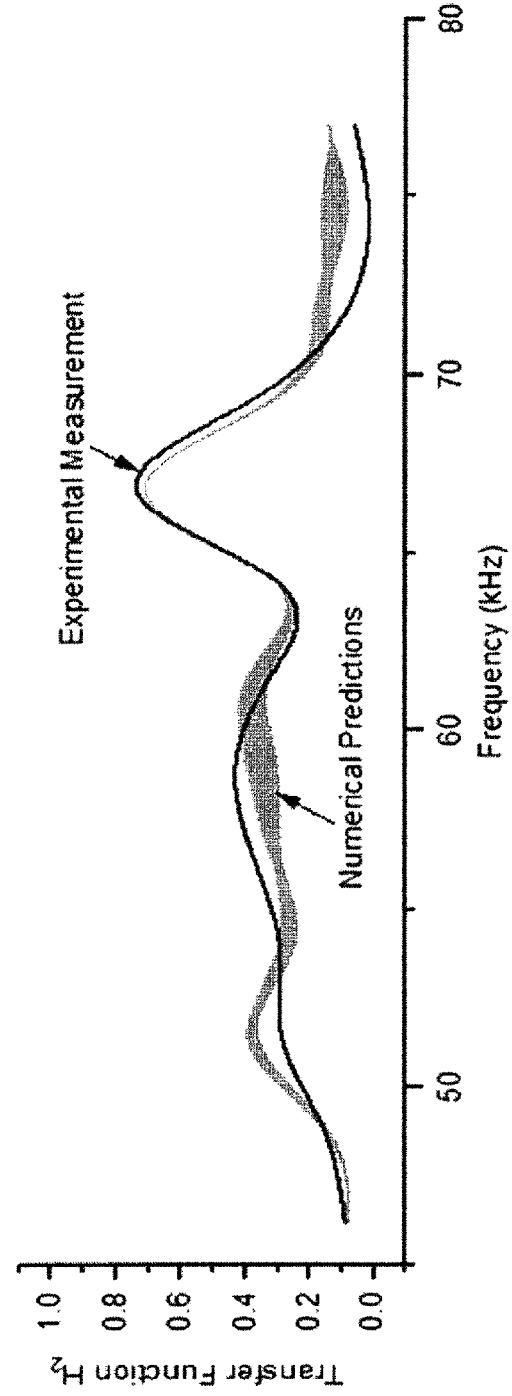
FIG. 15A
FIG. 15B
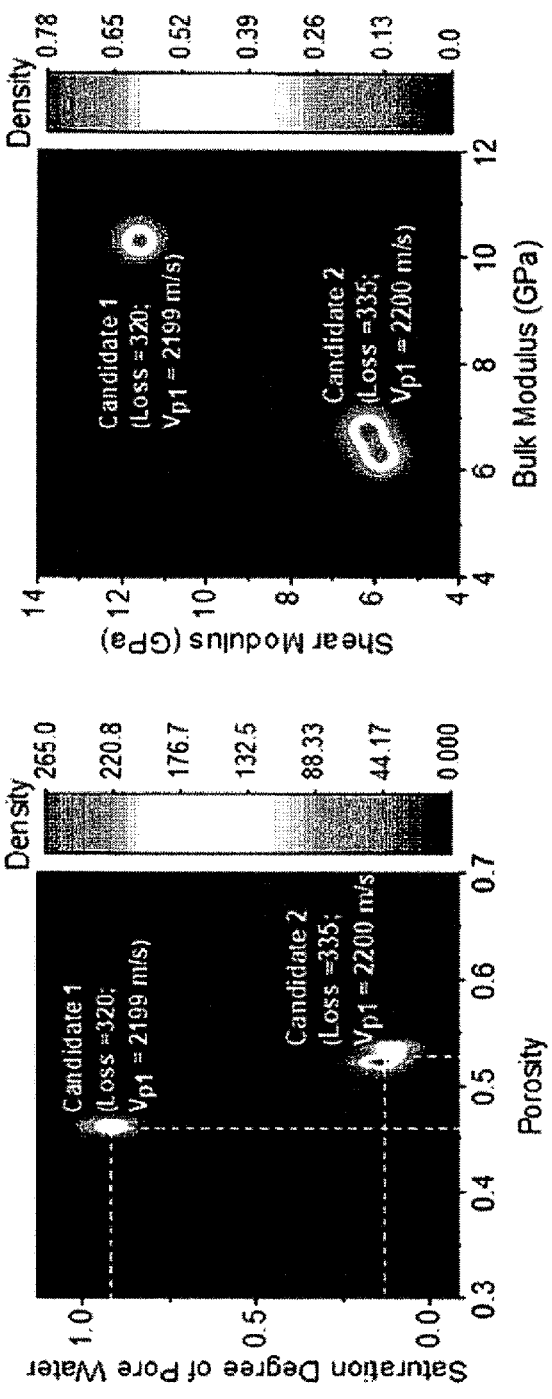
FIG. 15C

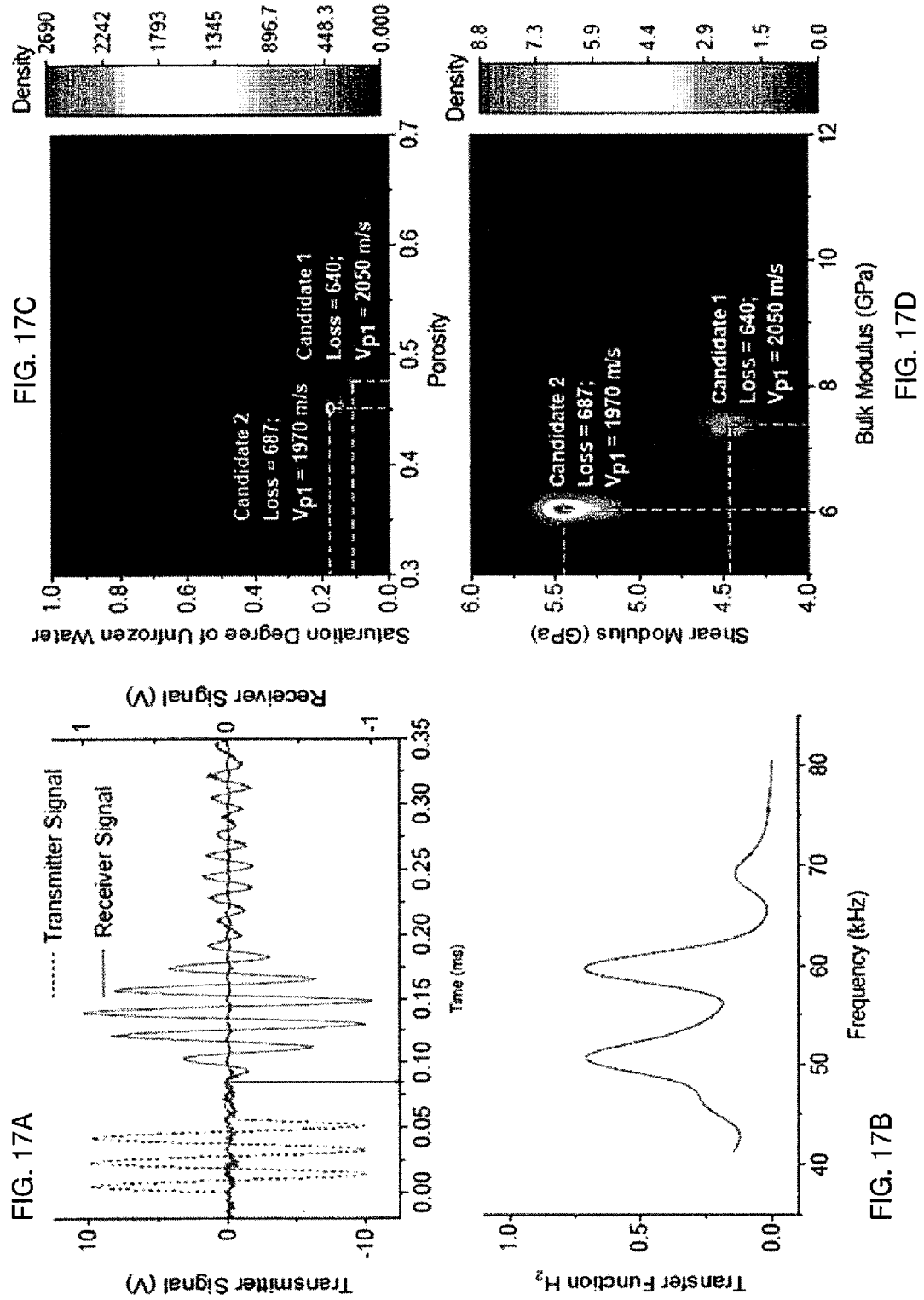

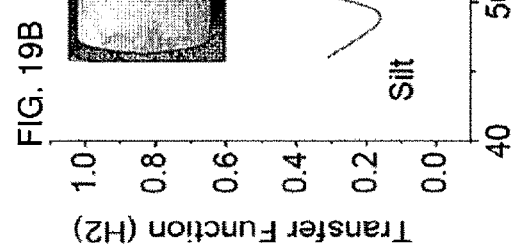
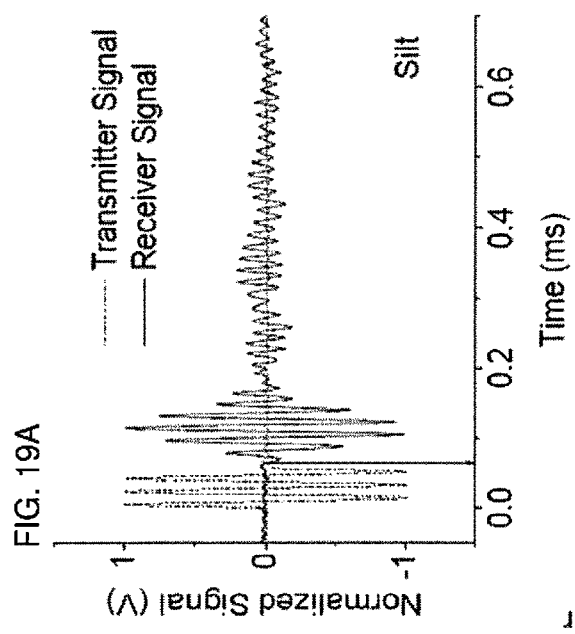
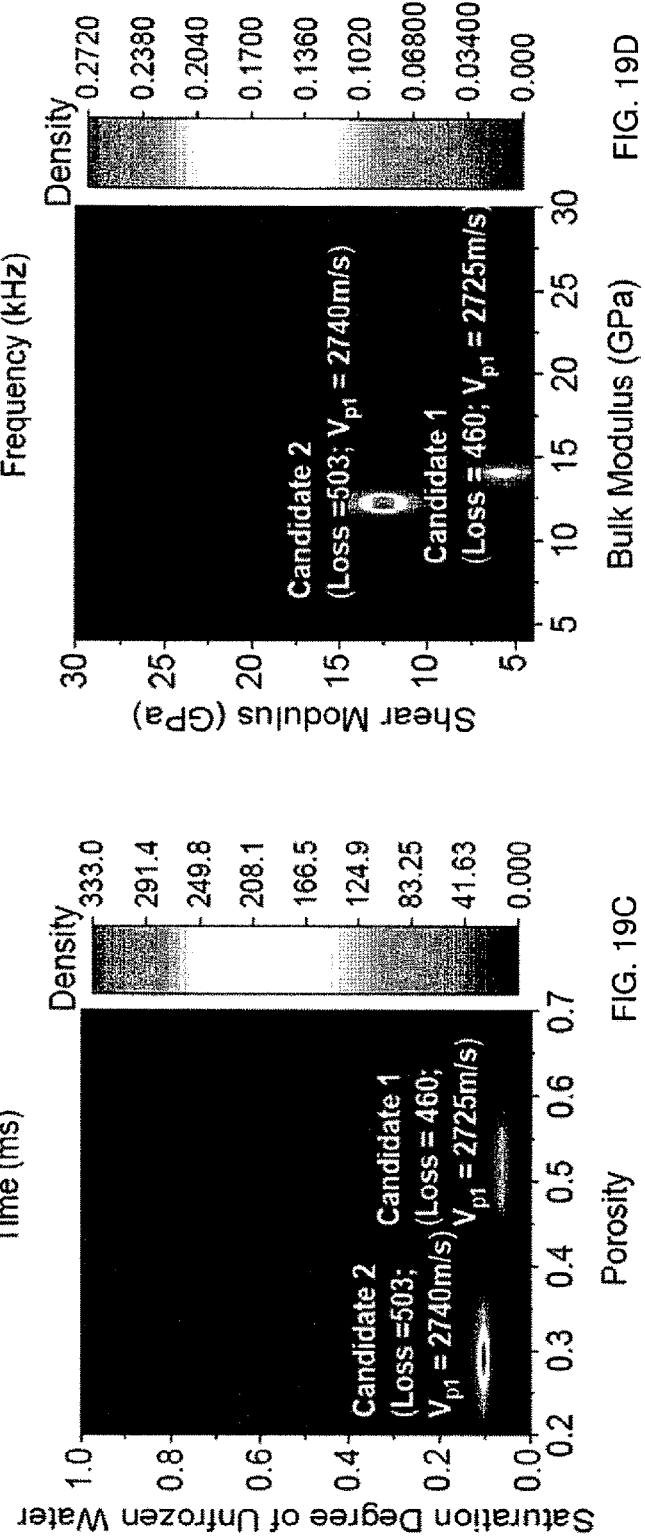
FIG. 19A
FIG. 19B
FIG. 19C
FIG. 19D

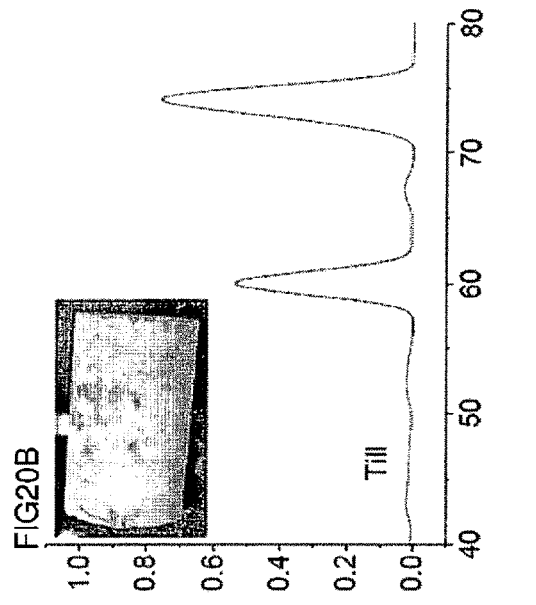
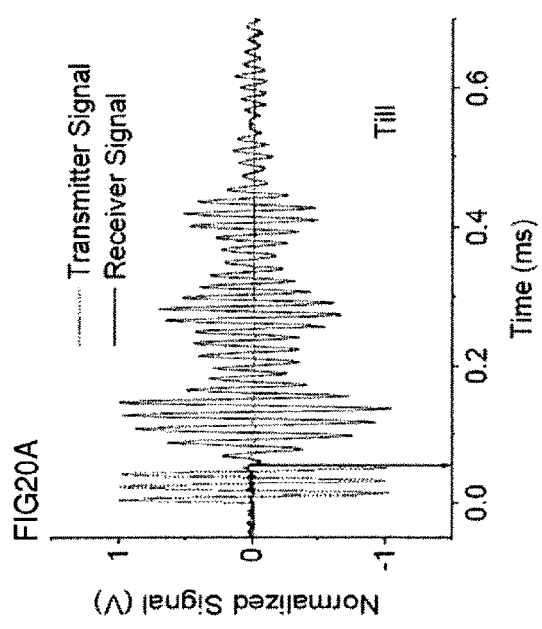
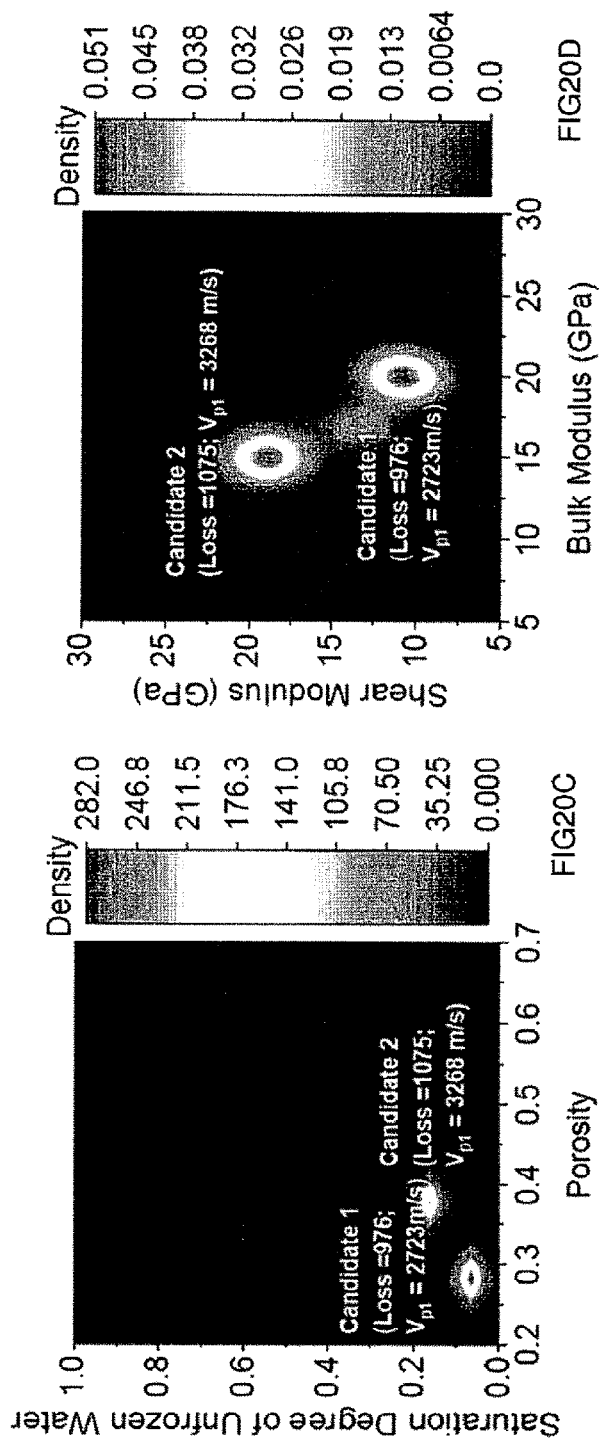

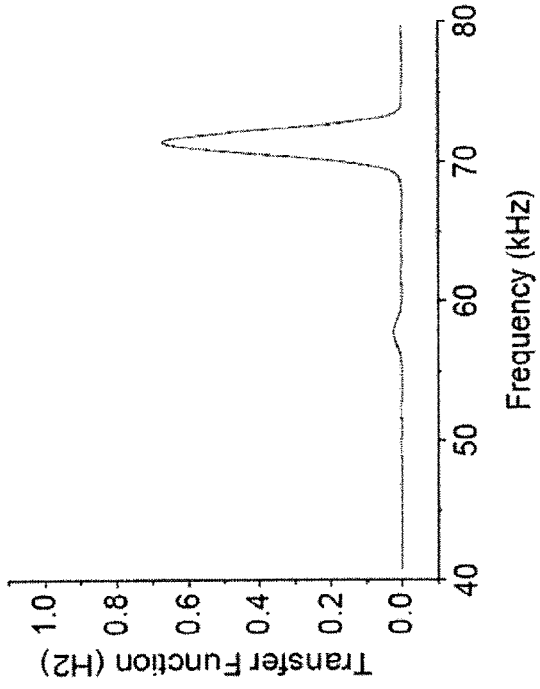
FIG21A
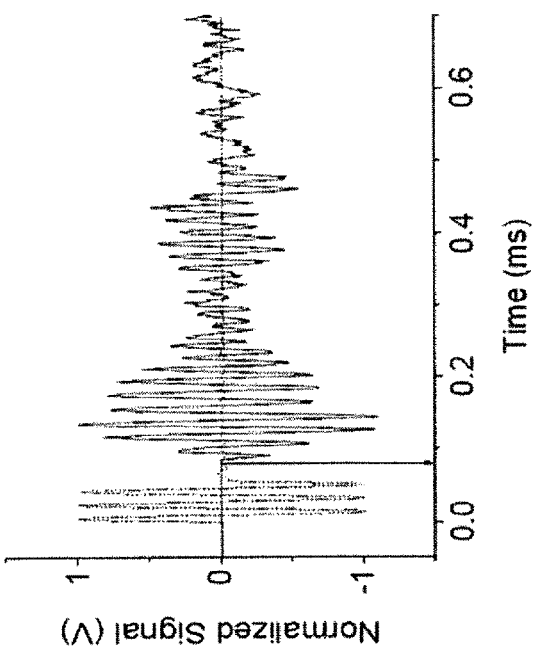
FIG21B
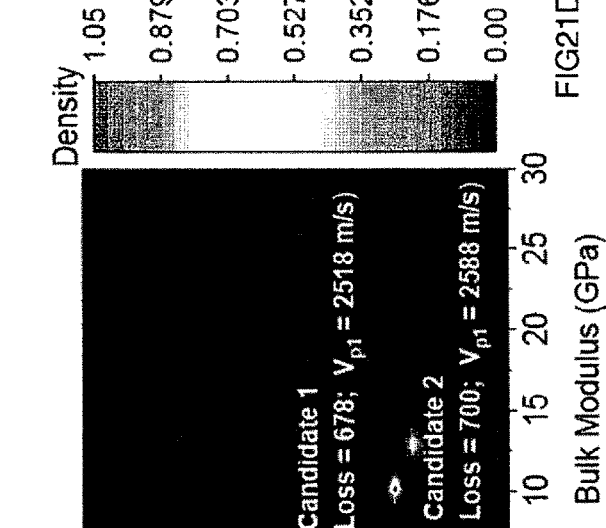
FIG21D
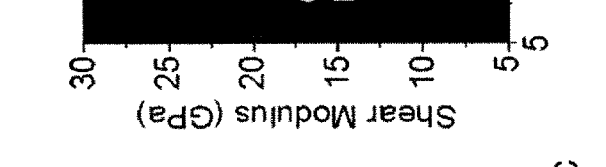
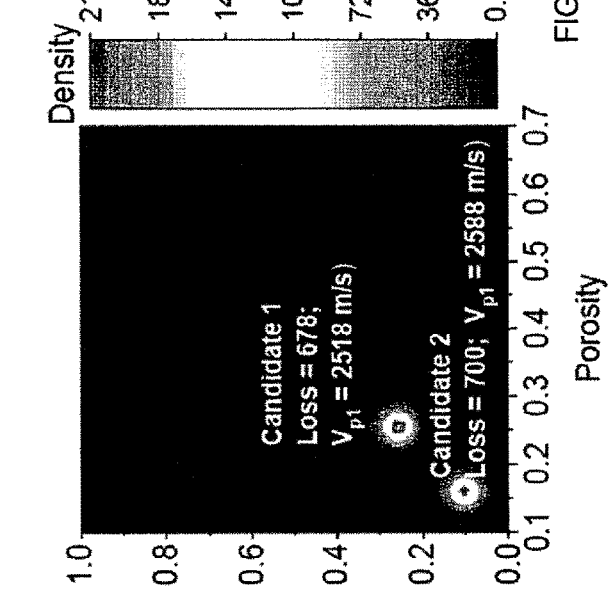
FIG21C

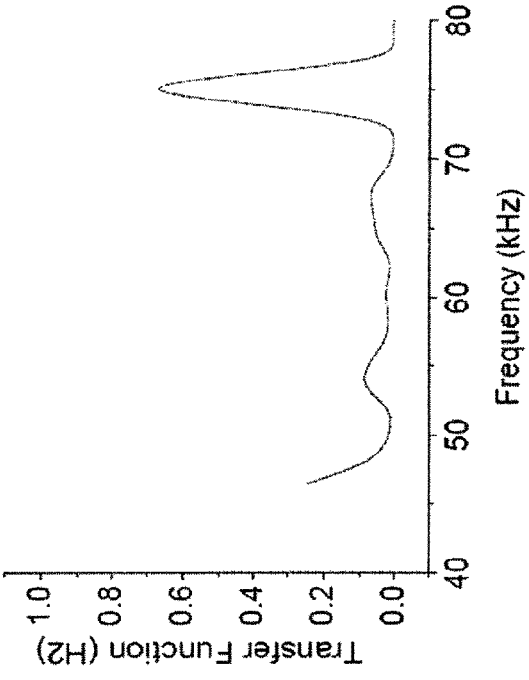
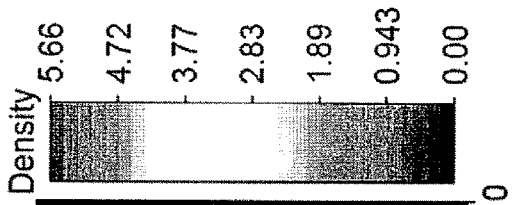
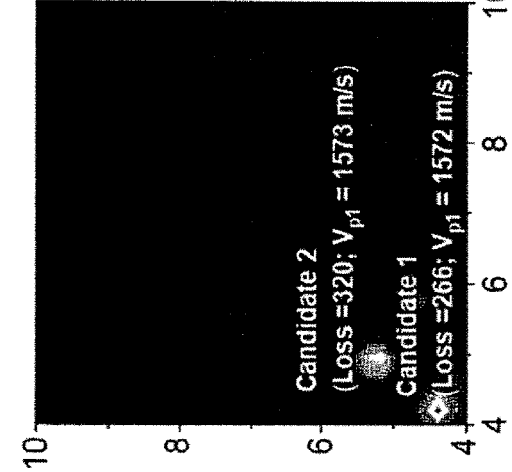
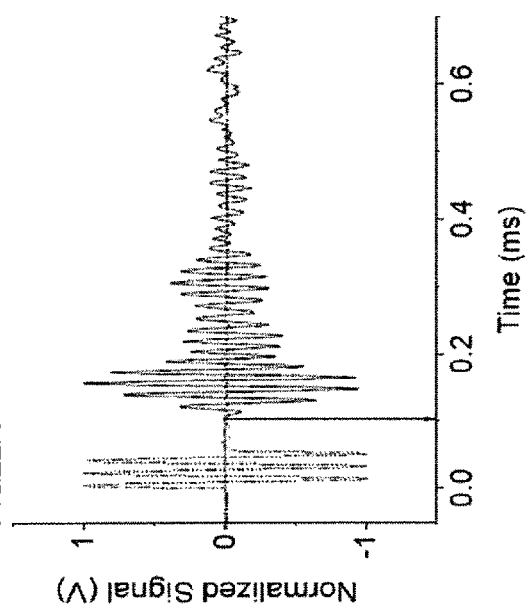
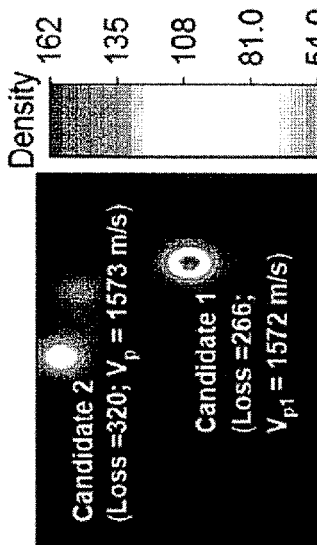

Load 1

Load 2

Load 3

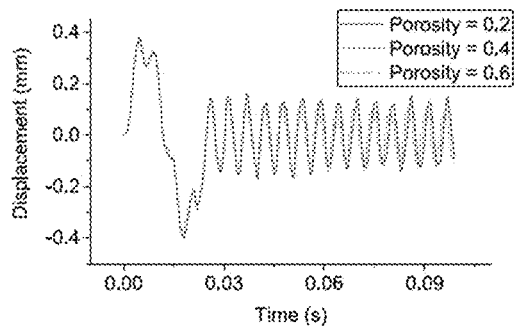
FIG. 26A - Load 1
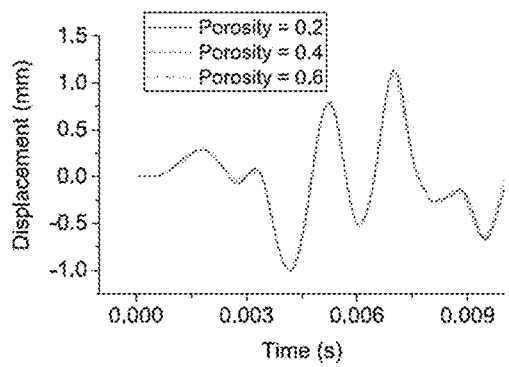
FIG. 26B - Load 2
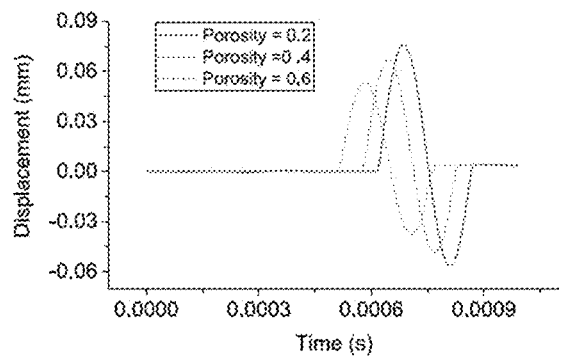
FIG. 26C - Load 3
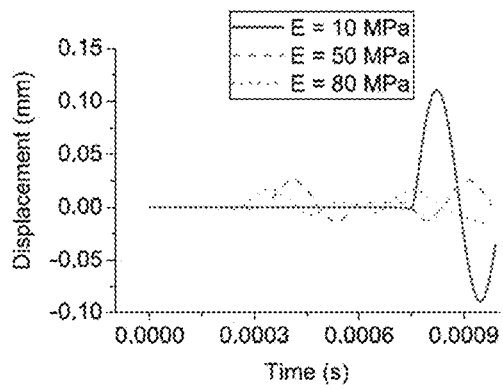
FIG. 27A – Young's Modulus
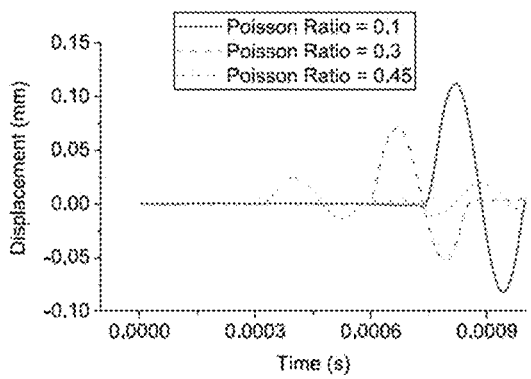
FIG. 27B – Poisson Ratio
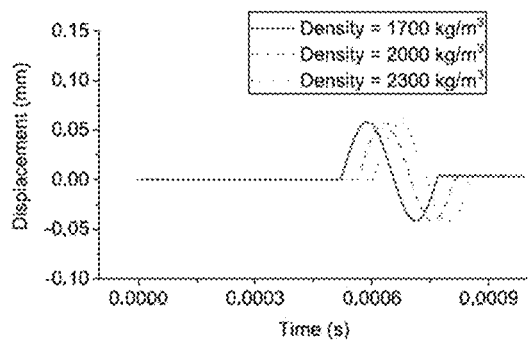
FIG. 27C – Density

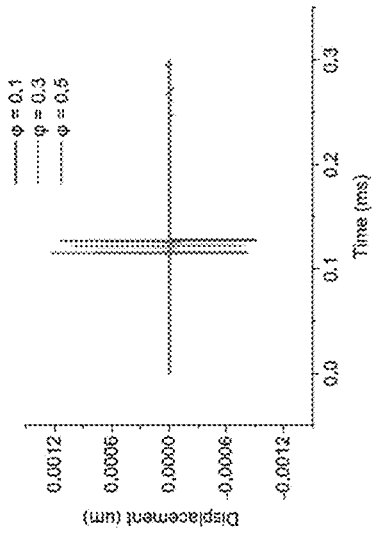
FIG. 28A - Load 3
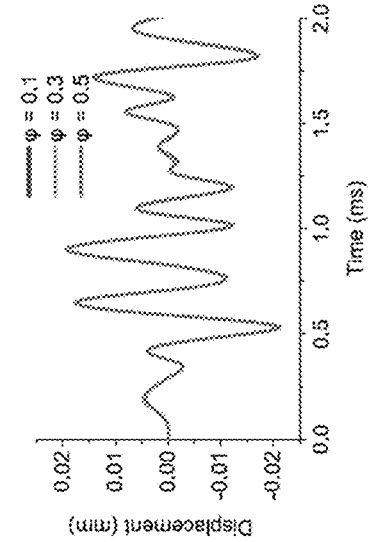
FIG. 28B - Load 4
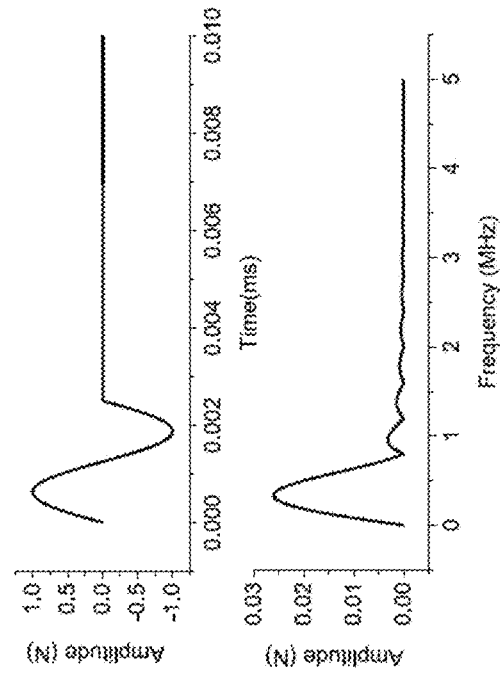
FIG. 29

SYSTEMS AND METHODS FOR ULTRASONIC CHARACTERIZATION OF PERMAFROST, FROZEN SOIL AND SATURATED SOIL SAMPLES

CROSS-REFERENCE TO RELATED APPLICATIONS

This application claims benefit under 35 U.S.C. 119(e) of U.S. Provisional Patent Application No. 63/051,067, filed Jul. 13, 2020, and also claims foreign priority benefit under 35 U.S.C. 119(a) of International PCT Application No. PCT/CA2021/050826, filed Jun. 17, 2021, the entireties of which are incorporated herein by reference.

FIELD OF THE INVENTION

The present invention relates generally to the field of civil engineering, and more particularly to technology for characterizing permafrost, frozen soil and saturated soil according to physical and mechanical properties thereof.

BACKGROUND

In northern Canada, structures built on traditionally frozen soil are subject to hazards resulting from recent changes in permafrost thickness due to climate warming and consequently seasonal frost action of active layers. Design and construction of engineering works on permafrost normally follow one of two broad principles which are based on whether the frozen foundation soil is thaw-stable or thaw-unstable (ice-rich permafrost). The difference between thaw-stable or thaw-unstable permafrost soils is determined based on the amount of ice content within the permafrost. Ice-rich permafrost contains ice in excess of the water content at saturation. The construction on thaw-unstable permafrost is challenging and requires remedial measures since upon thawing, permafrost will experience significant thaw-settlement and suffer loss of strength to a value significantly lower than that for similar material in an unfrozen condition. Consequently, any remedial measures for excessive soil settlements or new design of infrastructure in permafrost zones affected by climate warming require a reasonable estimation of the amount of ice content within the permafrost (frozen soil). Another factor that plays an important role in the rate of settlement of permafrost foundation is the mechanical performance depending on the stiffness parameters of soil at the construction site. Thaw settlement of degrading permafrost is of paramount importance in any design or rehabilitation program of northern infrastructure affected by climate warming. Hence, subsurface conditions must be thoroughly investigated to determine the important factors that must be considered in the design of structures to be built on the permafrost.

The characterization of permafrost or frozen soil includes the measurement of both physical properties (e.g., unfrozen water content, ice content, and porosity) and mechanical properties (e.g., bulk modulus and shear modulus, or compression and shear wave velocity). It is well known that the freezing point in soils lies below 0° C. (freezing-point depression) and some amount of pore water may remain unfrozen [2.19]. The popular techniques used for unfrozen water content measurement include Time Domain Reflectometry (TDR), Frequency Domain Reflectometry (FDR), Time Domain Transmissometry (TDT) and Nuclear Magnetic Resonance (NMR) [2.29, 2.35, 2.42]. In these techniques, the soil water content is estimated from the empirical relation between the relative dielectric permittivity and unfrozen water content of soil samples [2.12, 2.36]. These methods require frequent laboratory calibration to obtain unique empirical relations based on soil types, test temperature, and the type of transducer [2.42]. Porosity can be measured using techniques such as Computed Tomography (CT scan) [2.8, 2.30], Imbibition methods (immersion of the soil sample in a fluid) [2.10], Water Evaporation method [2.5, 2.34,] and Mercury Intrusion [2.41]. These techniques (all but CT method) are limited to the applications in unfrozen soils and are invasive such that the original soil state is disturbed. X-ray Computed Tomography imaging has been used in recent years to scan permafrost samples [2.37]. Such a technique requires bulky and expensive instruments that are not suitable for field applications. Permafrost samples need to be transported to a laboratory, which can be costly and causes sample disturbance. Furthermore, the CT imaging can only shows the distribution of ice patches within the sample without any quantitative characterization; the CT imaging is also challenging to differentiate the water and ice from soil grains in fine-grained soils [2.39].

The Bender Element (BE) test, Piezoelectric Ring-Actuator Technique (P-RAT) and Resonant Column (RC) test are frequently used for the evaluation of dynamic soil properties, such as the shear wave velocity [2.13, 2.21]. However, the RC test is time-consuming, costly, bulky, and typically only used in laboratory investigations. The BE generates shear waves (S-waves) in the direction of their plane and also primary waves (P-waves) in the direction normal to their plane. The P-waves reflected from the cell walls can interfere with the generated S-waves [2.17]. The arrival time-based methods usually result in subjective and inaccurate interpretation of the shear wave velocity. The lack of efficient contact between the BE and surrounding soils as well as protruding the BE into opposite ends of a soil sample are among the main drawbacks of the application of bender element test for frozen soils. In comparison to the BE test, the P-RAT reduces the generation of P-waves due to the constraint in the potential compression from the direct contact between piezoelectric elements and the soil samples [2.13]. However, the P-waves can still be generated in the P-RAT test [2.13], which interferes with the selection of S-wave arrival time in the current arrival time-based methods. Currently, there is no clear winner among these competing methods [2.11].

Ultrasonic technique is another method frequently used to evaluate the properties of construction materials such as concrete, however its use for soil characterization has been limited due to difficulties in signal interpretation and the complex nature of geomaterials [2.20]. In theory, the mechanical properties of soil specimen (mostly for P wave velocity) can be evaluated by interpreting the signal recorded by a receiver located at the other side of the soil specimen in an ultrasonic pulse velocity (UPV) test setup. Here, the mechanical properties of a soil sample can be computed from the P-wave arrival times. However, there are several uncertainties in the interpretation of the obtained signals. In the current practice, the first arrival time can be used for the evaluation of P wave velocity. However, the P wave velocity alone is insufficient for full characterization of soil samples, especially for determining the physical properties. There are no robust methods to interpret the remaining signals to obtain more information on other properties of soil samples, e.g., shear wave velocity, porosity, ice content and unfrozen water content, and no available algorithms for the interpretation of ultrasonic signals in frozen soils.

Several studies on the effect of ice content on the compression and shear wave velocities of frozen soils have been reported in the literature. The compression and shear wave velocities of frozen clay, loess, and sand were measured through the ultrasonic test by [2.38]. The experimental results showed that the wave velocities increased with ice content at a different rate (following order: clay<loess<sand). The relationship between the P-wave velocity and ice content was also studied by [2.6, 2.7]. The volumetric unfrozen water content was firstly related to temperature through empirical water retention curves; then, the P-wave velocity was measured at the corresponding temperature for a correlation with ice content. Laboratory experiments were performed by [2.27] in partially frozen brine. A positive relationship between the attenuation of ultrasonic waves and unfrozen brine was observed in a frequency range of 350-600 kHz.

Several theoretical studies have been performed for the estimation of frozen soil properties based on the correlation between the mechanical properties and ice content. The Kuster-Toksoz-Leurer model was proposed for the calculation of P-wave and S-wave velocities in two-phase media saturated with water or air [2.15]. This model was modified by King et al. [2.14] to estimate P-wave and S-wave velocities in frozen soils by assuming that ice plays the same role as solid skeleton; for example, the original bulk modulus ($K_s$) of solid skeleton is replaced by the volumetric average modulus of ice ($K_i$) and solid skeleton bulk modulus (i.e., $K_s \rightarrow (1-n)K_s + nS_rK_i$ where n is the porosity and $S_r$ is the degree of saturation of unfrozen water). As a result of the interaction between the solid skeleton, pore-water and pore-ice, three types of P-waves and two types of S-waves are generated in three-phase frozen soils [2.3, 2.18]. The degree of saturation of unfrozen water in frozen soils depends on the P1 wave (the fastest P-wave among the three types of P-waves) and S1 wave (the fastest S-wave among the two types of S-waves) velocities among others. However, the mechanical and physical properties of soils still can not be inversely determined given the P1 wave and S1 wave velocities. The wave propagation within a three-phase medium using the Biot theory of poroelasticity was developed by Leclaire et al. [2.16], Carcione et al. [2.3], Carcione and Seriani [2.2], Carcione et al. [2.4], Maghoul et al. [2.25, 26], Liu et al. [2.22]. The solution was obtained through various numerical methods, such as a grid method based on the Fourier differential operator and a Runge-Kutta time-integration algorithm [2.2], finite element method [2.33], Zener element method for poro-viscoacoustic model [2.23], and boundary element method [2.24, 2.26].

To best of applicant's knowledge, despite the forgoing endeavors in the prior art, there exists no implementable example of a workable technology in the prior art for characterization of permafrost or frozen soils using ultrasonic techniques, a need for which therefore remains.

Such shortcomings in the prior art are not limited purely to the context of frozen soil and permafrost, as the characterization of foundation soils is an important first step in design and construction of civil infrastructure in various environments, not just in northern climates. The elastodynamic theory has been also used by several researchers [3.7-3.9] through the finite difference, finite element, and discrete element methods to interpret the output stress waves. The elastodynamic algorithm assumes that the domain is composed of solid materials. Under a dynamic load, the generated P waves and S waves penetrate into different layers of a soil and the reflected waves received at the receiver can be used to determine the soil strata. However, as already mentioned above the estimation of the shear wave velocity is still based on the simple signal processing techniques. In addition, in elastodynamic algorithms, the effect of porous structure of soil layers and pore water in dynamic responses of geomaterials is neglected. In fact, the wave propagation in porous soil layers can be better represented by using dynamic poroelastic models instead of elastodynamic models, especially in fully saturated soils in which the pore water can significantly attenuate the stress waves, and in high frequency regimes. The dynamic poroelastic models consider the coupling effect between the pore water and solid skeleton, which induces three types of waves (fast P wave, slow P wave, and S wave in the solid skeleton). Under an impact load, those three waves travel at different speeds, which are captured by the receiver placed at the end of the soil specimen in an ultrasonic setup.

The problem of dynamic poroelasticity [3.10, 3.11] has been solved using various analytical and numerical methods. A direct boundary element approach for solving three-dimensional problems of dynamic poroelasticity in the time domain was developed by [3.12]. Such a technique was based on an integral equation formulation in terms of solid displacements and fluid stress. The 2D and 3D fundamental solutions of dynamic poroelasticity was further developed by [3.13-3.16]. The solutions were obtained in both time and Laplace transform domain, and can be recovered to elastodynamics and steady-state poroelasticity. In layered saturated media, similar approaches have been reported by [3.17, 3.18]. Other than the boundary element method, the finite element method has also been applied by [3.19]. The finite difference method is also used to simulate the wave propagation in heterogeneous poroelastic media by [3.20].

So in both the context of frozen soil or permafrost, and in the context of saturated soils, the problem remains that, to the best of applicant's knowledge, there is currently no laboratory-scale ultrasonic setup which is able to determine a range of physical and mechanical properties of a soil sample. Of further interest in the art is the development of cheaper, faster and portable means of soil characterization, which may be able to significantly lower the cost of overall soil testing, and/or enable better assessments in sensitive locations.

SUMMARY OF THE INVENTION

According to first aspect of the invention, there is provided a system for characterization of a permafrost or frozen soil sample of which a plurality of physical parameters is to be measured, said system comprising:
  an ultrasonic transmitter operable to emit an input signal through the permafrost or frozen soil sample;
  an ultrasonic receiver positioned or positionable oppositely of said ultrasonic transmitter to reside across the permafrost or frozen soil sample therefrom, and operable to generate a sample response signal in response to receipt of said input signal from the ultrasonic transmitter during a test of said permafrost or frozen soil sample;
  one or more non-transitory computer readable media having stored thereon:
    a data store for storing actual test result data that at least comprises response signal data representative of the sample response signal from the ultrasonic receiver during said test;
    a predictive poromechanical model useful for calculating predictions of at least some of the test result data based on different combinations of potential parameter values for said physical parameters of said permafrost or frozen soil;

statements and instructions executable by one or more computer processors to perform the following steps:

(a) access said test result data;

(b) run the predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive model better approximate the actual test result data than other candidate parameter value combinations;

(c) perform iterative repetitions of step (b), each time using the preferred-candidate parameter value combinations from a prior iteration of step (b) as the input to the poromechanical model, until at least one optimal candidate parameter value combination whose resultant predictive dataset optimally matches the actual test result data is found; and (d) select said at least one optimal candidate parameter value combination as a resultant measurement dataset for quantifying the physical parameters of the permafrost or frozen soil.

According to a second aspect of the invention, there is provided a method for characterizing a permafrost or frozen soil sample having a plurality of physical parameters, said method comprising:

(a) during a test of said permafrost or frozen soil sample
  (i) from an ultrasonic transmitter, transmitting an input signal through the permafrost or frozen soil sample;
  (ii) at an ultrasonic receiver positioned oppositely of said ultrasonic transmitter across the permafrost or frozen soil sample, receiving said input signal, and generating a sample response signal in response thereto;

(b) digitally storing actual test result data that at least comprises signal data representative of the sample response signal from the ultrasonic receiver during said test;

(c) through execution by one or more processors of statements and instructions stored in one or more non-transitory computer readable media, perform the following steps:
  (i) access said test result data;
  (ii) run a predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive model better approximate the actual test result data than other candidate parameter value combinations;
  (iii) perform iterative repetitions of step (c)(ii), each time using the preferred-candidate parameter value combinations from a prior iteration of step (c)(ii) as the input to the poromechanical model, until at least one optimal parameter value combination whose resultant predictive dataset optimally matches the actual test result data is found;
  (iv) select said at least one optimal parameter value combination as a resultant measurement dataset for quantifying the physical parameters of the permafrost or frozen soil.

According to a third aspect of the invention, there is provided a method for characterizing a permafrost or frozen soil sample having a plurality of physical parameters, said method comprising, through execution by one or more processors of statements and instructions stored in one or more non-transitory computer readable media, the following steps:

(a) access actual test result data that was obtained from a test of said permafrost or frozen soil sample and is stored on the same or different non-transitory computer readable media, said actual test result data at least comprising response signal data that is representative of a response signal received during said test from an ultrasonic receiver that was subjected to an input signal transmitted thereto through the permafrost or frozen soil sample from an ultrasonic transmitter situated across the permafrost or frozen soil sample from said ultrasonic receiver;

(b) run a predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive model better approximate the actual test result data than other candidate parameter value combinations;

(c) perform iterative repetitions of step (b), each time using the preferred-candidate parameter value combinations from a prior iteration of step (b) as the input to the poromechanical model, until at least one optimal candidate parameter value combination whose resultant predictive dataset optimally matches the actual test result data is found; and (d) select said at least one optimal candidate parameter value combination as a resultant measurement dataset for quantifying the physical parameters of the permafrost or frozen soil.

According to a fourth aspect of the invention, there is provided a system for characterization of a saturated soil sample of which a plurality of physical parameters is to be measured, said system comprising:

an ultrasonic transmitter operable to emit an input signal through the saturated soil sample;

an ultrasonic receiver positioned or positionable oppositely of said ultrasonic transmitter to reside across the saturated soil sample therefrom, and operable to generate a sample response signal in response to receipt of said input signal from the ultrasonic transmitter during a test of said saturated soil sample;

one or more non-transitory computer readable media having stored thereon:
  a data store for storing actual test result data that at least comprises response signal data representative of the sample response signal from the ultrasonic receiver;
  a predictive poromechanical model useful for calculating predictions of the sample response signal based on different combinations of potential parameter values for said physical parameters of said saturated soil;
  statements and instructions executable by one or more computer processors to perform the following steps:

(a) access said test result data;
(b) run the predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive model better approximate the actual test result data than other candidate parameter value combinations;
(c) perform iterative repetitions of step (b), each time using the preferred-candidate parameter value combinations from a prior iteration of step (b) as the input to the poromechanical model, until at least one optimal candidate parameter value combination whose resultant predictive dataset optimally matches the actual test result data is found; and
(d) select said at least one optimal candidate parameter value combination as a resultant measurement dataset for quantifying the physical parameters of the saturated soil.

According to a fifth aspect of the invention, there is provided a method for characterizing a saturated soil sample having a plurality of physical parameters, said method comprising, through execution by one or more processors of statements and instructions stored in one or more non-transitory computer readable media, the following steps:
(a) during a test of said saturated soil sample
 (i) from an ultrasonic transmitter, transmitting an input signal through the saturated soil sample;
 (ii) at an ultrasonic receiver positioned oppositely of said ultrasonic transmitter across the saturated soil sample, receiving said input signal, and generating a sample response signal in response thereto;
(b) digitally storing actual test result data that at least comprises signal data representative of the sample response signal from the ultrasonic receiver during said test;
(c) through execution by one or more processors of statements and instructions stored in one or more non-transitory computer readable media, perform the following steps:
 (i) access said test result data;
 (ii) run a predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive model better approximate the actual test result data than other candidate parameter value combinations;
 (iii) perform iterative repetitions of step (c)(ii), each time using the preferred-candidate parameter value combinations from a prior iteration of step (c)(ii) as the input to the poromechanical model, until at least one optimal candidate parameter value combination whose resultant predictive dataset optimally matches the response signal data is found;
 (iv) select said at least one optimal candidate parameter value combination as resultant measurement dataset for quantifying the physical parameters of the saturated soil.

BRIEF DESCRIPTION OF THE DRAWINGS

Preferred embodiments of the invention will now be described in conjunction with the accompanying drawings in which:

FIGS. 10A through 10E show parameter updates through the differential evolution algorithm.

FIG. 11 illustrates construction of a global stiffness matrix of a multiphase poromechanical solver of the first embodiment.

FIG. 12A is a general schematic of a Quantitative Ultrasound (QUS) sensing system of a second embodiment of the invention, which replaces the UVP setup employed in the first embodiment.

FIG. 12B schematically illustrates the inner structure of an ultrasonic transducer that is used in both the QUS system and UVP setup of the two embodiments, and includes several different components.

FIG. 12C schematically illustrates working principles of an ultrasonic transmitter used in the QUS system, and a defined transfer function $H_1$ in the frequency domain.

FIG. 12D schematically illustrates wave propagation in three-phase frozen soil samples in the QUS system with an assumed force, as well as a transfer function $H_2$ defined with calculated displacement and arbitrary input force in the frequency domain.

FIG. 12E schematically illustrates working principles of an ultrasonic receiver used in the QUS system, and a defined transfer function $H_3$ in the frequency domain.

FIG. 13A shows an input electrical signal at the ultrasonic transmitter of the QUS system during a pre-test calibration process.

FIG. 13B shows an output electrical signal at the ultrasonic transmitter of the QUS system during the calibration process.

FIG. 13C shows results of the transfer functions $H_4$ and $H_2$ and the product of $H1$ and $H_3$ from the calibration process.

FIG. 15A shows comparison between experimental and theoretical transfer functions $H_2$ obtained from a spectral element multiphase poromechanical solver of the second embodiment for the clay soil test sample at −20° C.

FIG. 15B shows density contour of a top two candidate clusters identified by interative inversion of the spectral element multiphase poromechanical solver for the clay soil test sample at −20° C. at a subspace between the degree of saturation of unfrozen water and porosity.

FIG. 15C shows density contour of a top two candidate clusters identified by the interative inversion of the spectral element multiphase poromechanical solver for the clay soil test sample at −20° C. at a subspace between the shear modulus and bulk modulus of the solid skeleton.

FIG. 17A shows ultrasonic input and output signals in the time domain for during testing of a clay soil sample at −10° C.

FIG. 17B shows experimental transfer function $H_2$ determined from said testing of the clay soil sample at −10° C.

FIG. 17C shows density contour of top two candidate clusters identified by the iterative inversion of the spectral element multiphase poromechanical solver for the clay soil test sample at −10° C. at a subspace between the degree of saturation of unfrozen water and porosity.

FIG. 17D shows density contour of top two candidate clusters identified by the iterative inversion of spectral element multiphase poromechanical solver for the clay soil test sample at −10° C. at a subspace between the shear modulus and bulk modulus of the solid skeleton.

FIGS. 19A-19D are similar to FIGS. 17A-17D, but for a silt soil sample at −20° C.

FIGS. 20A-20D are similar to FIGS. 17A-17D, but for a till soil sample at −20° C.

FIGS. 21A-21D are similar to FIGS. 17A-17D, but for a silt soil sample at −2° C.

FIGS. 22A-22D are similar to FIGS. 17A-17D, but for a different clay soil sample at −2° C.

FIG. 26A through 26C shows a sensitivity analysis of porosity under the three different impulse loads.

FIGS. 27A through 27C each show a sensitivity analysis of a different respective soil parameter for one of two groups of tested soils.

FIGS. 28A and 28B show sensitivity of soil parameters under the third tested impulse load from FIG. 25C, and under a different fourth impulse load.

FIG. 29 shows the fourth impulse load in both time and frequency domains.

DETAILED DESCRIPTION

First Working Embodiment (Frozen Soil & Permafrost)

Figure 1A:
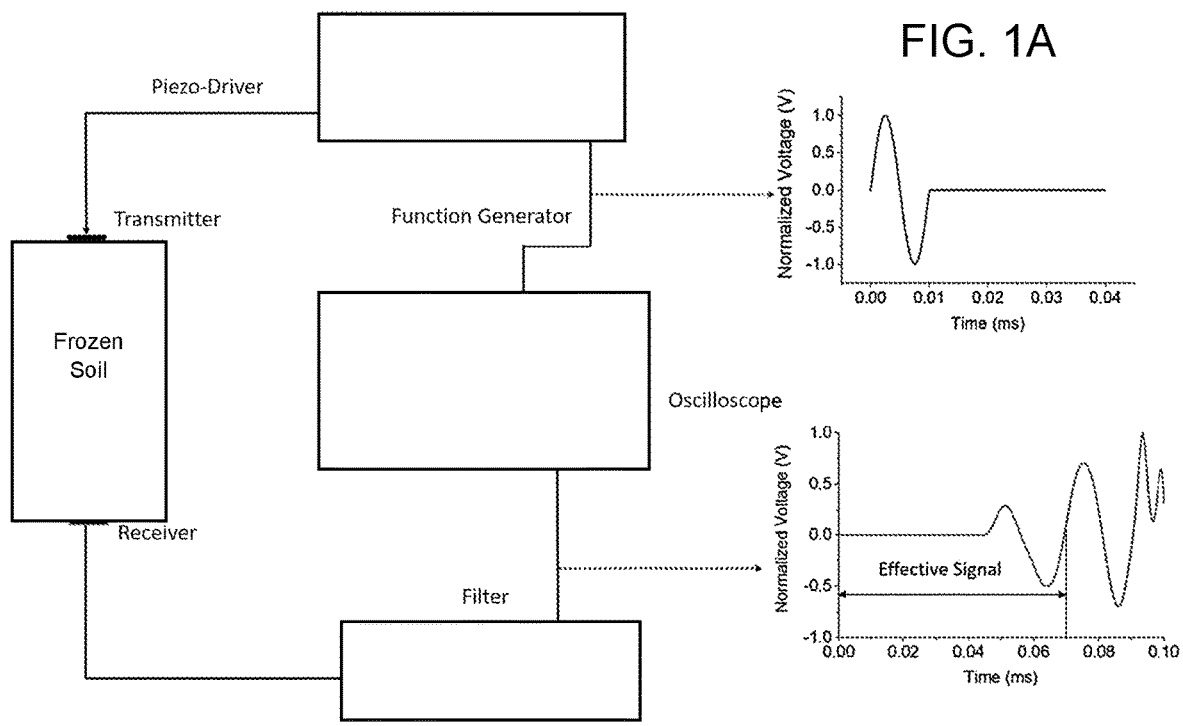
FIG. 1A is a general schematic of an Ultrasonic Pulse Velocity (UPV) test setup of a first embodiment of the invention with ultrasonic transducers located at opposing top and bottom surfaces of a permafrost or frozen soil sample.
Figure 1B:
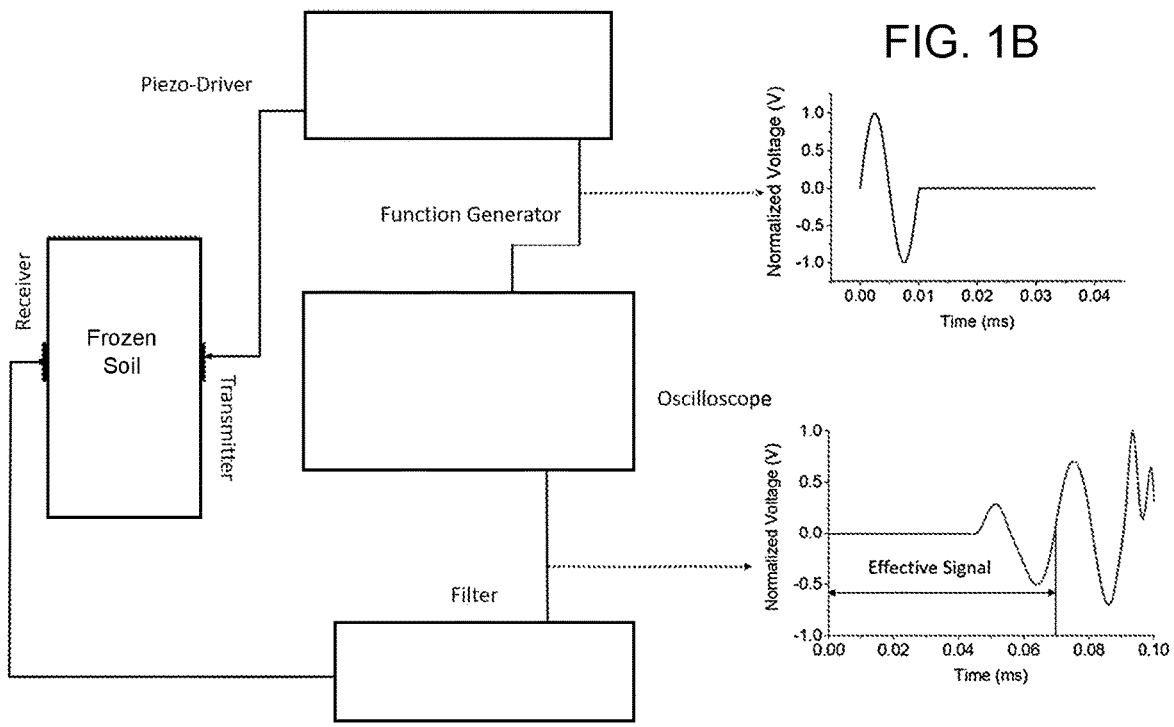
FIG. 1B is a general schematic of an alternative UPV test setup of the first embodiment with ultrasonic transducers situated oppositely of one another across a width or diameter of a permafrost or frozen soil sample.

A general schematic of the UPV test setup employed in a first embodiment of the present invention is illustrated in FIG. 1. In permafrost soils, ice is often present in varying amounts. The co-existence of water and ice depends on soil texture, and temperature and salinity; some fine-grained soils may have an unfrozen water content in excess of 20 percent even at ground temperatures below −5° C. Therefore, in the test setup, it is assumed that the frozen soil specimen is composed of three phases: solid grains, pore-water, and pore-ice. The transmitters can be located either vertically at the two ends of a soil sample (FIG. 1A) or horizontally on the wall of a multilayered sample (soil layers or ice lenses in frost susceptible samples) (FIG. 1B) to generate the stress waves. The wave travels through the soil sample and is received by a receiver at the other end of the sample. The function/arbitrary waveform generator (e.g. HP 33120A) applies direct digital-synthesis techniques to create a stable, accurate output signal for the UPV test. The designed electric signal is transmitted to the piezo drive to generate mechanical energy used in the ultrasonic test. Then the input and output signal are processed through an analog filter (e.g. MODEL 3384) and finally displayed by an oscilloscope (e.g. DSOX2014A) for further analysis.

Here, a case study using synthetic data is presented to show the permafrost characterization process. The sensitivity analysis is firstly performed to show the effect of soil skeleton properties, porosity, and degree of saturation with ice. Then, the highly non-convex nature of this inversion problem is discussed. The inversion algorithms are selected in a way to mitigate the non-convex complexity. Finally, the inversion results (soil parameters) are calculated based on the given synthetic data, poromechanical model, and machine learning inversion algorithms.

The sensitivity analyses are performed to study the effect of mechanical properties of solid skeleton constituents, porosity as well as degree of saturation with ice in the ultrasonic pulse velocity test. The inherent properties of each component are shown in Table 1.1.

TABLE 1.1

Mechanical properties of each component in frozen soil

| Media | Density (kg/m³) | Bulk modulus (GPa) | Shear modulus (GPa) |
|---|---|---|---|
| Quartz [1.8] | $p_s = 2650$ | $K_s = 36.6$ | $\mu_s = 45.0$ |
| Clay Grain [1.8] | $p_s = 2580$ | $K_s = 20.9$ | $\mu_s = 6.85$ |
| Calcite [1.2] | $p_s = 2710$ | $K_s = 76.8$ | $\mu_s = 32$ |
| Ice | $p_s = 920$ | $K_i = 8.58$ | $\mu_i = 1.92$ |
| Water | $p_w = 1000$ | $K_w = 2.25$ | $\mu_w = 0$ |

Figure 2:
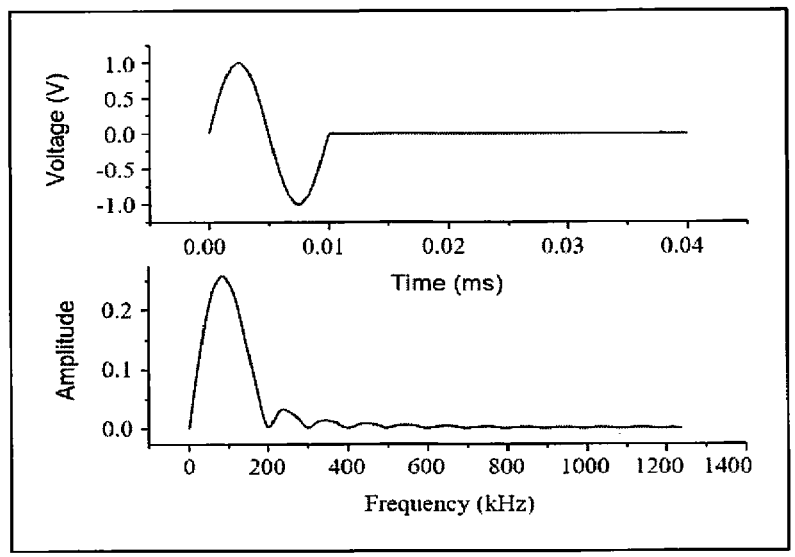
FIG. 2 shows a high-frequency (ultrasonic) impulse load, used in a first case study, in time and frequency domains.
Figure 3:
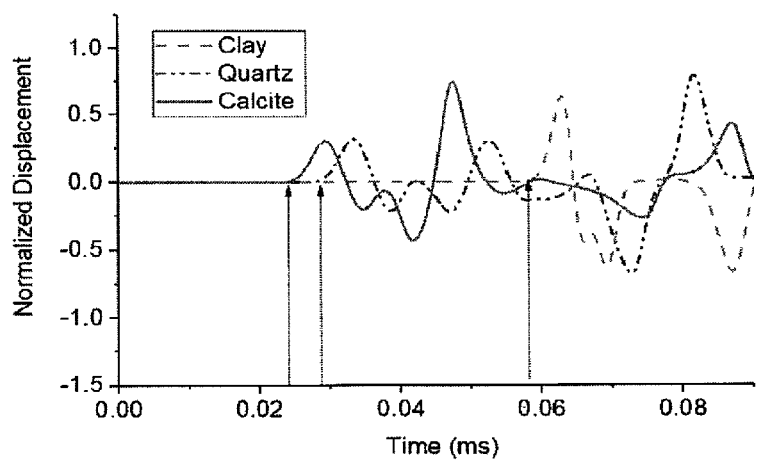
FIG. 3 shows a receiver signal from the first case study for a permafrost specimen composed of clay, quartz and calcite solid grain.

The applied ultrasonic impulse load shown in FIG. 2 has a dominant frequency of 100 kHz. The soil sample with different constituents for solid skeleton (such as clay, quartz and calcite), porosity, and ice content were studied under such an impulse load. In this case study, the permafrost sample was assumed to be 18 cm in length and 8.9 cm in diameter. The receiver signals for different constituents for the solid skeleton (clay, quartz, and calcite) are shown in FIG. 3. It can be seen that the first arrival time as well as signal distribution are affected mainly by the solid skeleton constituent. When the soil skeleton is stiffer (for example soils with calcite solid skeleton constituent), the arrival time is shorter.

Figure 4:
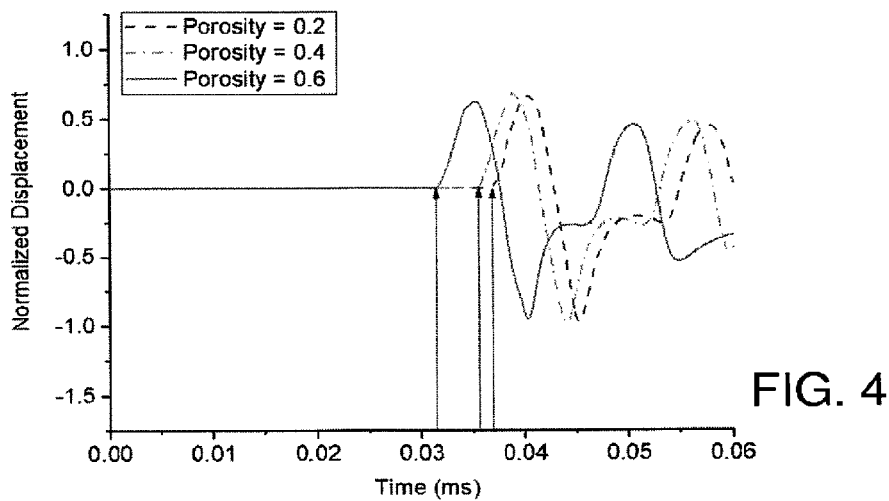
FIG. 4 shows the effect of a specimen's porosity on the receiver signal.
Figure 5:
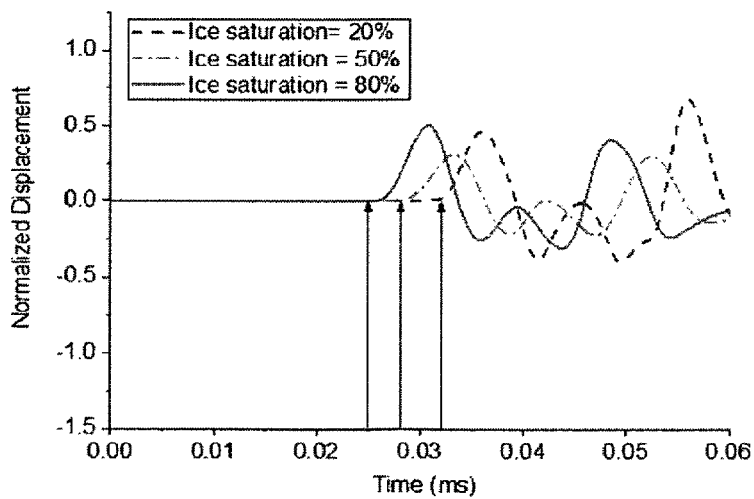
FIG. 5 shows the effect of a specimen's ice saturation on the receiver signal.

Similarly, the effect of porosity is shown in FIG. 4. The arrival time is not significantly affected by a change in porosity, especially in the case with a porosity of 0.2 and 0.4. Therefore, the inversion based on only the arrival time may lead to non-uniqueness of solutions. Despite of the similar first arrival time, the distribution of signals is still influenced by the porosity. The effect of ice content on the signal distribution measured at the receiver is shown in FIG. 5. An increase in ice content induces a left shift in the signal, which leads to a shorter arrival time. A higher degree of saturation with ice leads to a faster arrival time, which proves soil is stiffer with more ice formed in pores. Meanwhile, the distribution of signals is also dependent on the degree of saturation with ice. Therefore, the ice content can be determined through the first arrival time as well as the first cycle.

Figure 6:
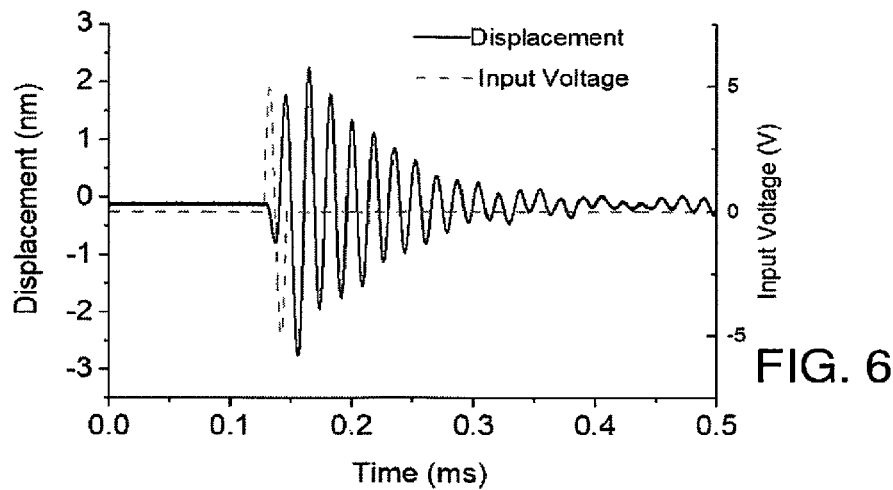
FIG. 6 shows displacement of an ultrasonic transmitter under a sinusoidal impulse excitation.

In real practice, the piezoelectric transmitter can generate much more complex motion under a single sinusoidal impulse excitation load. For instance, the displacement of the ultrasonic transmitter measured through laser vibrometer is shown in FIG. 6. However, the real force distribution generated by an ultrasonic transmitter remains unknown. An alternative option is to perform the inversion based on only the arrive time, which is independent on the force distribution. However, the inversion based on only the arrival time may lead to non-uniqueness of solutions (as shown in the sensitivity analysis). Therefore, more information is required for the inversion analysis. However, the inversion analysis will be problematic if the whole signals are used due to uncertainties introduced by the unknown force distribution.

Figure 7:
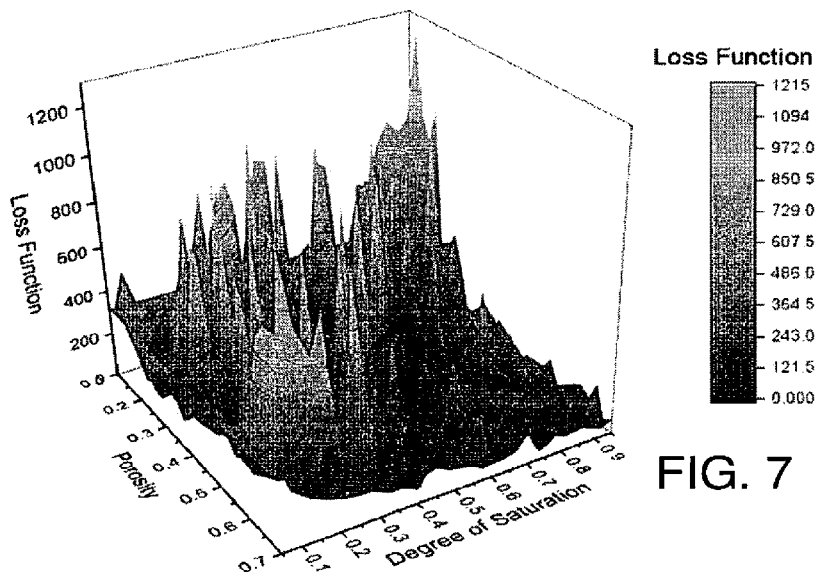
FIG. 7 shows a space visualization for porosity and degree of saturation of unfrozen water.
Figure 8:
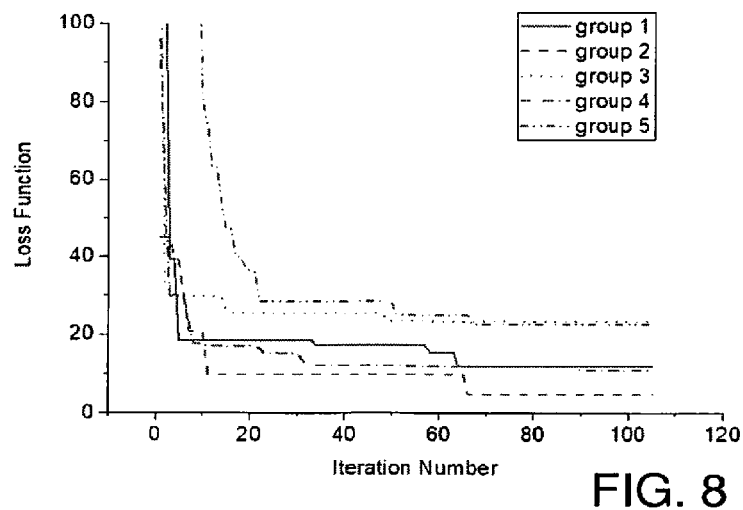
FIG. 8 shows a loss function for the five selected groups shown in Table 1.2.

In the first embodiment of the present invention, the signals until the first cycle is used for the inversion analysis. It is believed that the signal within the first cycle is mostly contributed by the single sinusoidal load. The loss function is chosen to be the sum of L2 norm in the frequency domain and time domain. A permafrost sample with a porosity of 0.4 and a degree of saturation with unfrozen water of 0.2 is considered; the bulk modulus and shear modulus are 36.6 and 45 GPa, respectively. FIG. 7 shows the optimization space for the porosity and degree of saturation with unfrozen water.

Figure 9:
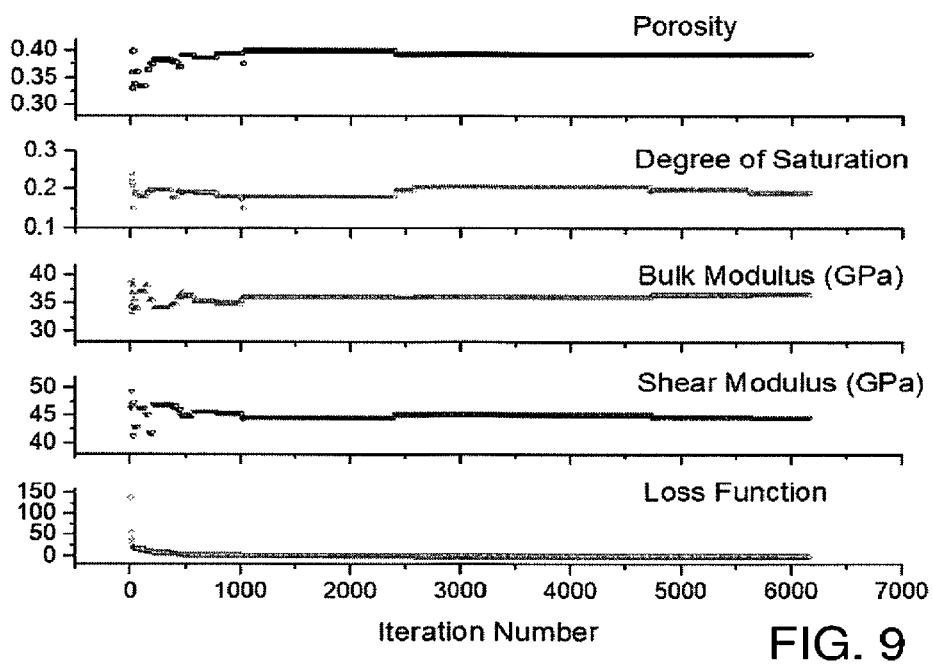
FIG. 9 shows parameter updates with number of iterations.

As shown in FIG. 7, the optimization space is highly non-convex. Direct search in the entire space is almost impossible to find the most optimum soil parameters. To address this issue, the search space is divided into smaller regions. This operation ensures the parameter space is well explored to mitigate the local minima issue for such problems. The porosity interval is defined as: 0.1 to 0.7 with an interval of 0.1; the degree of saturation with unfroze water ranges from 0.05 to 0.95 with an interval of 0.1. The bulk modulus of solid skeleton is defined between 20-80 GPa with an interval of 10 GPa; the shear modulus of solid skeleton varies from 6 to 50 GPa with an interval of 10 GPa. Therefore, the search space is divided into 1620 groups (subspace); as an example, five selected groups are shown in Table 1.2. The search in the subspace is performed based on the Bayesian optimization technique. FIG. 9 shows the loss function variation with iteration numbers for the five selected groups. It can be seen that the loss function in group 2 is minimum. A deep search can be performed inside group 2 for the determination of the most optimum soil parameters.

TABLE 1.2

Inversion results for the five selected groups

| Group Number | φ | $S_r$ | $K_s$ | $\mu_s$ | Minimum loss |
|---|---|---|---|---|---|
| 1 | 0.1-0.2 | 0.15-0.25 | 30-40 | 40-50 | 12.00 |
| 2 | 0.3-0.4 | 0.15-0.25 | 30-40 | 40-50 | 4.79 |
| 3 | 0.4-0.5 | 0.45-0.55 | 30-40 | 40-50 | 23.51 |
| 4 | 0.3-0.4 | 0.45-0.55 | 20-30 | 50-60 | 10.97 |
| 5 | 0.5-0.6 | 0.75-0.85 | 30-40 | 40-50 | 22.68 |

After determining the possible subspace, the differential evolution algorithm is used to find the optimum parameters that most fit the measured signal. The updates of soil parameters including porosity, degree of saturation with ice, bulk modulus, and shear modulus as well as the corresponding loss function are shown in FIG. 9. It can be seen that the differential evolution algorithm successfully determines the real soil parameters: porosity is around 0.4; the degree of saturation with water is around 0.2, the bulk modulus and shear modulus are 36.6 and 45 GPa, respectively.

The visualization of the differential evolution algorithm can be seen in FIG. 10. Initially, the random samples are distributed in the entire space in the first 100 iterations. Then, more samples are generated around the global minimum in the next iterations. In the last generation (roughly 5,500-6,000 iteration), most of the samples are concentrated around the porosity of 0.4, which implies that the differential evolution algorithm effectively locates the global minimum as the iteration number increases.

First Embodiment Methodology: Multiphase Poromechanical Forward Solver

Kinematics Assumptions

The Green-Lagrange strain tensor ($\epsilon_{ij}$) for infinitesimal deformations expressed as displacement vector $u_i^1$, $u_i^2$ and $u_i^3$ for solid skeleton, pore water and pore ice are shown in Equation 1.1.

$$\begin{cases} \epsilon_{ij}^1 = \frac{1}{2}(u_{i,j}^1 + u_{j,i}^1) \\ \epsilon_{ij}^2 = \frac{1}{3}\epsilon_{kk}^2 \delta_{ij}(\epsilon_{kk}^2 = u_{kk}^2) \\ \epsilon_{ij}^3 = \frac{1}{2}(u_{i,j}^3 + u_{j,i}^3) \end{cases} \quad (1.1)$$

where $\delta_{ij}$ is the identity tensor.

The strain tensor of pore water $\epsilon_{ij}^2$ is diagonal since the shear deformation does not exist in pore water component.

Constitutive Model

The constitutive models defined as the relation between the stress and strain tensors for solid skeleton, pore water and pore ice are given in Equation 1.2:

$$\begin{cases} \sigma_{ij}^1 = (K_1\theta_1 + C_{12}\theta_2 + C_{13}\theta_3)\delta_{ij} + 2\mu_1 d_{ij}^1 + \mu_{13} d_{ij}^3 \\ \sigma^2 = C_{12}\theta_1 + K_2\theta_2 + C_{23}\theta_3 \\ \sigma_{ij}^3 = (K_3\theta_3 + C_{23}\theta_2 + C_{13}\theta_1)\delta_{ij} + 2\mu_3 d_{ij}^3 + \mu_{13} d_{ij}^1 \end{cases} \quad (1.2)$$

in which $\sigma^1$, $\sigma^2$ and $\sigma^3$ are the effective stress, pore water pressure and ice pressure, respectively. The definition of each term (e.g., $K_1$, $C_{12}$, $C_{13}$, $\mu_1$, $\mu_{13}$, $K_2$, $C_{23}$, $K_3$, $\mu_3$) in Equation 1.2 is given in Appendix C. The term $\theta_m$, $d_{ij}^m$ and $\epsilon_{ij}^m$ (m, ranging from 1 to 3, represents the different phases) are defined as follows:

$$\begin{cases} \theta_m = \epsilon_{kk}^m \\ d_{ij}^m = \epsilon_{ij}^m - \frac{1}{3}\delta_{ij}\theta_m \\ \epsilon_{ij}^m = \frac{1}{2}(u_{i,j}^m + u_{j,i}^m) \end{cases}.$$

Conservation Laws

The momentum conservation considers the acceleration of each component and the existing relative motion of the pore ice and pore water phases with respect to the solid skeleton. The momentum conservation for the three phases is given by Equation 1.3.

$$\begin{cases} \sigma_{ij,j}^1 = \rho_{11}\ddot{u}_i^1 + \rho_{12}\ddot{u}_i^2 + \rho_{13}\ddot{u}_i^3 - b_{12}(\dot{u}_i^2 - \dot{u}_i^1) - b_{13}(\dot{u}_i^3 - \dot{u}_i^1) \\ \sigma_{,i}^2 = \rho_{12}\ddot{u}_i^1 + \rho_{22}\ddot{u}_i^2 + \rho_{23}\ddot{u}_i^3 + b_{12}(\dot{u}_i^2 - \dot{u}_i^1) + b_{23}(\dot{u}_i^2 - \dot{u}_i^3) \\ \sigma_{ij,j}^3 = \rho_{13}\ddot{u}_i^1 + \rho_{23}\ddot{u}_i^2 + \rho_{33}\ddot{u}_i^3 - b_{23}(\dot{u}_i^2 - \dot{u}_i^1) + b_{13}(\dot{u}_i^3 - \dot{u}_i^1) \end{cases} \quad (1.3)$$

in which the expressions for the density terms ($\rho_{ij}$ or $\bar{\rho}$ in matrix form) and viscous matrix ($b_{ij}$ or $\bar{b}$ in matrix form) are given in Appendix C; $\ddot{u}$ and $\dot{u}$ is represent second and first derivative of displacement vectors with respect to time; the subscript i represents the component in r, $\theta$ and z direction in cylindrical coordinates.

Field Equations

Through the infinitesimal kinematic assumptions, the stress-strain constitutive model and conversation of momentum, the field equation can be written in the matrix form, as shown in Equation 1.4.

$$\bar{\rho}\begin{bmatrix} \ddot{u}_i^1 \\ \ddot{u}_i^2 \\ \ddot{u}_i^3 \end{bmatrix} + \bar{b}\begin{bmatrix} \dot{u}_i^1 \\ \dot{u}_i^2 \\ \dot{u}_i^3 \end{bmatrix} = \bar{R}\nabla\nabla\cdot\begin{bmatrix} u_i^1 \\ u_i^2 \\ u_i^3 \end{bmatrix} - \bar{\mu}\nabla\times\nabla\times\begin{bmatrix} u_i^1 \\ u_i^2 \\ u_i^3 \end{bmatrix}. \quad (1.4)$$

in which the matrix $\bar{R}$ and $\bar{\mu}$ are given in Appendix C.

By performing divergence operation ($\nabla\cdot$) and curl operation ($\nabla\times$) on both sides of Equation 1.4, the field equation in the frequency domain can be written as Equation 1.5.

$$\begin{cases} -\bar{\rho}\omega^2\nabla\cdot\begin{bmatrix} u_i^1 \\ u_i^2 \\ u_i^3 \end{bmatrix} - \bar{b}i\omega\nabla\cdot\begin{bmatrix} u_i^1 \\ u_i^2 \\ u_i^3 \end{bmatrix} = \bar{R}\nabla^2\cdot\begin{bmatrix} u_i^1 \\ u_i^2 \\ u_i^3 \end{bmatrix} \\ -\bar{\rho}\omega^2\nabla\times\begin{bmatrix} u_i^1 \\ u_i^2 \\ u_i^3 \end{bmatrix} - \bar{b}i\omega\nabla\times\begin{bmatrix} u_i^1 \\ u_i^2 \\ u_i^3 \end{bmatrix} = \bar{\mu}\nabla^2\nabla\times\begin{bmatrix} u_i^1 \\ u_i^2 \\ u_i^3 \end{bmatrix} \end{cases} \quad (1.5)$$

Using the Helmholtz decomposition theorem allows us to decompose the displacement field, u (equivalent to $u_i$), into the longitudinal potential and transverse vector components as follows, $$\begin{cases} \bar{u}^1 = \nabla\phi_1 + \nabla\times\bar{\psi}_1 \text{ and } \nabla\cdot\bar{\psi}_1 = 0 \\ \bar{u}^2 = \nabla\phi_2 + \nabla\times\bar{\psi}_2 \text{ and } \nabla\cdot\bar{\psi}_2 = 0 \\ \bar{u}^3 = \nabla\phi_3 + \nabla\times\bar{\psi}_3 \text{ and } \nabla\cdot\bar{\psi}_3 = 0 \end{cases} \quad (1.6)$$

By substituting Equation 1.6 into the field equation of motion, Equation 1.5, we obtain two sets of uncoupled partial differential equations relative to the compressional wave P related to the Helmholtz scalar potentials, and to the shear wave S related to the Helmholtz vector potential, respectively (Equation 1.7). In the axi-symmetric condition, only the second components exits in vector $\bar{\psi}$, which is denoted as $\psi$ in the future. It should be mentioned that the field equations in Laplace domain can be easily obtained by replacing $\omega$ with is ($i^2=-1$ and s the Laplace variable).

$$\begin{cases} -\bar{\rho}\omega^2\begin{bmatrix} \phi_1 \\ \phi_2 \\ \phi_3 \end{bmatrix} - \bar{b}i\omega\begin{bmatrix} \phi_1 \\ \phi_2 \\ \phi_3 \end{bmatrix} = \bar{R}\nabla^2\begin{bmatrix} \phi_1 \\ \phi_2 \\ \phi_3 \end{bmatrix} \\ -\bar{\rho}\omega^2\begin{bmatrix} \psi_1 \\ \psi_2 \\ \psi_3 \end{bmatrix} - \bar{b}i\omega\begin{bmatrix} \psi_1 \\ \psi_2 \\ \psi_3 \end{bmatrix} = \bar{\mu}\nabla^2\begin{bmatrix} \psi_1 \\ \psi_2 \\ \psi_3 \end{bmatrix} \end{cases} \quad (1.7)$$

Solution for Dilation Wave (P Waves) Using Eigendecomposition

Equation (1.7) shows that $\phi_1$, $\phi_2$ and $\phi_3$ are coupled in the field equations. The diagonalization of such a matrix is required to decouple the system. Equation (1.7) is then rearranged into Equation (1.8):

$$\nabla^2\begin{bmatrix} \phi_1 \\ \phi_2 \\ \phi_3 \end{bmatrix} = \underbrace{-\bar{R}^{-1}(\bar{\rho}\omega^2 + \bar{b}i\omega)}_{\bar{K}}\begin{bmatrix} \phi_1 \\ \phi_2 \\ \phi_3 \end{bmatrix} \quad (1.8)$$

where the $\overline{K}$ matrix can be rewritten using the Eigen decomposition:

$$\overline{K}=\overline{P}\overline{D}\overline{P}^{-1} \quad (1.9)$$

where $\overline{P}$ is the eigenvector and $\overline{D}$ is the eigenvalue matrix of $\overline{K}$.

By setting $\overline{\phi}=\overline{P}\overline{y}$, where $\overline{y}=[\phi_{p1}, \phi_{p2}, \phi_{p3}]$, we can obtain $\nabla^2\overline{y}=\overline{D}\overline{y}$. The equation of longitudinal wave has been decoupled. In cylindrical coordinates, the solution for $\overline{y}=[\phi_{p1}, \phi_{p2}, \phi_{p3}]$ is summarized as follows:

$$\begin{cases} \phi_{p1}(r,z) = Ae^{-\sqrt{k^2+D_{11}}\,z}J_0(kr) \\ \phi_{p2}(r,z) = Be^{-\sqrt{k^2+D_{22}}\,z}J_0(kr) \\ \phi_{p3}(r,z) = Ce^{-\sqrt{k^2+D_{33}}\,z}J_0(kr) \end{cases} \quad (1.10)$$

where k is the wave number; coefficient A, B and C will be determined by boundary conditions; $D_{11}$, $D_{22}$, and $D_{33}$ are the diagonal components of $\overline{D}$; $J_0$ is the Bessel function of the first kind. For simplicity, The term $\sqrt{k^2+D_{11}}$, $\sqrt{k^2+D_{22}}$ and $\sqrt{k^2+D_{33}}$ is denoted as $k_{p1}$, $k_{p2}$ and $k_{p3}$, respectively.

Now, the P wave potentials can be written as:

$$\begin{Bmatrix} \phi_1 \\ \phi_2 \\ \phi_3 \end{Bmatrix} = \begin{Bmatrix} p_{11} & p_{12} & p_{13} \\ p_{21} & p_{22} & p_{23} \\ p_{31} & p_{32} & p_{33} \end{Bmatrix} \begin{Bmatrix} \phi_{p1} \\ \phi_{p2} \\ \phi_{p3} \end{Bmatrix} \quad (1.11)$$

where $p_{ij}$ are the components for the eigenvector of $\overline{P}$.

Solution for Rotational Wave (S Wave)

The solutions for the S wave potentials can be solved in a similar manner. The Equation 1.12 is firstly rearranged into Equation 1.13:

$$-\overline{\rho}\omega^2\begin{bmatrix}\psi_1\\\psi_2\\\psi_3\end{bmatrix} - \overline{b}i\omega\begin{bmatrix}\psi_1\\\psi_2\\\psi_3\end{bmatrix} = \overline{\mu}\nabla^2\begin{bmatrix}\psi_1\\\psi_2\\\psi_3\end{bmatrix} \quad (1.12)$$

$$\underbrace{\frac{-\overline{\rho}\omega^2 - \overline{b}i\omega}{\overline{A}}}\begin{bmatrix}\psi_1\\\psi_2\\\psi_3\end{bmatrix} = \overline{\mu}\nabla^2\begin{bmatrix}\psi_1\\\psi_2\\\psi_3\end{bmatrix} \quad (1.13)$$

Since $\psi_w$ can be expressed as a function of $\psi_s$ and $\psi_i$ (shown in Equation 1.14), the Equation 1.13 is further simplified and rearranged into Equation 1.15.

$$\begin{cases} A_{21}\psi_1 + A_{22}\psi_2 + A_{23}\psi_3 = 0 \\ \psi_2 = -\dfrac{A_{21}\psi_1 + A_{23}\psi_3}{A_{22}} \end{cases} \quad (1.14)$$

$$\nabla^2\begin{bmatrix}\psi_1\\\psi_3\end{bmatrix} = \underbrace{\begin{bmatrix}\mu_{11} & \mu_{13}\\ \mu_{13} & \mu_{33}\end{bmatrix}^{-1}\overline{C}}_{\overline{N}}\begin{bmatrix}\psi_1\\\psi_3\end{bmatrix}. \quad (1.15)$$

where $\overline{C} = \begin{pmatrix} A_{11} - \dfrac{A_{12}A_{21}}{A_{22}} & A_{13} - \dfrac{A_{12}A_{23}}{A_{22}} \\ A_{31} - \dfrac{A_{32}A_{21}}{A_{22}} & A_{33} - \dfrac{A_{32}A_{23}}{A_{22}} \end{pmatrix}$ The $\overline{N}$ matrix can be rewritten using the eigen decomposition ($\overline{N}=\overline{Q}\,\overline{G}\,\overline{Q}^{-1}$), where $\overline{Q}$ is the eigenvector and $\overline{G}$ is the eigenvalue matrix of $\overline{N}$. By setting $\overline{\psi}=\overline{Q}\,\overline{y}'$ where $\overline{y}'=[\psi_{s1}, \psi_{i1}]$, we can obtain:

$$\psi_{s1} = Ee^{-\sqrt{k^2+G_{11}}\,z}J_1(kr) \quad (1.16)$$

$$\psi_{i1} = Fe^{-\sqrt{k^2+G_{22}}\,z}J_1(kr) \quad (1.17)$$

where $J_1$ is the Bessel function of the first in with order 1. $G_{11}$ an $G_{22}$ are the diagonal components of matrix $\overline{G}$. For simplicity, the term $\sqrt{k^2+G_{11}}$ and $\sqrt{k^2+G_{22}}$ is denoted as $k_{s1}$ and $k_{s2}$.

Finally, the solution of S wave potentials can be written as:

$$\begin{Bmatrix}\psi_1\\\psi_3\end{Bmatrix} = \begin{Bmatrix}Q_{11} & Q_{12}\\Q_{21} & Q_{22}\end{Bmatrix}\begin{Bmatrix}\psi_{s1}\\\psi_{i1}\end{Bmatrix} \quad (1.18)$$

where $Q_{ij}$ are the components for eigenvector of $\overline{Q}$.

Layer Element with Finite Length

By including both incident wave and reflected wave, the potentials for a layer with finite thickness can be written in Equation 1.19:

$$\begin{bmatrix} u_{r1}^1 \\ u_{z1}^1 \\ u_{r1}^2 \\ u_{r1}^3 \\ u_{r1}^3 \\ u_{z1}^3 \\ u_{r2}^1 \\ u_{z2}^1 \\ u_{r2}^2 \\ u_{r2}^3 \\ u_{z2}^3 \end{bmatrix} = [S_1] \begin{bmatrix} A_1 \\ B_1 \\ C_1 \\ E_1 \\ F_1 \\ A_2 \\ B_2 \\ C_2 \\ E_2 \\ F_2 \end{bmatrix} \quad (1.19)$$

where the components of $S_1$ is given in Appendix D; the subscript 1 and 2 represent the nodes for the upper and lower layer, respectively. The coefficient A to F is determined by the boundary condition.

The matrix of effective stress, pore water pressure and pore ice pressure in the frequency domain is shown in Equation 1.20 in which the components for matrix $S_2$ can be found in the Appendix D.

$$\begin{bmatrix} \sigma_{r1}^1 \\ \sigma_{z1}^1 \\ p_1 \\ \sigma_{r1}^3 \\ \sigma_{z1}^3 \\ \sigma_{r2}^1 \\ \sigma_{z2}^1 \\ p_2 \\ \sigma_{r2}^3 \\ \sigma_{z2}^3 \end{bmatrix} = [S_2] \begin{bmatrix} A_1 \\ B_1 \\ C_1 \\ E_1 \\ F_1 \\ A_2 \\ B_2 \\ C_2 \\ E_2 \\ F_2 \end{bmatrix} \quad (1.20)$$

According to the Cauchy stress principle, the traction force (T) is taken as the dot product between the stress tensor and the unit vector along the outward normal direction. Due to the convection that the upward direction is negative, the upper boundary becomes negative. Similarly, to make the sign consistent, the N matrix is applied to matrix $S_2 \cdot S_1^{-1}$. In the future, the matrix $N \cdot S_2 \cdot S_1^{-1}$ will be denoted as the G matrix.

$$\begin{bmatrix} T_{r1}^1 \\ T_{z1}^1 \\ T_1 \\ T_{r1}^3 \\ T_{z1}^3 \\ T_{r2}^1 \\ T_{z2}^1 \\ T_2 \\ T_{r2}^3 \\ T_{z2}^3 \end{bmatrix} = \begin{bmatrix} -\sigma_{r1}^1 \\ -\sigma_{z1}^1 \\ -p_1 \\ -\sigma_{r1}^3 \\ -\sigma_{z1}^3 \\ \sigma_{r2}^1 \\ \sigma_{z2}^1 \\ p_2 \\ \sigma_{r2}^3 \\ \sigma_{z2}^3 \end{bmatrix} = \underbrace{N \cdot S_2 \cdot S_1^{-1}}_{G} \cdot \begin{bmatrix} u_{r1}^1 \\ u_{z1}^1 \\ u_{r1}^2 \\ u_{r1}^3 \\ u_{z1}^3 \\ u_{r2}^1 \\ u_{z2}^1 \\ u_{z2}^2 \\ u_{r2}^3 \\ u_{z2}^3 \end{bmatrix} \text{ where } \quad (1.21)$$

$$N = \begin{bmatrix} -1 & 0 & 0 & 0 & 0 & 0 & 0 & 0 & 0 & 0 \\ 0 & -1 & 0 & 0 & 0 & 0 & 0 & 0 & 0 & 0 \\ 0 & 0 & -1 & 0 & 0 & 0 & 0 & 0 & 0 & 0 \\ 0 & 0 & 0 & -1 & 0 & 0 & 0 & 0 & 0 & 0 \\ 0 & 0 & 0 & 0 & -1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{bmatrix} \quad (1.22)$$

Ultrasonic Response in Time Domain

In the ultrasonic tests, a vertical impulse load $f(t, r)$ is applied to one end of the soil specimen. The surface is assumed to be permeable, which implies the pore water pressure at the surface is zero. Under such conditions, the displacements in the frequency domain can be written as:

$$\begin{bmatrix} 0 \\ \hat{f}(s,r) \\ \vdots \\ 0 \end{bmatrix} = [G] \begin{bmatrix} u_{r1}^1 \\ u_{z1}^1 \\ \vdots \\ u_{z2}^3 \end{bmatrix} \quad (1.23)$$

The impulse load $f$ is defined in time domain and can be decomposed into two independent functions in terms of time variable $f_n(t)$ and radial variable $f_r(t)$:

$$f(t,r) = f_n(t) f_r(t) \quad (1.24)$$

The mathematical expression for the function $f_n(t)$ depends mainly on the type of impulse loads created by a signal generator. In this example, a sinusoidal impulse function is used as the external load to simulate the applied load. The load with amplitude of one is mathematically described in Equation (1.25).

$$f_n(t) = \sin(2\pi f t)[1 - H(t - 1/f)] \quad (1.25)$$

where t(s) is time and $f$(Hz) is the frequency; H( ) is the Heaviside step function. The radial component of the applied load decomposed from the external load is defined as:

$$f_r(r) = \sum_{m=1}^{\infty} F_m J_0(k_m r) \text{ where} \quad (1.26)$$

$$F_m(m) = \frac{2 r_0 \sin(r_0 k_m)}{r_\infty^2 k_m J_1^2(r_\infty k_m)}$$

where $r_0$ is the radius of the contacting area of the ultrasonic transmitter; n is the total mode number; $r_\infty$ is the diameter of the soil sample.

First Embodiment Methodology: Inversion Through Pre-Search and Deep-Search

Objective Function

In this embodiment, the Euclidean norm is used to construct the objective function. The problem is formulated as the following form:

$$\begin{cases} \text{minimize } f(x) = \frac{1}{2} \sum_{i=1}^{N} (y_i - \overline{y}_i(x))^2 \\ \text{subject to } a_i \leq x_i \leq b_i, i = 1, \ldots m \end{cases} \quad (1.27)$$

where $x = (x_1, x_2, \ldots x_m)$ is the optimization variable; $f(x)$ is the objective function; the constant $a_i$ and $b_i$ are limits or bounds for each variable.

Optimization Method

The update process can be achieved through the gradient-based and gradient-free optimization method. The gradient-based optimization is efficient in large convex problems such as linear least square problems and are commonly used in large optimization problems (e.g. deep learning and adjoint method). Therefore, the gradient based method is preferred in most cases, especially for convex optimization problems.

However, Due to the complex and highly non-linear nature of the forward model, the inversion through the gradient-based optimization becomes almost impossible. Hence, the pre-search is performed using the Bayesian optimization method [1.15]. To address the issue of shallow dimension update (especially for ice content and porosity), the search space is divided into smaller regions. Such operation ensures the parameter space is well explored to avoid the local minimum issue for such problems. The pre-search is performed by Bayesian optimization method. The Bayesian optimization algorithm applies Gaussian process to randomly sample the cost function to avoid the local minimum. It is particularly suitable for objective function that are expensive to evaluate and highly non-convex. Instead of evaluating the cost at each trial point, Bayesian optimization method minimize the number of objective function evaluations through acquisition function [1.1]. After sampling the objective function, the Gaussian process is updated to determine the next point to evaluate. Therefore, the Bayesian optimization can be used to rapidly determine the possible regions (or subspace) where the optimum soil parameters exit.

Deep-search is performed using differential evolution algorithm. Such an algorithm re-quires fewer control variables in comparison to other algorithms (e.g., genetic algorithm) and can be easily implemented in parallel computation [1.14]. In this method, A population of candidate solutions are generated randomly; Then, by moving around in the search space through a combination of the existing temporary solutions, a series of better solutions is expected to be obtained. In the differential evolution, the mutation constant is taken in the range of 0.5 to 1 and the recombination constant is recommended to be 0.9 [1.14].

First Embodiment Summary

In the forgoing embodiment, a novel spectral element-based poromechanical model was developed for ultrasonic wave propagation through permafrost. The ultrasonic waves can be easily generated by means of a simple Ultrasonic Pulse Velocity (UPV) setup in a geotechnical laboratory or in the field. The developed solution predicts the signal obtained at the receiver when the soil specimen is subjected to an ultrasonic impulse load. By matching the measured signal from the receiver and the predicted response, the soil properties can be derived inversely through the proposed machine learning algorithms. It was found that such an inversion analysis is highly non-convex. Therefore, the optimization procedure was divided into pre-search and deep-search. The pre-search was performed using Bayesian optimization to determine the possible subspace in which the prediction matches the measurement to the largest extent. Then, the deep-search for the most optimum solution was performed using a differential evolution algorithm inside the subspace determined by pre-search. Based on the case studies, it was proved that the developed integrated algorithm can be successfully used to determine the permafrost properties such as ice content, porosity, and P and S wave velocities using UPV measurements.

Second Working Embodiment (Frozen Soil & Permafrost)

In ultrasonic tests, an ultrasonic transmitter transforms electrical energy into mechanical energy (piezoelectric effect) to generate stress waves within a soil sample. However, the exact induced mechanical energy (force) still remains unknown due to the complexity of piezoelectric behavior and transducer structure. The preceding embodiment placed primary focus on the mechanism of wave propagation within frozen soils with assumed input force as boundary conditions, leaving room for improved accuracy in the interpretation of the ultrasonic signals.

The ultrasonic setup in the second embodiment once again includes a function generator, receiver amplifier, oscilloscope, ultrasonic transmitter and receiver. The ultrasonic setup is summarized in FIG. 12A, and differs from those of FIGS. 1A & 1B in that the permafrost or frozen soil sample is substituted for a calibration object during an extra calibration step employed in the second embodiment methodology. FIG. 12B illustrates the components of an ultrasonic transducer, mainly the matching layer, a piezoelectric element and backing material. The matching layer reduces the reflection of transmitted waves so that the acoustic waves can efficiently enter the object. With an applied electrical impulse, the piezoelectric element generates a mechanical force that depends on the design of the backing material, matching layer and other components. The backing material (a highly attenuative and very dense material) is used to reduce the vibration of the transducer crystal by absorbing the energy that radiates from the back face of the piezoelectric element [2.28]. Due to the complexity of the ultrasonic transducer and the contact surface between the transducer and soil sample, the induced force generated by the ultrasonic transmitter cannot be determined reliably (FIG. 12C). The function waveform generator applies direct digital-synthesis techniques to create a stable, accurate output signal for the ultrasonic test. An applied electrical charge is transmitted to the ultrasonic transmitter to generate the mechanical energy used in the ultrasonic test (FIG. 12C). The ultrasonic wave travels through the soil sample (FIG. 12D) and is captured by an ultrasonic receiver which transforms the displacement into electrical output (FIG. 12E). Due to the attenuation of waves propagating within soil and water, a receiver amplifier is needed to reduce the noise content in the ultrasonic measurement. The input and output signals are displayed and exported through an oscilloscope.

In the QUS system of the second embodiment, the output voltage measured at the ultrasonic receiver can be related to the input voltage exciting the ultrasonic transducer in the frequency domain, as shown in Equation 2.1:

$$\underbrace{\frac{\text{Force}(\omega)}{\text{Voltage}_{in}(\omega)}}_{H_1} \times \underbrace{\frac{\text{Displacement}(\omega)}{\text{Force}(\omega)}}_{H_2} \times \underbrace{\frac{\text{Voltage}_{out}(\omega)}{\text{Displacement}(\omega)}}_{H_3} = \underbrace{\frac{\text{Voltage}_{out}(\omega)}{\text{Voltage}_{in}(\omega)}}_{H_4} \quad (2.1)$$

With continued reference to FIG. 12, the transfer function $H_2$, which is calculated by means of a modified second embodiment of the spectral element multiphase poromechanical solver, is defined in Equation 2.4 further below. The transfer function $H_2$ is dependent on the properties of the soil sample, sample geometry, and the transducer diameter. Based on Equation 2.4, the transfer function $H_2$ is independent of the distribution of the applied force to the soil sample in both time and frequency domains. Hence, in the ultrasonic sensing system (as explained in FIG. 12 and Equation 2.1), the transfer function $H_2$ can be determined given the testing material properties, sample geometry and transducer diameter. The transfer function $H_4$ can be measured based on the input and output electrical signals in the frequency domain. Therefore, despite the unknown induced force of the ultrasonic transmitter under an electrical impulse, we can still determine the product of $H_1$ and $H_3$ given the transfer function $H_2$.

In a calibration process that proceeds testing of a permafrost or frozen soil sample in the second embodiment, firstly a calibration object of known material properties (e.g. a calibration bar of polymethyl methacrylate with the P-wave and S-wave velocities of 2,717 m/s and 1,516 m/s, respectively, and the density of 2,400 kg/m$^3$ [2.31]) is used to obtain the transfer function $H_2$. With the measured transfer function $H_4$, one can finally determine the product of the transfer functions $H_1$ and $H_3$ from this calibration process. FIGS. 13A and 13B show the ultrasonic input and output signals at the transmitter and receiver location during the calibration process, respectively. FIG. 13C summarizes the transfer function $H_4$ (calculated using the ultrasonic output signal divided by the input signal in the frequency domain), transfer function $H_2$ (calculated using the spectral element multiphase poromechanical solver given the above-mentioned material properties) and consequently the product of $H_1$ and $H_3$ by dividing $H_4$ by $H_2$. The product of $H_1$ and $H_3$ physically and quantitatively describes the transformation from electrical energy to mechanical energy (transmitter) and vice versa (receiver). The product of $H_1$ and $H_3$ depends on the inherent properties of the ultrasonic transducer components. Therefore, under the same electrical input, the product of $H_1$ and $H_3$ is believed to have the same distribution regardless the type of the test samples.

Different soil types including clay, silt, and till (a mix of clay, silt, sand, and limestone) were used to demonstrate the robustness of the proposed QUS setup in characterizing frozen soils. The soils were reconstituted and saturated to minimize the inhomogeneity of the soil samples. Some specimens extracted from the different saturated soil samples were dried in an oven at 110° C. for three days based on the ASTM standards [2.9] to determine the initial porosity of those samples. These samples were then under different isothermal freezing conditions (−20° C., −10° C. and −2° C.) prior to the ultrasonic test. All the frozen soil samples were 170 mm in length and 100 mm in diameter. A summary of the ultrasonic test program including the soil type, temperature and initial porosity of each sample is given in Table 2.1.

TABLE 2.1

Summary of the test soil type, temperature and initial porosity of each sample
Ultrasonic test program

| | Soil type | | | | | |
|---|---|---|---|---|---|---|
| | Clay | | | Silt | | Till |
| | Temperature | | | | | |
| | −20° C. | −10° C. | −2° C. | −20° C. | −2° C. | −20° C. |
| Initial porosity | 0.57 | 0.57 | 0.60 | 0.33 | 0.33 | 0.28 |

Figure 14A:
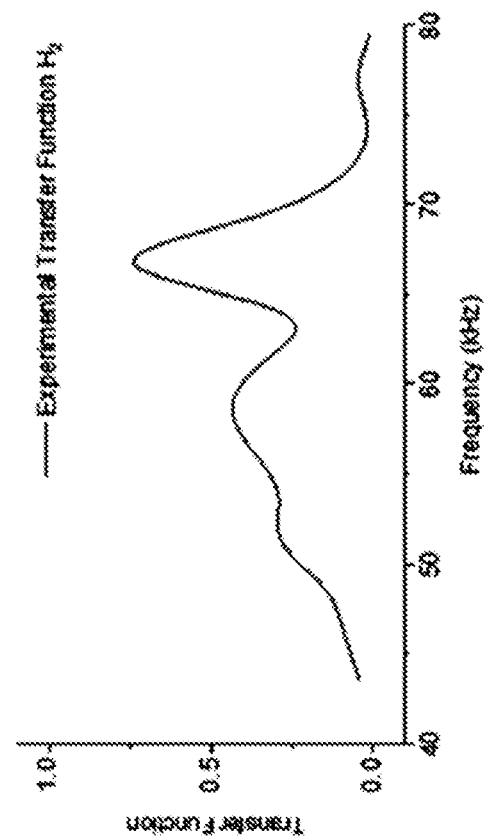
FIG. 14A shows ultrasonic input and output signals at the transmitter and receiver locations of the QUS system, respectively, for a clay soil test sample at −20° C.
Figure 14B:
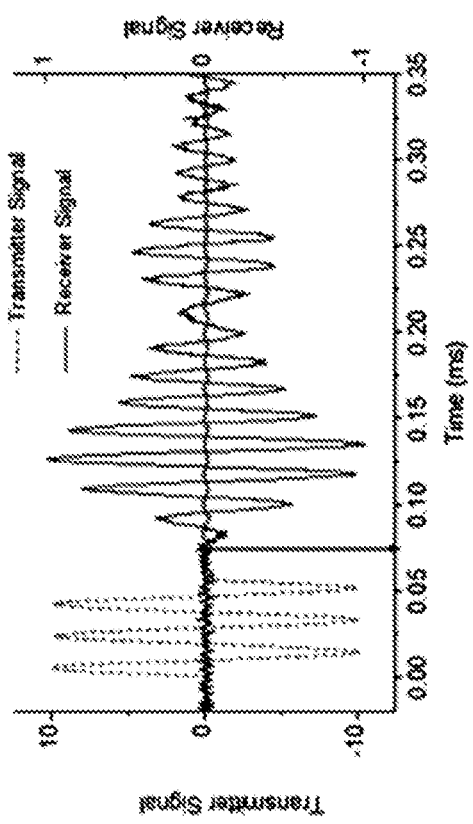
FIG. 14B shows a transfer function $H_4$ (ultrasonic output divided by input signal in frequency domain) for the clay soil test sample at −20° C.
Figure 14C:
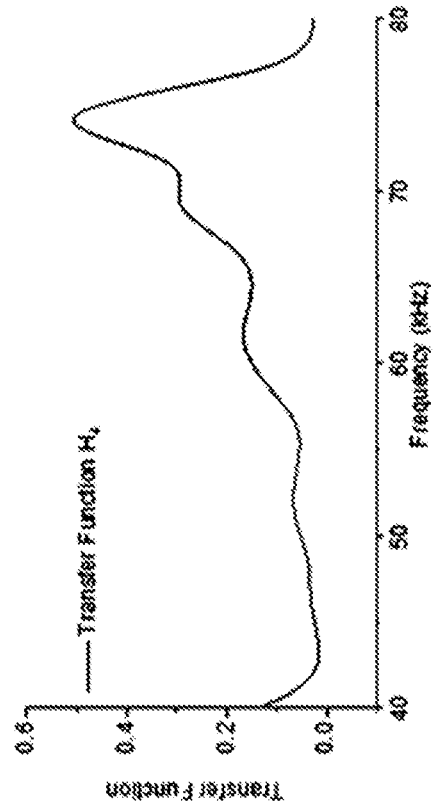
FIG. 14C shows normalized experimental transfer function $H_2$ (transfer function $H_4$ divided by $H_1H_3$) for the clay soil test sample at −20° C.
Figure 16C:
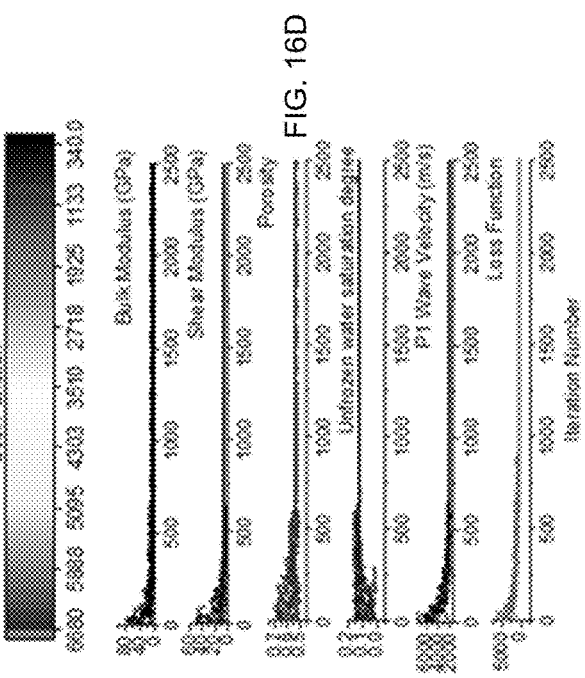
FIG. 16C shows sampling points in the subspace between the degree of saturation of unfrozen water and porosity.
Figure 16D:
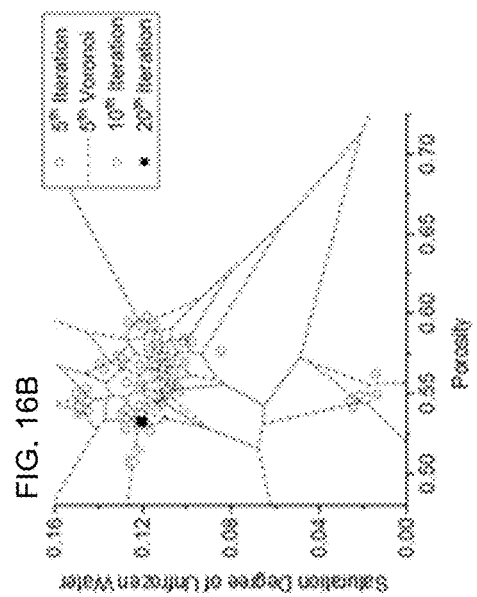
FIG. 16D shows updates of each parameter through the Neighborhood algorithm as well as the loss function, plotted against iteration number on the X-axis.
Figure 16A:
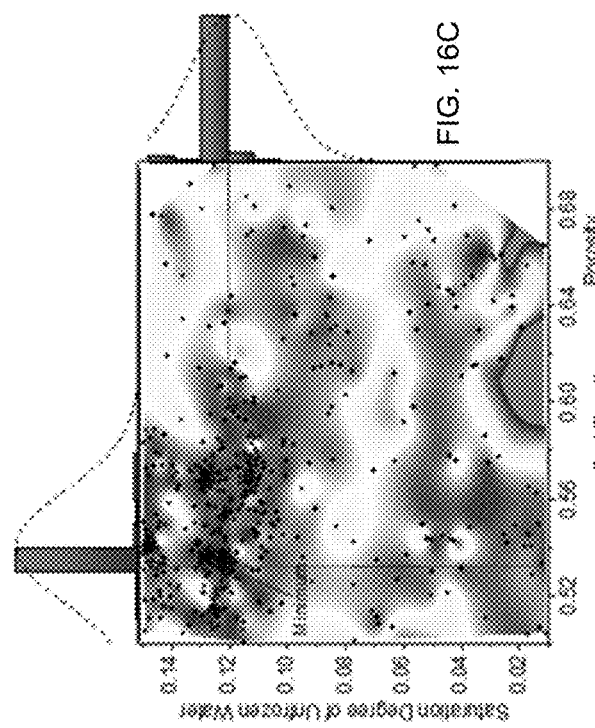
FIGS. 16A and 16B show visualization of a Neighborhood algorithm searching method at $1^{st}$, $2^{nd}$, $5^{th}$ and $20^{th}$ iterations of the iterative inversion of the second candidate cluster from the spectral element multiphase poromechanical solver for the clay soil test sample at −20° C.
Figure 16B:
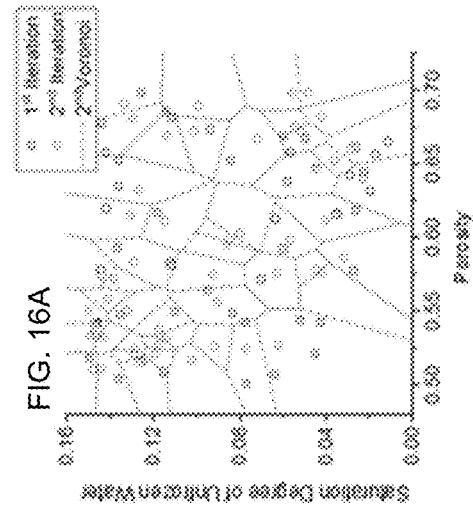

The initial water content of the clay soil was measure as 0.503. Based on the specific gravity of most clay minerals (ranging from 2 to 3 g/cm$^3$, but normally around 2.65 g/cm$^3$ [2.1]), the initial porosity of the sample was most likely around 0.57. The ultrasonic test was performed firstly on the clay sample at a freezing temperature of −20° C. The ultrasonic transmitter applied a sinusoidal impulse with a frequency of 54 kHz to the left end of the sample. FIG. 14A shows the ultrasonic input signal (at the transmitter location) and the output signal (at the receiver location). The first arrival time of the P1 wave is 0.75 ms and subsequently the P1 wave velocity can be obtained as 2,433 m/s (travelling distance (sample's height), divided by the first arrival time). FIG. 14B shows the transfer function $H_4$ based on the ultrasonic input and output signals. The transfer function $H_4$ shows that the ultrasonic measurement mostly concentrates at a frequency bandwidth between 65 kHz and 78 kHz. With the product of the transfer functions $H_1$ and $H_3$, determined in the previous calibration process, the experimental transfer function $H_2$ (FIG. 14C) was obtained and represents the inherent properties of the testing frozen soil sample at −20° C.

FIG. 15A shows the comparison between the experimental measurement and numerical predictions of the transfer function $H_2$ for two selected candidate clusters showing the most optimum properties of the clay sample at −20° C. The theoretical transfer function $H_2$ obtained by means of the spectral element multiphase poromechanical solver showed a good agreement with the experimental measurement. FIG. 15B and FIG. 15C show the top two candidate clusters (the subspace between the porosity and degree of saturation of unfrozen water as well as the subspace between the bulk modulus and shear modulus, respectively) that resulted from the inversion procedures based on the ranking of the loss function. The two components of the loss function, as defined in Equation 2.5 further below, are the difference between the experimental and theoretical P1 wave velocities (the theoretical value is given in Appendix A) and the experimental and theoretical transfer functions $H_2$, respectively. Both the P1 wave velocity and transfer function $H_2$ are independent of the force applied to the soil sample by the transducer but dependent on the properties of the test soil sample. The results, as presented in FIGS. 15B and 15C, show that the top two candidate clusters predict similar P1 wave velocity. FIG. 15A also illustrates that those two clusters predict similar transfer functions $H_2$. The predicted P1 wave velocity in those two clusters (2,199 m/s and 2,200 m/s for the candidates 1 and 2, respectively) was sufficiently close to the measured P wave velocity (2,267 m/s).

Non-uniqueness and uncertainty were recognized in the inversion results due to the highly nonlinear and non-convex nature of the inverse poromechanical problem. The optimization space (composed of bulk modulus [K], shear modulus [G], porosity [n], the degree of saturation of unfrozen water [$S_r$]) was highly non-convex. Direct search in the entire space was almost impossible to find the most optimum soil parameters for test samples. To address this issue, the search space was divided into smaller subspaces, which ensures the parameter space is well explored to mitigate the local minimum issue. The inversion algorithm determines multiple possible solutions for the sample properties based on the measured P1 wave velocity and the transfer function $H_2$.

The first candidate cluster as shown in FIG. 15B and FIG. 15C was concentrated to a porosity of 0.46, degree of saturation of unfrozen water of 93%, a bulk modulus of 10.3 GPa, and a shear modulus of 11.6 GPa. The second candidate cluster had an average porosity of 0.53, degree of saturation of unfrozen water of 12%, a bulk modulus of 6.3 GPa, and a shear modulus of 5.9 GPa. These two candidates were acceptable solutions, since they both showed excellent agreement with the measured P1 wave velocity and transfer function $H_2$. However, additional information, such as test temperature, soil types, soil moisture characteristics, or other complementary conventional characterization tests, could be used to add more constraints to the solution and to more accurately select the most probable solution. In this case, the measurement was taken at a temperature of −20° C. The first candidate cluster was not a plausible true solution given its extremely high degree of saturation of unfrozen water at −20° C., despite the fact that it had a relatively smaller loss function than the second candidate. It was found that the second candidate cluster was also consistent with prior geotechnical testing (porosity ranges from 0.5-0.6). Within the candidate 2 cluster, the predicted porosity ranged from 0.52 to 0.53; the degree of saturation of unfrozen water ranges from 12% to 15%; the bulk modulus of solid skeleton was between 6.2 GPa and 6.8 GPa, and the shear modulus of solid skeleton ranged from 5.9 GPa to 6.2 GPa. Other physical properties such as the degree of saturation of ice, volumetric water content and volumetric ice content could also be obtained based on the porosity and degree of saturation of unfrozen water.

FIG. 16 illustrates the inversion process in the second embodiment by means of a Neighborhood algorithm for the second candidate cluster. FIG. 16A shows that the Neighborhood algorithm generates random search points to cover the searching space in the first step. By means of the Voronoi decomposition, more sampling points were generated around the locations where the loss function is relatively smaller than that in other locations (FIG. 16B). Within 20 iterations, the searching space is converged to the minimum location (FIG. 16B). The sampling points between the degree of saturation of unfrozen water and porosity are summarized in FIG. 16C. It shows that the solution is converged to a point where the degree of saturation of unfrozen water is 12% and the porosity is 0.53. The updates of each parameter (porosity, degree of saturation of unfrozen water, bulk modulus and shear modulus of the solid skeleton) are shown in FIG. 16D. The iteration number in FIG. 16D represents the number of times that the forward problem was solved independently. The loss function was reduced from 6000 to 335 in 100 iterations.

The ultrasonic test was also performed for the same clay soil sample at a freezing temperature of −10° C. using the same setup and input electrical signals. FIG. 17A illustrates the ultrasonic input and output signals in the time domain.

FIG. 17B shows the experimental transfer function $H_2$. The measured P1 wave velocity was 1,976 m/s. FIGS. 17C and 17D show the density contours of the top two candidate clusters that had the lowest loss function in comparison with other searching points in the subspace between the degree of saturation of unfrozen water and porosity as well as the subspace between shear modulus and bulk modulus, respectively. In the first candidate cluster, the degree of saturation of unfrozen water and porosity converged to 11% and 0.47, respectively. The shear modulus and bulk modulus were also converged to 4.4 and 7.4 GPa, respectively. In the second candidate cluster, the degree of saturation of unfrozen water and porosity converged to 18% and 0.45, respectively. The shear modulus and bulk modulus were converged to 5.4 and 6.0 GPa, respectively. The results showed that the predicted P1 wave velocity (1,970 m/s) in the second candidate cluster matched better with the measured P1 wave velocity (1,976 m/s) in comparison with the first candidate cluster (even though the overall loss function was relatively smaller in candidate 1 due to the contribution of the transfer function $H_2$ component). Theoretically, both candidates were acceptable for the prediction of the properties of the frozen soil sample. However, with the previous measurement under −20° C., it was expected that the degree of saturation of unfrozen water increases with increasing temperature. The degree of saturation of unfrozen water at −20° C. was 12%. Under the current freezing temperature of −10° C., candidates 1 and 2 predicted a degree of saturation of unfrozen water of 11% and 18%, respectively. Therefore, it was most likely that the test sample had the following properties: a shear modulus of solid skeleton of 5.4 GPa, a bulk modulus of solid skeleton of 6.0 GPa, a porosity of 0.45, and a degree of saturation of unfrozen water of 18%.

As mentioned previously, the ultrasonic tests were also performed for the silt and till soil samples under −20°. FIG. 19 summarizes the ultrasonic measurements, the experimental transfer function $H_2$ and the top two candidate clusters that had the lowest loss functions for the silt soil sample. Based on the traditional geotechnical tests performed in the laboratory, the initial porosity of the silt sample was around 0.33. The candidate 1 cluster determined by the interative inversion of the multiphase poromechanical algorithm, shown in FIGS. 19C and 19D, represented the properties of the frozen silt soil sample as follows: a shear modulus of solid skeleton of 12.2 GPa, a bulk modulus of solid skeleton of 12.4 GPa, a porosity of 0.30, and a degree of saturation of unfrozen water of 11%. Similarly, FIG. 20 shows the ultrasonic measurements, the experimental transfer function $H_2$ and the top two candidate clusters that had the lowest loss functions for the till soil sample. The initial porosity of the till sample was around 0.28 based on the traditional geotechnical tests performed in the laboratory. The candidate 1 cluster determined by the iterative inversion of the multiphase poromechanical algorithm, shown in FIGS. 20C and 20D, represented the properties of the frozen till soil sample as follows: a shear modulus of solid skeleton of 10.9 GPa, a bulk modulus of solid skeleton of 20.5 GPa, a porosity of 0.28, and a degree of saturation of unfrozen water of 6.7%.

The ultrasonic test was also performed for the silt and clay samples under a freezing temperature of −2° C. FIG. 21 shows the ultrasonic measurements, the experimental transfer function $H_2$ and the top two candidate clusters that have the lowest loss functions for the silt soil sample under −2° C. Based on the conventional geotechnical tests performed in the laboratory to determine the porosity and previous ultrasonic test results at −20° C., the candidate 1 cluster determined by the interative inversion of the multiphase poromechanical algorithm, shown in FIGS. 21C and 21D, represented the properties of the silt sample at −2° C. as follows: a shear modulus of solid skeleton of 10 GPa, a bulk modulus of solid skeleton of 12 GPa, a porosity of 0.25, and a degree of saturation of unfrozen water of 26%. Similarly, FIG. 22 shows the ultrasonic measurements, the experimental transfer function $H_2$ and the top two candidate clusters that had the lowest loss functions for the new clay soil sample under −2° C. Based on the traditional geotechnical tests performed in the laboratory, the initial porosity of the new clay sample was around 0.60. The candidate 1 cluster determined by the iterative inversion of the multiphase poromechanical algorithm, shown in FIGS. 22C and 22D, represented the properties of the new clay sample under −2° C. as follows: a shear modulus of solid skeleton of 4.4 GPa, a bulk modulus of solid skeleton of 4.2 GPa, a porosity of 0.58, and a degree of saturation of unfrozen water of 64%.

Second Embodiment Methodology Overview

Figure 18:
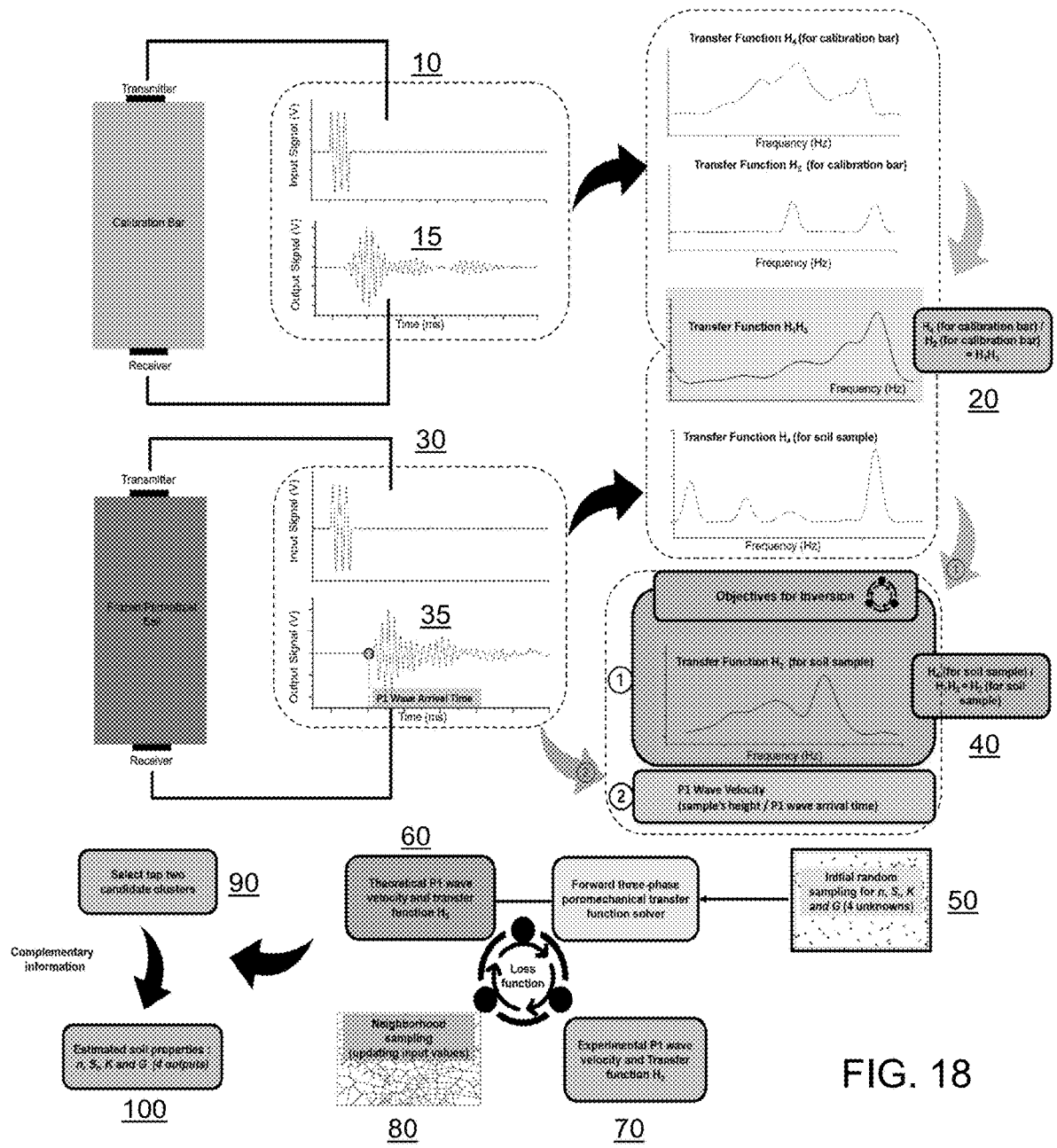
FIG. 18 is a combined block and flowchart diagram illustrating a workflow sequence executed in the second embodiment using the QUS system thereof.

FIG. 18 shows an overview of the proposed Quantitative Ultrasound (QUS) sensing system and methodology for the ultrasonic characterization of frozen or permafrost soil samples using the inventive spectral element multiphase poromechanical approach. Firstly, the ultrasonic test is performed with the calibration bar at step 10. Based on the ultrasonic measurements for the calibration bar at step 15, the product of transfer function $H_1$ and $H_3$ is determined at step 20. Then, from the ultrasonic measurements for frozen soils performed at step 35, the experimental P1 wave velocity and transfer function $H_2$ are obtained at step 40. A random sample of soil properties is initially generated at step 50 to ensure that soil parameters are not affected by a local minimum. Then the forward spectral element multiphase poromechanical transfer function is used to compute the theoretical P1 wave velocity and transfer function $H_2$ at step 60. Then the samples are ranked based on the objective (loss) function between the experimental and theoretical values at step 70. Based on the ranking of each sample, the Voronoi polygons (Neighborhood sampling method) are used to generate better samples with a smaller objective function until the solution converges at step 80. In the preferred embodiment, the best two candidate clusters are selected at step 90 based on the ranking of the loss function, from which the most likely physical and mechanical properties are obtained, taking into consideration other complementary information of the test sample at step 100.

Spectral Element Multiphase Poromechanical Transfer Function.

The frozen soil sample is considered to be composed of three phases: solid skeleton, pore-water, and pore-ice. Through the infinitesimal kinematic assumption (Equation B.1), the stress-strain constitutive model (Equation B.2), and the conservation of momentum (Equation B.3), the field equations can be written in the matrix form as presented in Equation B.4. The matrices $\bar{\rho}$, $\bar{b}$, $\bar{R}$ and $\bar{\mu}$ are given in Appendix C. The field equations can also be written in the frequency domain by performing convolution with $e^{i\omega t}$. The field equations in the Laplace domain are obtained by replacing $\omega$ with $i \cdot s$ ($i^2 = -1$ and s the Laplace variable).

To obtain the analytical solution, the Helmholtz decomposition is used to decouple the P waves (P1, P2, and P3) and S waves (S1 and S2). The displacement vector ($\bar{u}$) is composed of the P wave scalar potentials $\phi$ and S wave vector potentials $\bar{\psi} = (\psi_r, \psi_\theta, \psi_z)$. Since P waves exist in the solid skeleton, pore-ice and pore-water phases, three P wave potentials are used, including $\phi_s$, $\phi_i$ and $\phi_f$ (Equation B.6).

The detailed steps for obtaining analytical solutions for P waves and S waves using the Eigen decomposition are summarized in Appendix B.

In the ultrasonic tests, an assumed impulse load $\hat{f}(\omega, r)$ is applied to one end of the soil sample. The surface is assumed to be permeable, which implies the pore water pressure at the surface is zero. Under such conditions, the relation for load vector $\vec{f}$, stiffness matrix G and displacement vector $\vec{u}$ in the frequency domain is shown the Equation 2.2:

$$\underbrace{\begin{bmatrix} 0 \\ \hat{f}(\omega, r) \\ 0 \\ \vdots \\ 0 \end{bmatrix}}_{\vec{f}} = [G] \underbrace{\begin{bmatrix} u_{r1}^1 \\ u_{z1}^1 \\ u_{z1}^2 \\ \vdots \\ u_{zn}^3 \end{bmatrix}}_{\vec{u}} \qquad (2.2)$$

where G is the stiffness matrix described in Equation B.21 by means of the spectral element method. The displacement of the solid skeleton and the relative displacements of pore water and pore ice are denoted by $u_i^1$, $u_i^2$ and $u_i^3$. The radial and vertical components of the displacement vector is denoted by the subscripts r and z, respectively. The subscript n represents the node number, taken as 1 and 2 for the ultrasonic transmitter and receiver locations, respectively. The main steps for the derivation of the stiffness matrix G by means of the spectral element method are given in Appendix B, such as the derivation of solutions for the longitudinal waves (P waves) and shear waves (S waves) by eigen-decomposition.

The impulse load can be decomposed into two independent functions in terms of Fourier or Laplace variable $f_n(\omega)$ and radial variable $f_r(r)$:

$$f(\omega, r) = f_n(\omega) f_r(r) \qquad (2.3)$$

The mathematical expression for the function $f_n(\omega)$ depends mainly on the type of impulse loads created by a function generator and the mechanical force transformed by the ultrasonic transmitter. Meanwhile, the function $f_r(r)$, written using the Fourier-Bessel series (Equation B.23), depends on the diameter of the ultrasonic transmitter. Then the transfer function $H_2$ (independent of the applied load distribution $f_n$) is defined as follows:

$$H_2 := \frac{u_{22}(\omega)}{f_n(\omega)} = \sum_{m=1}^{\infty} \hat{u}_{22} F_m J_0(k_m r) \qquad (2.4)$$

where $u_{z2}$ is the displacement at the ultrasonic receiver location; $\hat{u}_{z2}$ is the displacement component before applying the external load; $f_n$ is the input force at the ultrasonic transmitter location; m is the total mode number; $F_m$ is the Fourier-Bessel series components (Equation B.23); $J_0$ is the first kind of Bessel function; $k_m$ is the mode number; r is the radial location of the ultrasonic receiver.

Inversion

The distance between the experimentally measured and numerically predicted P1 wave velocity as well as the Euclidean norm between the experimental and numerical transfer functions $H_2$ may be used as the components of the loss function. The inversion problem can thus be formulated as follows:

$$\begin{cases} \text{minimize } f(x) = \frac{1}{2} \sum_{i=1}^{N} w(y_i - \overline{y}_i(x))^2 + (1-w)|(V_{p1} - \overline{V}_{p1})| \\ \text{subject to } a_i \le x_i \le b_i, i = 1, \dots m \end{cases} \qquad (2.5)$$

where $f$ is the loss function; $x=(x_1, x_2, \ldots x_m)$ is the optimization variable (e.g., porosity, the degree of saturation of unfrozen water, bulk modulus and shear modulus of solid skeleton); the constant $a_i$ and $b_i$ are the limits or bounds for each variable; m is the total number of variables; y and $\overline{y}$ are the numerical and experimental normalized transfer functions $H_2$. $V_{p1}$ and $\overline{V}_{p1}$ are the numerical and experimental P1 wave velocities, respectively; w the weight for the $L_2$ norm to balance the contribution of transfer function and P1 wave velocity, taken as 800.

Here, use may be made of the Neighborhood algorithm that benefits from the Voronoi cells to search the high-dimensional parameter space and reduce overall cost function [2.32]. The algorithm contains only two tuning parameters. The Neighborhood sampling algorithm includes the following steps: a random sample is initially generated to ensure the soil parameters are not affected by the local minimum. Based on the ranking of each sample, the Voronoi polygons are used to generate better samples with a smaller objective function. The optimization parameters are scaled between 0 and 1 to properly evaluate the Voronoi polygon limit. After generating a new sample, the distance calculation needs to be updated. Through enough iterations of these processes, the aim function can be reduced. The detailed description of the neighborhood algorithm is described by Sambridge [2.32].

Second Embodiment Experimental Summary

A spectral element multiphase poromechanical transfer function method and a Quantitative Ultrasound (QUS) sensing system were developed for use as a portable and instant characterization tool for frozen or permafrost soil samples. With a simple portable setup, the physical and mechanical properties are measured using only a single ultrasonic test. Compared with traditional methods (TDR, FDR, TDT and NMR) for the measurement of only unfrozen water content, the inventive technique offers clear advantages. In the QUS sensing system, the unfrozen water content can be determined without any specific empirical relations unlike the traditional methods that rely on intensive laboratory calibration to determine the empirical equations between the relative dielectric permittivity and unfrozen water content. The spectral element multiphase poromechanical transfer function considers the multiphase physics of wave propagation in the test samples and makes no assumptions about the soil types, ice content, porosity, and testing temperature. Furthermore, the above-mentioned traditional methods (TDR, FDR, TDT and NMR) can only estimate the unfrozen water content; but the information on ice content, porosity and mechanical properties can not be evaluated. In terms of the mechanical properties, the presently disclosed ultrasonic technique also shows clear advantages compared with the traditional RC and BE tests. In the proposed ultrasonic sensing technique, the bulk modulus and shear modulus of solid skeleton particles can be determined at the same time without costly and time-consuming laboratory geophysical setups.

The inverse spectral element multiphase poromechanical algorithm is highly non-linear and non-convex. The components of the stiffness matrix as shown in Appendix D involve soil parameters such as bulk modulus, shear modulus, the saturation degree of unfrozen water, and porosity, which make the algebraic operations highly non-linear. Given the ultrasonic measurements in terms of the P1 wave velocity and experimental transfer function $H_2$, multiple possible theoretical predictions with similar loss functions can match well with the experimental measurements. The proposed inversion scheme successfully locates these possible solutions that fit well with the measured P1 wave velocity and transfer function $H_2$. However, additional information may be required to make the final decisions on the most probable soil properties. The non-uniqueness nature and the inherent uncertainty of this inverse problem are due to the lack of constraints of the soil parameters. Supplementary information (e.g., prior tests and typical values for soil properties) can reduce the search space and add constraints on the inversion analysis. For example, the two most probable solutions (clusters) were selected based on the ranking of the loss function in the detailed non-limiting example above. Traditional geotechnical tests performed in the process of preparing soil samples provided estimated soil porosity. Combining with the measured freezing temperature, the first candidate was eliminated from the inversion results at a temperature of −20° C. for the frozen clay sample (FIG. 15).

The inversion results were further verified by comparing the predicted soil properties at −20° C. and −10° C. The results showed that the degree of saturation of unfrozen water increased (from 12% to 17%) with the increase in temperature. The porosity slightly decreased (from 0.53 to 0.45) with the increase of temperature. This is explained by the reduction in volume when the in-situ ice is transformed into porewater. In addition, the variation of volumetric ice content (from 0.47 to 0.37, calculated by $n(1-S_r)$) is consistent with the temperature increase. The volume of ice is about 9% higher than that of water under the same weight. This is consistent with the 8% variation of total volume (the volume reduction is mostly reflected by the reduction in the porosity). Meanwhile, the volumetric unfrozen water content increased from 0.06 to 0.08. Both bulk modulus and shear modulus were reduced (from 6.3 GPa to 6 GPa in the bulk modulus; from 5.9 GPa to 5.4 GPa in shear modulus) when the temperature increased from −20° C. to −10° C. Such a conclusion is consistent with the temperature-dependent feature of elastic properties of frozen soil reported by Wang et al. [2.38]. Comparing the inversion results of the silt sample at −20° C. and −2° C., the degree of saturation of unfrozen water increased from 11% to 26%, which is consistent with the thermodynamic model of silt derived by Xiao et al. [40]. The till soil sample has a relatively lower degree of saturation of unfrozen water in comparison to clay and silt sample due to the existence of sand in the test soil sample. However, the till soil sample has the largest bulk modulus in comparison to other test samples due to the existence of limestone.

System Architecture and Workflow

Figure 23A:
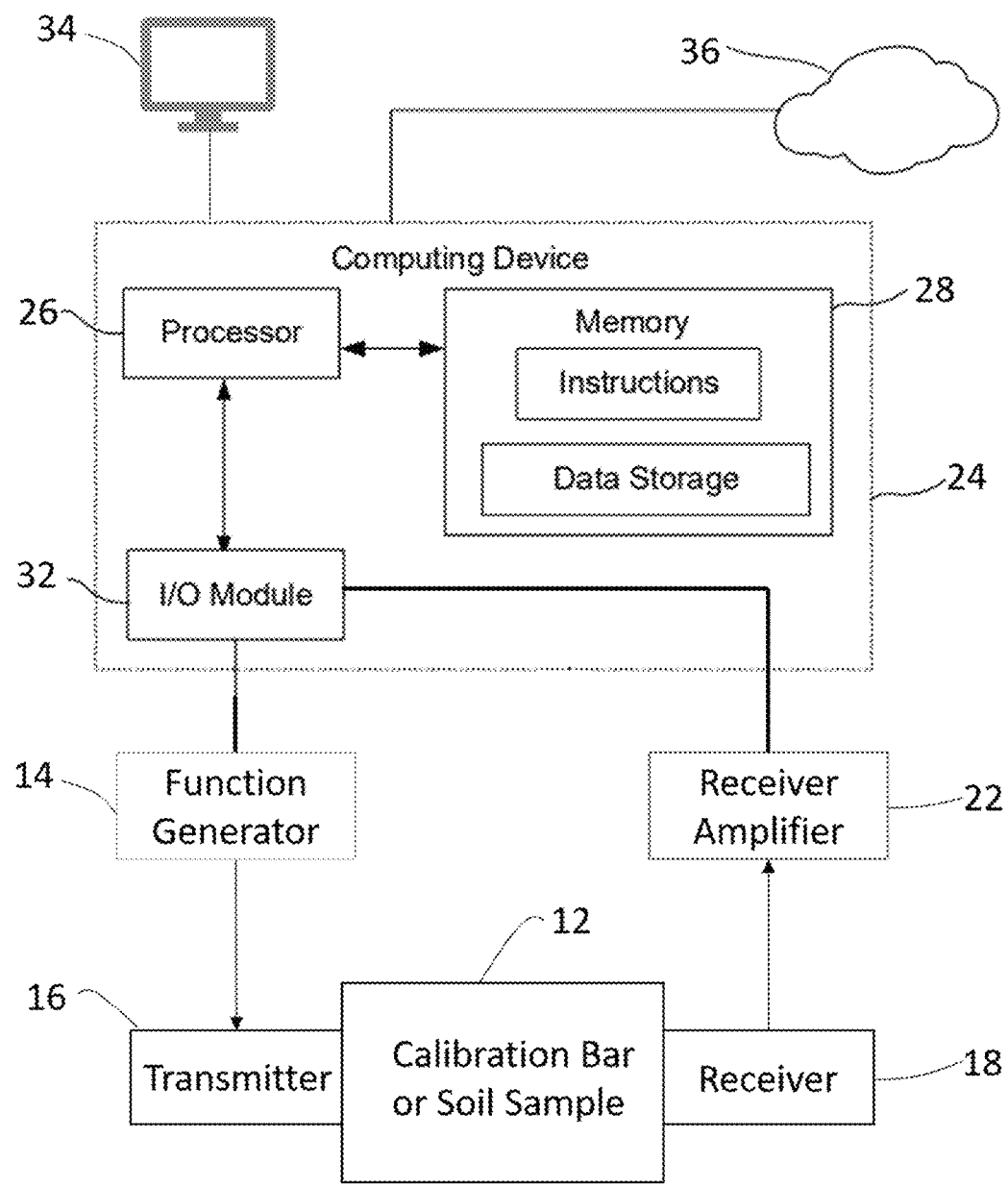
FIG. 23A shows a high level architecture block diagram of a system for calibration and quantifying the characteristics of a permafrost and frozen soil sample.

FIG. 23A shows a system for calibration and determining characteristics of a permafrost or frozen soil sample, general designated by numeral 12, in one implementation. Ultrasonic signal by a function generator 14 and ultrasonic transmitter 16 may be selectively and periodically generated to impart energy in the form of an ultrasonic wave through a permafrost or frozen soil sample 12 and to generate ultrasonic waves within sample 12. In one example, ultrasonic receiver 18 positioned or positionable oppositely of said ultrasonic transmitter measures the included response in sample 12 in terms of electrical voltage signal. Receiver amplifier 22 amplify and denoise the measured signals by ultrasonic receiver 18. Function generator 14 is in electrical communication with computing device 24 which controls the actuation of ultrasonic source 14, ultrasonic transmitter 16. Ultrasonic receiver 18 and receiver amplifier 22 are in electrical communication with computing device 24 for transmission of received ultrasonic signals thereto.

Computing device 24 comprises one or more processors 26, non-volatile computer-readable memory 28 for storing data associated with the ultrasonic signals transmitted from receiver amplifier 22, and for storing computer readable statements and instructions executable by the processor(s) 26 to at least, via input/output module 32 control the actuation of ultrasonic source by function generator 14 and ultrasonic transmitter 16, and receive the detected ultrasonic signals from ultrasonic receiver 18 and receiver amplifier 22; and determine the characteristics of a permafrost or frozen soil sample 12 based on the methodology described above. Accordingly, through analysis of these detected ultrasonic signals, the characteristics of permafrost and frozen soil sample 12, such as the amount of ice content, unfrozen water content, and porosity, as well as the shear modulus and bulk modulus may be determined. These results may be stored locally in the local memory 28 of the computing device 24, displayed to a user thereof via a screen 34 or other display of integrated or connected relation to the computing device 24, and/or transmitted over the internet or other network to a remote storage location 36 (dedicated storage server, cloud storage server, etc.) for storage thereat, and later retrieval therefrom by the same or a different computing device. While the illustrated example shows a singular computing device that not only interacts with the local equipment 14, 16, 18, 22 to perform and log the results of the ultrasonic test, but also locally executes the multiphase poromechanical model to derive the sample characteristics, it will be appreciated that a distributed architecture dividing these tasks, or any subcomponents thereof, among a plurality of networked computing devices may alternatively be employed. The same computer setup may be employed in either of the two working embodiments detailed above.

Figure 23B:
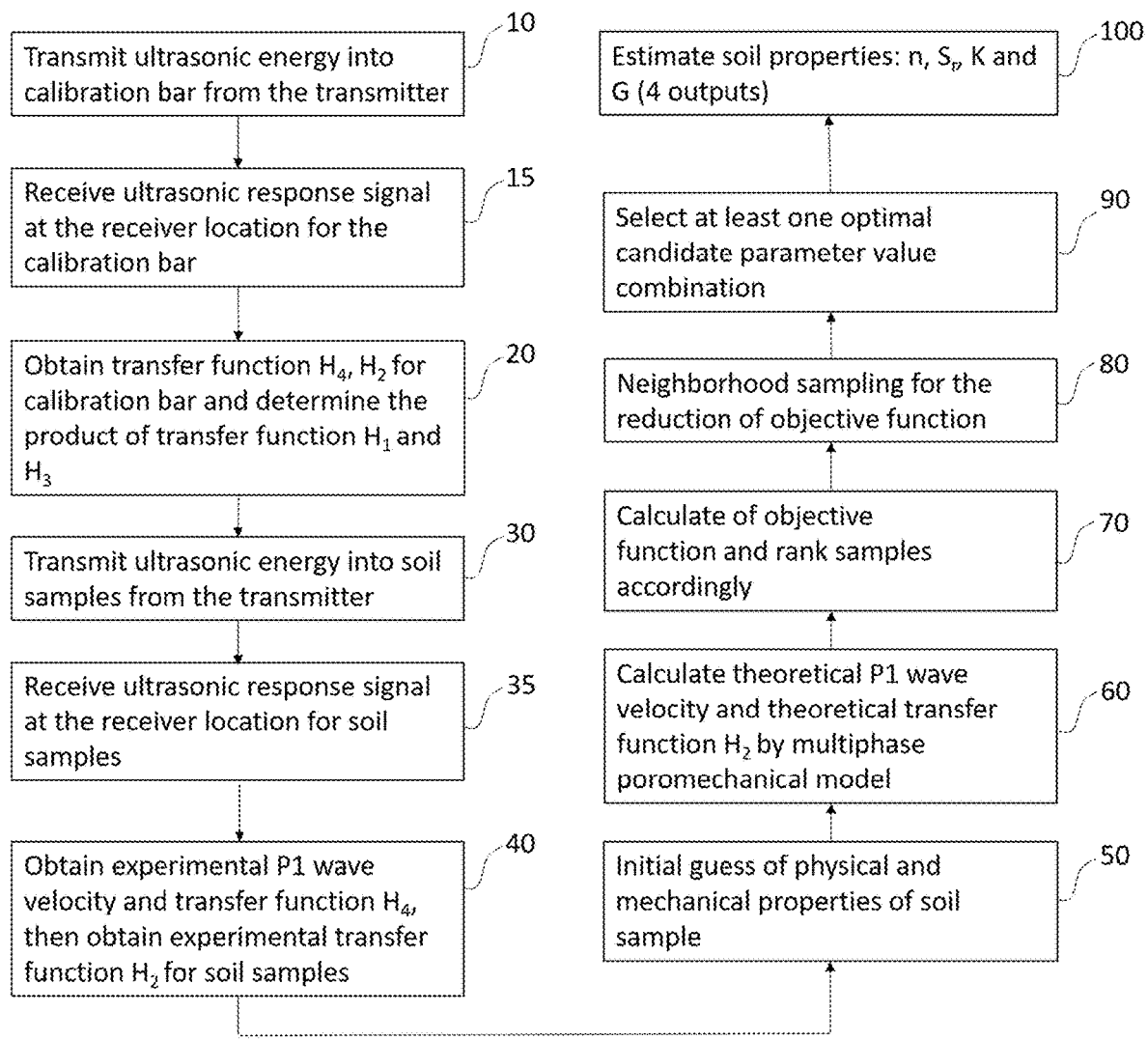
FIG. 23B shows a general workflow schematic for ultrasonic characterization of permafrost and frozen soil sample using the system architecture of FIG. 23A.
Figure 24:
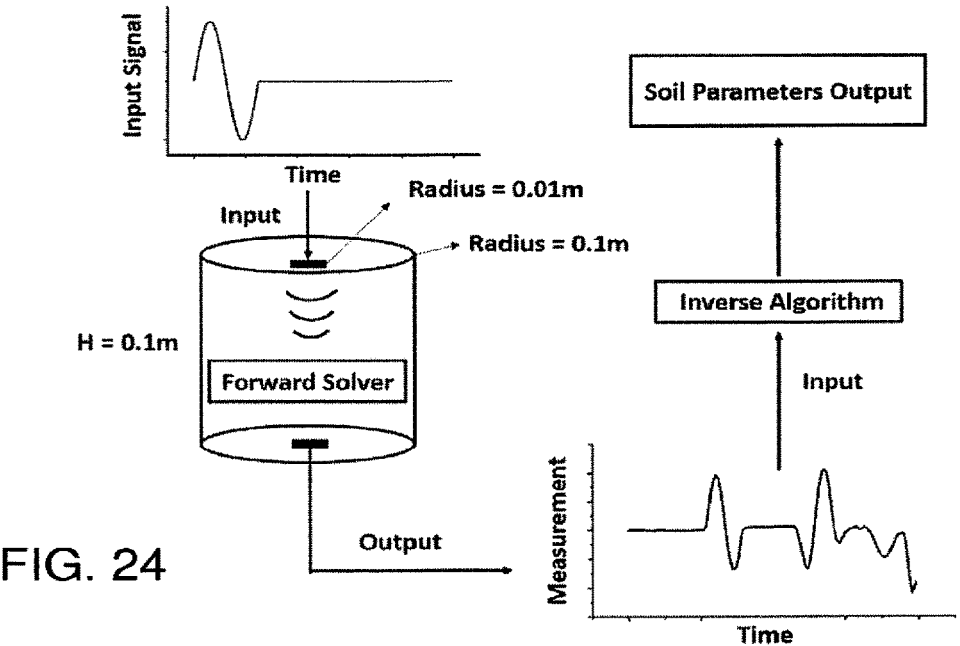
FIG. 24 schematically illustrates an equipment setup and workflow sequence of a third embodiment designed for characterization of saturated soil, rather than permafrost or frozen soil.

Turning to FIG. 23B, illustrated therein is the general workflow executed by the system of FIG. 23A in the case of the second working embodiment. Firstly, at step 10, ultrasonic signal by function generator 14 and ultrasonic transmitter 16 is generated to selectively and/or periodically impart energy in the form of an ultrasonic wave through a calibration bar 12. For example, the generated signal comprises a known amplitude, frequency and duration.

At step 15, ultrasonic receiver 18 measures the included response in a calibration bar 12 in terms of electrical voltage signal.

At step 20, computing device 24 obtains transfer function $H_4$, $H_2$ for the calibration bar and then calculate the product of transfer function $H_1$ and $H_3$.

At step 30, ultrasonic signal by function generator 14 and ultrasonic transmitter 16 is generated to selectively and/or periodically impart energy in the form of an ultrasonic wave through a permafrost or frozen soil sample 12.

At step 35, ultrasonic receiver 18 measures the included response of a permafrost or frozen soil sample 12 in terms of electrical voltage signal, then amplified and denoised by receiver amplifier 22.

At step 40, computing device 24 obtains experimental P1 wave velocity and transfer function $H_4$, then computes transfer function $H_2$ for a permafrost or frozen soil sample.

At step 50, initial estimates of the physical and mechanical properties of a permafrost or frozen soil sample 12 are postulated.

At step 60, computing device 24 uses a forward three-phase poromechanical transfer function model to compute the theoretical P1 wave velocity and transfer function $H_2$.

At step 70, samples within a parameter space of the poromechanical transfer function model are ranked based on the objective function between the experimental measurement and theoretical prediction in terms of P1 wave velocity and transfer function $H_2$.

At step 80, a Neighborhood sampling for the reduction of objective function is performed.

At step 90, computing device 24 selects at least one optimal candidate parameter value combination to obtain the most likely physical and mechanical properties of a permafrost or frozen soil sample 12, and displays and stores such results.

The results from step 90 may be preliminary results with multiple candidates requiring further consideration and final section, whether in fully automated fashion executed by the system, or by human intervention. In such instances, at additional step 100, the final estimate of physical and mechanical properties of a permafrost or frozen soil sample 12 is determined taking into consideration other complementary information of the test sample, and these final results are then displayed and stored.

Third Working Embodiment (Saturated Soil)

Turning now to FIGS. 24 through 39, FIG. 24 illustrates a general schematic of the equipment setup and workflow of a third embodiment system and methodology useful for characterizing saturated soil. From an equipment perspective, the setup is similar to those of the first and second embodiments and may employ the same computer architecture shown in FIG. 23A, but the test sample domain is composed of a saturated porous medium rather than a frozen one, and the computer executed algorithms are accordingly tailored for this different test medium. Once again, the ultrasonic transmitter is located at one end of the sample to generate the stress waves, which travel through the test specimen and are received by a receiver at the other end of the sample. The soil properties (Young's modulus, Poisson's ratio and porosity) are captured by the third embodiment solver disclosed below using the distribution of transmitted stress waves.

Third Embodiment Methodology: Dynamic Poroelastic Forward Solver

By assuming the infinitesimal deformation of solid skeleton, the dynamic poroelastic governing equations are written as follows:

$$\mu u_{i,jj} + (\lambda_c + \mu) u_{j,ji} + \alpha M w_{j,ji} = -\rho b_i + \rho \ddot{u}_i + \rho_f \ddot{w}_i, \quad (3.1a)$$

$$\alpha M u_{j,ji} + M w_{j,ji} = -f + \rho_f \ddot{u}_i + m \ddot{w}_i + b \dot{w}_i, \quad (3.1b)$$

where u is the displacement vector of the solid skeleton; w is the fluid displacement relative to the solid skeleton; $\lambda$ and $\mu$ are Lamé constants; $\alpha$ is the Biot coefficient; p is the pore-water pressure; M is $$1 \Big/ \left( \frac{\Phi}{K_f} + \frac{\alpha + \Phi}{K_s} \right)$$

in which $K_f$ is the bulk modulus of the fluid; $K_s$ is the bulk modulus of the solid skeleton and $\varphi$ is the porosity. $\lambda_c = \lambda + \alpha^2 M$; $m = \rho_f \beta / \varphi$ in which $\beta$ is the tortuosity which is used to describe the diffusion properties in porous media, and $\rho_f$ is the density of pore-water, taken as 1000 kg/m³. The drag-force damping coefficient b is calculated as [3.21]:

$$b = \eta / \kappa F, \quad (3.2)$$

where $\eta$ is the fluid dynamic viscosity and $\kappa$ is the permeability coefficient; F is the viscous correction factor [3.22]:

$$F(\omega) = \sqrt{1 + \frac{i}{2} M_s \frac{\omega}{\omega_\varepsilon}}, \omega_c = \frac{\eta \phi}{2\pi \beta \rho_f \kappa}, \quad (3.3)$$

in which $M_s$ is taken as 1; $i = \sqrt{-1}$ and $\omega$ is the angular frequency.

The governing equations can be written in frequency domain through the Fourier transform by performing convolution with $e^{-i\omega t}$ in which $\omega$ is the frequency and t denotes time variable. The governing equations in Laplace domain can be obtained by replacing $\omega$ with $-is$ where s is the Laplace variable.

To obtain the analytical solution, the Helmholtz decomposition is used to decouple the P and S waves. The displacement vector is usually expressed in terms of a scalar potential ($\varphi$) and a vector potential ($\vec{\psi} = [\psi_r, \psi_\theta, \psi_z]$), as shown in Eqs. 3.4a and 3.4b. In axisymmetric conditions, only the components in r and z directions are considered. Since P wave exits in solid skeleton and fluid, two P wave potentials are used, $\varphi_s$ and $\varphi_f$, respectively.

$$\vec{u}(r,z) = \nabla \phi_s(r,z) + \nabla \times \vec{\psi}_s(r,z) \text{ and } \nabla \cdot \vec{\psi}_s(r,z) = 0, \quad (3.4a)$$

$$\vec{w}(r,z) = \nabla \phi_f(r,z) + \nabla \times \vec{\psi}_f(r,z) \text{ and } \nabla \cdot \vec{\psi}_f(r,z) = 0, \quad (3.4b)$$

The governing equations in frequency domain in terms of potentials are finally obtained as shown in Eqs. 3.5a-3.5d:

$$(\lambda_c + 2\mu)\nabla^2 \hat{\phi}_s(r,z) + \alpha M \nabla^2 \hat{\phi}_f(r,z) = -\rho \omega^2 \hat{\phi}_s(r,z) - \rho_f \omega^2 \hat{\phi}_f(r,z), \quad (3.5a)$$

$$-\mu \nabla^2 \vec{\hat{\psi}}_s(r,z) = \rho \omega^2 \vec{\hat{\psi}}_s(r,z) + \rho_f \omega^2 \vec{\hat{\psi}}_f(r,z), \quad (3.5b)$$

$$\alpha M \nabla^2 \hat{\phi}_f(r,z) + M \nabla^2 \hat{\phi}_s(r,z) = -\omega^2 (\rho_f \hat{\phi}_s(r,z) + \rho_m \hat{\phi}_f(r,z)), \quad (3.5c)$$

$$0 = \rho_f \omega^2 \vec{\hat{\psi}}_s(r,z) + \rho_m \omega^2 \vec{\hat{\psi}}_f(r,z), \quad (3.5d)$$

where $\rho_m = m - ib/\omega$; ^ represents the terms in frequency domain.

Solution of Dilation Wave (p Waves) Using Eigen Decomposition

The equations in terms of P wave potentials (Eqs. 3.5a and 3.5b) in a matrix form is shown as:

$$\underbrace{\begin{bmatrix} \lambda_c + 2\mu & \alpha M \\ \alpha M & M \end{bmatrix}}_{K_P} \begin{Bmatrix} \nabla^2 \hat{\phi}_s(r,z) \\ \nabla^2 \hat{\phi}_f(r,z) \end{Bmatrix} = -\omega^2 \underbrace{\begin{bmatrix} \rho & \rho_f \\ \rho_f & \rho_m \end{bmatrix}}_{M} \begin{Bmatrix} \hat{\phi}_s(r,z) \\ \hat{\phi}_f(r,z) \end{Bmatrix}. \quad (3.6)$$

It can be seen from Eq. 3.6 that $\hat{\Phi}_s$ and $\hat{\Phi}_f$ are coupled in the governing equations. The diagonalization of such a matrix is required to decouple the system. The Eq. 3.6 is then rearranged into:

$$\begin{Bmatrix} \nabla^2 \hat{\phi}_s(r,z) \\ \nabla^2 \hat{\phi}_f(r,z) \end{Bmatrix} = \underbrace{\begin{bmatrix} k_{11} & k_{12} \\ k_{21} & k_{22} \end{bmatrix}}_{K} \begin{Bmatrix} \hat{\phi}_s(r,z) \\ \hat{\phi}_f(r,z) \end{Bmatrix}. \quad (3.7)$$

where $$k_{11} = \frac{\omega^2(\rho - \alpha \rho_f)}{M\alpha^2 - 2\mu - \lambda_c},$$

$$k_{12} = \frac{\omega^2(\rho_f - \alpha \rho_m)}{M\alpha^2 - 2\mu - \lambda_c},$$

$$k_{21} = \frac{\omega^2((2\mu + \lambda_c)\rho_f - M\alpha\rho)}{M(M\alpha^2 - 2\mu - \lambda_c)},$$

$$k_{22} = \frac{\omega^2((2\mu + \lambda_c)\rho_m - M\alpha\rho_f)}{M(M\alpha^2 - 2\mu - \lambda_c)}.$$

The K matrix can be rewritten using the Eigen decomposition method:

$$K = PDP^{-1}, \quad (3.8)$$

where P is the eigenvector matrix and D is the eigenvalue matrix of the K matrix:

$$P = \frac{1}{k_{21}} \begin{Bmatrix} \left( \sqrt{(k_{11}-k_{22})^2 + 4k_{12}k_{21}} - \frac{k_{11}+k_{22})}{2} \right) & \left( \sqrt{(k_{11}-k_{22})^2 + 4k_{12}k_{21}} + \frac{k_{11}-k_{22})}{2} \right) \\ k_{21} & k_{21} \end{Bmatrix},$$

$$D = \begin{Bmatrix} \frac{1}{2}\left( -\sqrt{(k_{11}-k_{22})^2 + 4k_{12}k_{21}} + k_{11}+k_{22}) \right) & 0 \\ 0 & \frac{1}{2}\left( \sqrt{(k_{11}-k_{22})^2 + 4k_{12}k_{21}} + k_{11}-k_{22}) \right) \end{Bmatrix}.$$

It should be noted that Eq. 3.8 is still valid after neglecting the term $1/k_{21}$ in the eigenvector matrix P due to the existence of the term $P^{-1}$. Introducing Eq. (3.8 into Eq. 3.7 and by multiplying $P^{-1}$ and P in the left and right sides, respectively, we can obtain:

$$P^{-1} \nabla^2 \vec{\phi}(r,z) P = DP^{-1} \vec{\phi}(r,z) P. \quad (3.9)$$

By setting $\vec{\phi}(r,z) = P\vec{y}(r,z)$ in which $\vec{y}(r,z) = [\hat{\phi}_{p1}(r,z), \hat{\phi}_{p2}(r,z)]$, the system is finally decoupled as:

$$\nabla^2 \vec{y}(r,z) = D\vec{y}(r,z). \quad (3.10)$$

Under axisymmetric conditions, Eq. 3.10 for $\vec{y}(r,z) = [\hat{\phi}_{p1}(r,z), \hat{\phi}_{p2}(r,z)]$ in cylindrical coordinates is written as:

$$\left( \frac{\partial^2 \hat{\phi}_{p1}(r,z)}{\partial r^2} + \frac{1}{r}\frac{\partial \hat{\phi}_{p1}(r,z)}{\partial r} + \frac{\partial^2 \hat{\phi}_{p1}(r,z)}{\partial z^2} \right) - D_{11}\hat{\phi}_{p1}(r,z) = 0, \quad (3.11a)$$

$$\left( \frac{\partial^2 \hat{\phi}_{p2}(r,z)}{\partial r^2} + \frac{1}{r}\frac{\partial \hat{\phi}_{p2}(r,z)}{\partial r} + \frac{\partial^2 \hat{\phi}_{p2}(r,z)}{\partial z^2} \right) - D_{22}\hat{\phi}_{p2}(r,z) = 0. \quad (3.11b)$$

Since the variables $\hat{\phi}_{p1}(r,z)$ and $\hat{\phi}_{p2}(r,z)$ are a function of r and z in the cylindrical coordinates, the separation of variable $\hat{\phi}_{p1} = \hat{R}(r)Z(z)$ can be used. By setting the both sides equal to $-k^2$ where k is the wavenumber in the radial direction, we can obtain the following equations:

$$\frac{d^2 \hat{R}(r)}{dr^2} + \frac{1}{r}\frac{d\hat{R}(r)}{dr} + k^2 \hat{R}(r) = 0, \quad (3.12a)$$

$$\frac{d^2 Z(z)}{dz^2} - (k^2 + D_{11})Z(z) = 0. \quad (3.12b)$$

The solutions to Eqs. 3.12a and 3.12b are:

$$\hat{R}(r) = C_1 J_0(kr), \quad (3.13a)$$

$$\hat{R}(z) = C_2 e^{-\sqrt{k^2 + D_{11}} z}. \quad (3.13b)$$

in which $J_0$ is the Bessel function of the first kind; $C_1$ and $C_2$ are the coefficients to be determined from the boundary conditions. Similarly, the solution for $\hat{\phi}_{p1}$ can be obtained. The solution for $\vec{y} = [\hat{\phi}_{p1}, \hat{\phi}_{p2}]$ is summarized as:

$$\hat{\phi}_{p1}(r,z) = A e^{-\sqrt{k^2 + D_{11}} z} J_0(kr), \quad (3.14a)$$

$$\hat{\phi}_{p2}(r,z) = B e^{-\sqrt{k^2 + D_{11}} z} J_0(kr), \quad (3.14b)$$

where A and B are the coefficients to be determined from the boundary conditions. For simplicity, the term $\sqrt{k^2 + D_{11}}$ and $\sqrt{k^2 + D_{22}}$ is denoted as $k_{p1}$ and $k_{p2}$, respectively.

Since $\vec{\Phi} = P\vec{y}$, the solution for $\vec{\Phi}_s$ and $\vec{\Phi}_f$ can be finally obtained as:

$$\hat{\phi}_s(r,z) = p_{11} A e^{-\sqrt{k^2 + D_{11}} z} J_0(kr) + p_{12} B e^{-\sqrt{k^2 + D_{23}} z} J_0(kr), \quad (3.15a)$$

$$\hat{\phi}_f(r,z) = p_{21} A e^{-\sqrt{k^2 + D_{11}} z} J_0(kr) + p_{22} B e^{-\sqrt{k^2 + D_{23}} z} J_0(kr). \quad (3.15b)$$

Solution of Rotational Wave (S Wave)

The rotational wave is governed by Eqs. 3.5c and 3.5d. By replacing $\vec{\psi}_f$ by $\vec{\psi}_s$, we obtain $$\nabla^2 \vec{\psi}_s(r,z) - \frac{\left(\frac{\rho_f^2}{\rho_m} - \rho\right)\omega^2}{\mu} \vec{\psi}_s(r,z) = 0. \quad (3.16)$$

Under axisymmetric conditions, the solution for Eq. 3.16 in the cylindrical coordinates is obtained as:

$$\hat{\psi}_s(r,z) = C e^{-\sqrt{k^2 + \frac{\left(\frac{\rho_f^2}{\rho_m} - \rho\right)\omega^2}{\mu}} z} J_1(kr). \quad (3.17)$$

where C is the coefficient to be determined from the boundary conditions and $J_1$ is the Bessel function of the first kind of order one. For simplicity, the term $$\sqrt{k^2 + \frac{\left(\frac{\rho_f^2}{\rho_m} - \rho\right)\omega^2}{\mu}}$$

is denoted as $k_s$.

Displacement, Stress and Pore-Water Pressure in Terms of Potentials

In the cylindrical coordinates (r, θ, z), considering the axisymmetric conditions, the vector potential ψ has only the component in the θ direction that does not vanish. For simplicity, the vector potential ψ in the θ direction is denoted as $\hat{\Phi}_s$ and $\hat{\Phi}_f$ for solid skeleton and porewater, respectively. This property reduces the displacement to the following forms:

$$\hat{\mu}_r(r, z) = \frac{\partial \hat{\phi}_s(r, z)}{\partial r} - \frac{\partial \hat{\psi}_s(r, z)}{\partial z}, \quad (3.18a)$$

$$\hat{\mu}_z(r, z) = \frac{\partial \hat{\phi}_s(r, z)}{\partial z} + \frac{1}{r}\frac{\partial (r\hat{\psi}_s(r, z))}{\partial r}.$$

$$\hat{w}_r(r, z) = \frac{\partial \hat{\phi}_f(r, z)}{\partial r} - \frac{\partial \hat{\psi}_f(r, z)}{\partial z}, \quad (3.18b)$$

$$\hat{w}_z(r, z) = \frac{\partial \hat{\phi}_f(r, z)}{\partial z} + \frac{1}{r}\frac{\partial (r\hat{\psi}_f(r, z))}{\partial r}.$$

The effective stress and pore-water pressure are written as:

$$\bar{\sigma}'_{zr}(r, z) = \mu\left(\frac{\partial \hat{\mu}_r(r, z)}{\partial z} + \frac{\partial \hat{\mu}_z(r, z)}{\partial r}\right), \quad (3.19a)$$

$$\bar{\sigma}'_{zr}(r, z) = \lambda\left(\frac{\partial \hat{\mu}_r(r, z)}{\partial r} + \frac{\hat{\mu}_r(r, z)}{r} + \frac{\partial \hat{\mu}_z(r, z)}{\partial z}\right) + 2\mu\frac{\partial \hat{\mu}_z(r, z)}{\partial z}, \quad (3.19a)$$

$$\hat{p}(r, z) = -\alpha M\left(\frac{\partial^2 \hat{\phi}_s(r, z)}{\partial r^2} + \frac{1}{r}\frac{\partial \hat{\phi}_s(r, z)}{\partial r} + \frac{\partial^2 \hat{\phi}_s(r, z)}{\partial z^2}\right) - \quad (3.19c)$$

$$M\left(\frac{\partial^2 \hat{\phi}_f(r, z)}{\partial r^2} + \frac{1}{r}\frac{\partial \hat{\phi}_f(r, z)}{\partial r} + \frac{\partial^2 \hat{\phi}_f(r, z)}{\partial z^2}\right)$$

Spectral Element Formulation for Dynamic Poroelasticity

In u-w formulation (displacement of solid and relative displacement of porewater), the displacement components $w_r$ and $w_z$ are linearly dependent. In this example, only $w_z$ is used in the stiffness matrix. For two-node elements where a layer has a finite thickness, the matrix for the displacement components are written as follows:

Similarly, the matrix for effective stress components and porewater pressure in frequency domain is shown in Eq. 3.21 in which the components for matrix S' can be found in Appendix E.

$$\begin{bmatrix} \hat{\sigma}'_{zr1}(r, z) \\ \hat{\sigma}'_{zz1}(r, z) \\ \hat{p}_1(r, z) \\ \hat{\sigma}'_{zr2}(r, z) \\ \hat{\sigma}'_{zz2}(r, z) \\ \hat{p}_2(r, z) \end{bmatrix} = \underbrace{\begin{bmatrix} m_{11} & m_{12} & m_{13} & m_{14} & m_{15} & m_{16} \\ m_{21} & m_{22} & m_{23} & m_{24} & m_{25} & m_{26} \\ m_{31} & m_{32} & m_{33} & m_{34} & m_{35} & m_{36} \\ m_{41} & m_{42} & m_{43} & m_{44} & m_{45} & m_{46} \\ m_{51} & m_{52} & m_{53} & m_{54} & m_{55} & m_{56} \\ m_{61} & m_{62} & m_{63} & m_{64} & m_{65} & m_{66} \end{bmatrix}}_{S'_2} \begin{bmatrix} A_1 \\ B_1 \\ C_1 \\ A_2 \\ B_2 \\ C_2 \end{bmatrix}. \quad (3.20)$$

According to the Cauchy stress principle, the traction force $([\bar{T}_{rz1}, \bar{T}_{z1}, \bar{T}_1, \bar{T}_{rz2}, \bar{T}_{z2}, \bar{T}_2])$ is taken as the dot product between the stress tensor and the unit vector along the outward normal direction. Due to the convention that the upward direction is negative, the upper boundary becomes $([-\hat{\sigma}_{rz1}, -\hat{\sigma}_{zz1}, \hat{p}_1]^T)$. Similarly, to make the sign consistent, the N matrix is applied to matrix $S'_2 \cdot S'^{-1}_1$. In the future, the matrix $N \cdot S'_2 \cdot S'^{-1}_1$ will be denoted as $G_i$ matrix, in which i denotes the layer number.

$$\begin{Bmatrix} T_{rz1} \\ T_{z1} \\ T_1 \\ T_{rz2} \\ T_{z2} \\ T_2 \end{Bmatrix}_i = \begin{Bmatrix} -\hat{\sigma}_{rz1}(r, z) \\ -\hat{\sigma}_{zz1}(r, z) \\ -\hat{p}_1(r, z) \\ \hat{\sigma}_{rz2}(r, z) \\ \hat{\sigma}_{zz2}(r, z) \\ \hat{p}_2(r, z) \end{Bmatrix}_i = \underbrace{N \cdot S'_2 \cdot S'^{-1}_1}_{G_i} \cdot \begin{Bmatrix} \hat{u}_{r1}(r, z) \\ \hat{u}_{z1}(r, z) \\ \hat{w}_{z1}(r, z) \\ \hat{u}_{r2}(r, z) \\ \hat{u}_{z2}(r, z) \\ \hat{w}_{z2}(r, z)_i \end{Bmatrix}_i, \quad (3.22)$$

where $$N = \begin{bmatrix} -1 & 0 & 0 & 0 & 0 & 0 \\ 0 & -1 & 0 & 0 & 0 & 0 \\ 0 & 0 & -1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}. \quad (3.23)$$

After obtaining the stiffness matrix for each element, the global stiffness matrix can be obtained by applying the continuity conditions between the layer interfaces. The stiffness assembling method is the same as that shown in (3.20)

$$\begin{bmatrix} \hat{u}_{r1}(r, z) \\ \hat{u}_{z1}(r, z) \\ \hat{w}_{z1}(r, z) \\ \hat{u}_{r2}(r, z) \\ \hat{u}_{z2}(r, z) \\ \hat{w}_{z2}(r, z) \end{bmatrix} = $$

$$\underbrace{\begin{bmatrix} -kp_{11} & -kp_{12} & k_1 & -e^{-hk_{p1}}kp_{11} & -e^{-hk_{p2}}kp_{12} & -e^{-hk_1}k_s \\ -k_{p1}p_{11} & -k_{p2}p_{12} & k & e^{-hk_{p1}}kp_{11} & e^{-hk_{p2}}kp_{12} & e^{-hk_1}k \\ -k_{p1}p_{21} & -k_{p2}p_{22} & -\frac{\rho_f}{\rho_m}k & e^{-hk_{p1}}k_{p1}p_{21} & e^{-hk_{p2}}k_{p2}p_{22} & -\frac{\rho_f}{\rho_m}e^{-hk_1}k \\ -e^{-hk_{p1}}kp_{11} & -e^{-hk_{p2}}kp_{12} & e^{-hk_1}k_s & -kp_{11} & -kp_{12} & -k_s \\ -e^{-hk_{p1}}k_{p1}p_{11} & -e^{-hk_{p2}}k_{p2}p_{12} & e^{-hk_1}k & k_{p1}p_{11} & k_{p2}p_{12} & k \\ -e^{-hk_{p1}}k_{p1}p_{21} & -e^{-hk_{p2}}k_{p2}p_{22} & -\frac{\rho_f}{\rho_m}e^{-hk_1}k & k_{p1}p_{21} & k_{p2}p_{22} & -\frac{\rho_f}{\rho_m}k \end{bmatrix}}_{S'_2} \begin{bmatrix} A_1 \\ B_1 \\ C_1 \\ A_2 \\ B_2 \\ C_2 \end{bmatrix}.$$

FIG. 11. The global stiffness is denoted as H matrix for simplicity. An example of the global stiffness matrix for a two layer system is provided in Appendix F.

Soil Response Under Dynamic Load (Boundary Conditions)

In the ultrasonic tests, a vertical impulse load $f(t, r)$ is applied to one end of the soil specimen. The surface is assumed to be permeable, which implies the porewater pressure at the surface is zero. Under such conditions, the displacements in the frequency domain can be written as:

$$\begin{Bmatrix} 0 \\ \hat{f}(s,r) \\ 0 \\ \vdots \\ 0 \end{Bmatrix} = \{H\} \begin{Bmatrix} \hat{u}_{r1} \\ \hat{u}_{z1} \\ \hat{w}_{r1} \\ \vdots \\ \hat{w}_{zn} \end{Bmatrix}. \quad (3.24)$$

The impulse load $f$ is firstly defined in time domain and can decomposed into two independent functions in terms of time variable $f_n(t)$ and radial variable $f_r(r)$:

$$f(t,r) = f_n(t) f_r(r). \quad (3.25)$$

The mathematical expression for the function $f_n(t)$ depends mainly on the type of impulse loads created by the signal generator. In this example, a sinusoidal impulse function is used as the external load to simulate the applied load. The load with amplitude of one is mathematically described in Eq. 3.26.

$$f_n = \sin(2\pi f t)[1 - H(t - 1/f)] \quad (3.26)$$

where t(s) is time and $f$(Hz) is the frequency; H( ) is the Heaviside step function.

Meanwhile, the function $f_r(r)$ is normally written using the Fourier-Bessel series:

$$f_r(r) = \sum_{m=1}^{\infty} F_m J_0(k_m r), \quad (3.27)$$

where $$F_m(m) = \frac{2 r_0 \sin(r_0 k_m)}{r_\infty^2 k_m J_1^2(r_\infty k_m)} \frac{n+1-m}{n+1},$$

where $r_o$ is the radius of the contact area; $k_m$ is the mode number; n is the total mode number; $r_\infty$ is the diameter of the soil specimen.

The displacement obtained in Eq. 3.24 is in the frequency domain. To obtain the soil response in time domain, the numerical Durbin inverse transform method is applied [3.23]:

$$\mathcal{L}^{-1}\{\hat{\theta}(s)\} = \theta(t) = \int_0^\infty \hat{\theta}(s) e^{st} ds. \quad (3.28)$$

Third Embodiment Case Study

The characterization of porosity has been a challenge because soil porosity can not be captured through traditional low-frequency tests. Such limitations can be explained by comparing the size of pore space and wavelength. A sensitivity analysis of the soil porosity is performed to verify such limitations. In experimental study of the third embodiment, a soil column with a height and radius of 0.1 m was studied. The impulse load was applied to an area with a radius of 1 cm at the center of the top end of the soil column. The displacement at the center (r=0) in the other end was recorded and compared.

The typical values of Young's modulus, porosity, density, permeability and Poisson's ratio are well documented in the literature [3.24-3.27]. For example, high-plasticity clay (CH based on the Unified Soil Classification System (USCS)) has a Young's modulus ranging from 0.35 to 32 MPa and porosity from 0.39 to 0.59; Silts and clays of low plasticity (ML, CL) have a typical value of Young's modulus ranging from 1.5 to 60 MPa and porosity from 0.29 to 0.56; poorly graded sands (SP) normally have a Young's modulus from 10 to 80 MPa and porosity from 0.23 to 0.43; The Young's modulus of well-graded gravel (GW) is between 30-320 MPa and its porosity is from 0.21 to 0.32. The average dry density ranges from 1700 to 2300 kg/m$^3$. The average permeability varies from 5×10-10 (clay of high plasticity) to 0.4 m/s (sand and gravel). The typical values of Poisson's ratio vary from 0.1 to 0.49 for clay and from 0.3 to 0.35 for silt.

In this case study, two groups of soils were studied: the first group included clay, silt, sand and loose gravel which generally have a relatively low Young's modulus (lower than 100 MPa). The second group included dense gravel which has a Young's modulus equal or greater than 200 MPa.

Figure 25A:
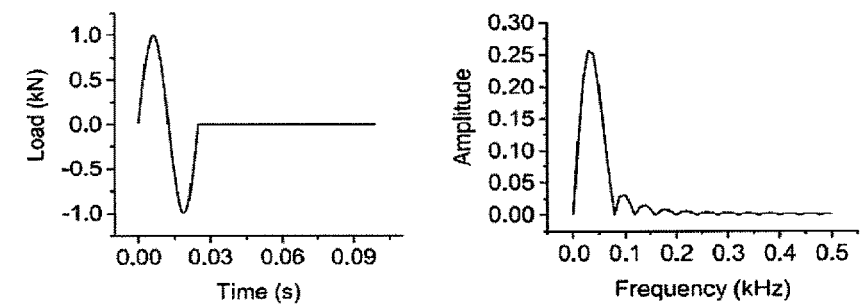
FIGS. 25A through 25C show three different tested impulse loads for the third embodiment, in both time and frequency domains.
Figure 25B:
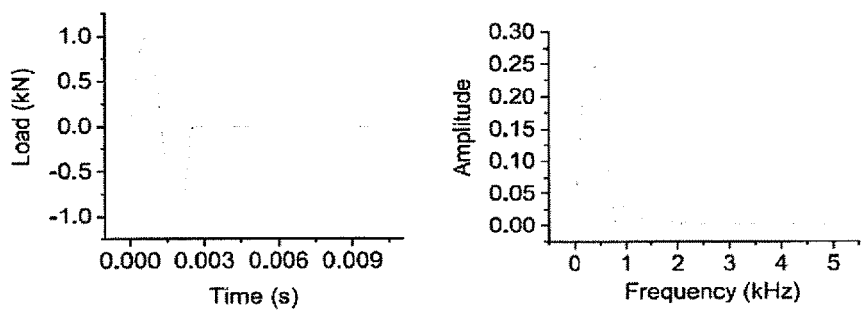
Figure 25C:
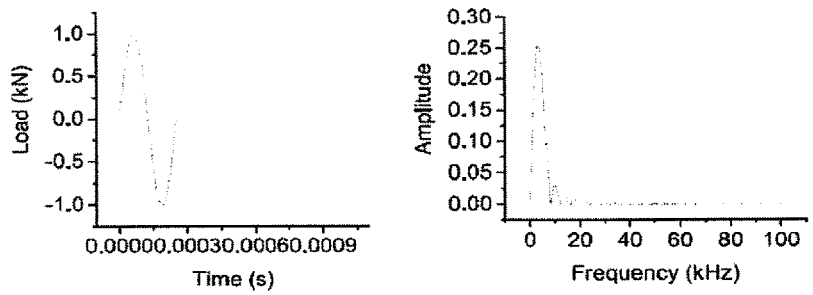
Figure 30A:
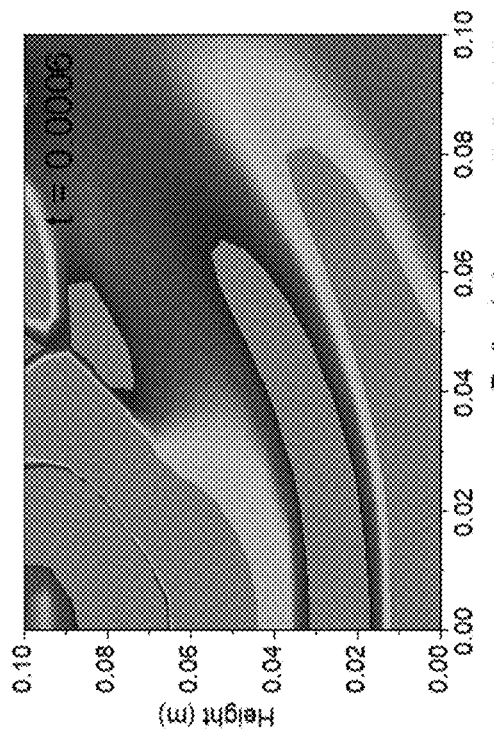
FIGS. 30A through 30D show displacement contour snapshots at different points in time as a stress wave propagates through a test sample.
Figure 30B:
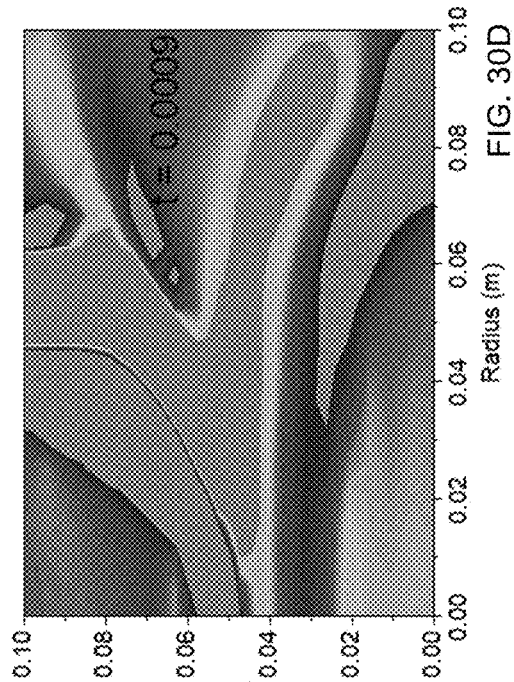
Figure 30C:
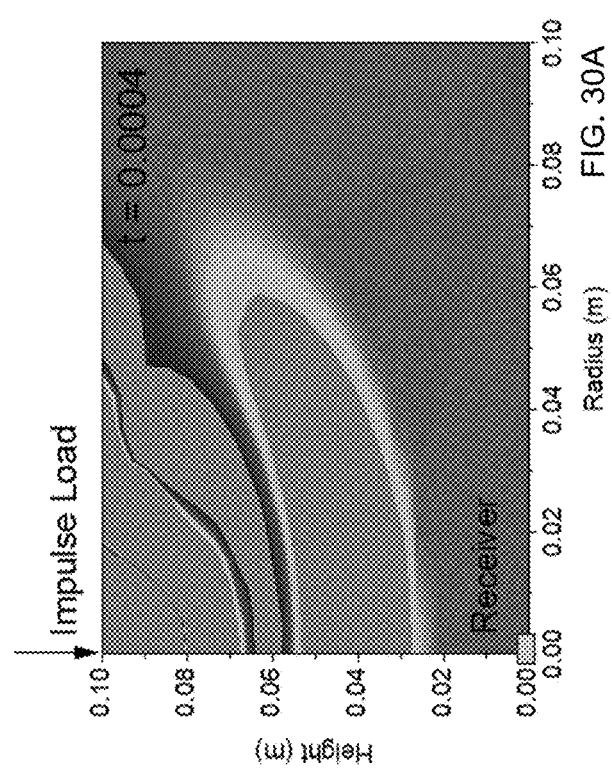
Figure 30D:
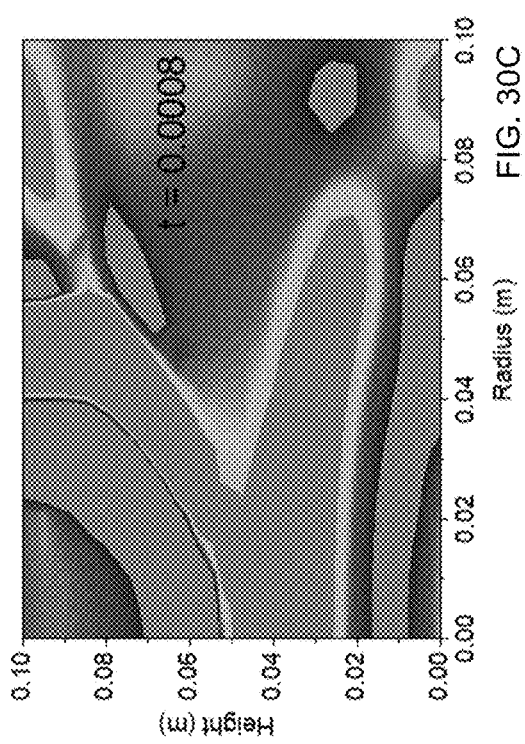

The effect of impulse load frequency and soil parameters on the dynamic soil response was studied and is summarized in this section for the above-mentioned groups of soils. For the first group, the soil properties were taken as: Young's modulus is 20 MPa; Poisson's ratio is 0.35; dry density is 1800 kg/m$^3$. The wavelength was calculated using the algorithm shown in Appendix G. Several sensitivity analyses under three impulse loads with various predominant frequencies are performed. The impulse load distributions in time and frequency domains are shown in FIG. 25. The loads 1, 2 and 3 have a predominant frequency of 0.05, 0.5 and 5 kHz, respectively. The amplitude of the input force is assumed to be 1 kN. The corresponding soil response at the receiver location is shown in FIG. 26.

As shown in FIG. 26, the different porosities (0.2, 0.4 and 0.6) gave similar output displacement for load 1 and 2, which verified that the size of pore space was not captured by the low-frequency impulse loads. In the inversion process, the porosity will be located at the shallow dimension, which makes the optimization algorithm difficult to be updated. Therefore, the characterization of saturated soil under low-frequency impulse load (below 5 kHz in this case) is nearly impossible. However, in the case of load 3 with a predominant frequency around 5 kHz, the effect of porosity was clearly triggered. The pore-scale of sand, for example, is around 760 μm as reported by [3.28]. Through the root search algorithm described in Appendix G, the wavelength under the load 3 was calculated around 1000-2000 μm, which is close to the poro-space scale of the studied soil. Therefore, the impulse load 3 was a good choice for the lab-scale characterization of soil specimens for group 1.

Similarly, the sensitivity analyses were performed by considering different densities, Young's modulus and Poisson's ratios. The output displacement is shown in FIG. 27. The effects of Young's modulus, Poisson's ratio and density of soil are also shown in FIG. 27. A higher Young's modulus leads to a faster wave travelling speed and a smaller amplitude of the output wave. A higher density, on the contrary, leads to a lower travelling wave speed. Poisson's ratio that measures the tendency of material to expand in directions perpendicular to the direction of compression has an inverse relation with the wave speed. Therefore, it can be seen that the distribution of the output stress wave is a function of porosity, density, Young's modulus and Poisson's ratio.

In the case of soil group 2, dense gravel whose Young's modulus was up to 320 MPa, it was found that the load 3 (up to 5 kHz) generates similar displacement outputs at different porosities (0.1, 0.3 and 0.5), as shown in FIG. 28. It means that load 3 can not trigger the effect of porosity. In order to characterize the porosity for very dense soils, one of the techniques is to further reduce the wavelength of the stress wave by increasing the frequency of the impulse load. It was found that an impulse load 4 with a higher predominant frequency (up to 0.5 MHz), as shown in FIG. 29, could effectively differentiate dense soils with various porosities.

To demonstrate the process of saturated soil characterization in this case study, a synthetic data set was firstly generated to simulate real measurements. For simplicity, the results are only presented herein for soil group 1. The nature of this inversion problem and inversion algorithm selection are discussed in detail in the following sections. At the end, the inversion results (soil parameters) are given based on the synthetic data and selected inversion algorithm.

Synthetic Data

A synthetic data set (the displacement measured by a piezoelectric receiver) was firstly obtained using the following settings: Young's modulus was 20 MPa; Poisson's ratio as 0.35; density of solid skeleton was 1800 kg/m$^3$ and porosity was taken as 0.3; The time interval was set to be 2 ms. Under the impulse load 3, as shown in FIG. 25, the snap shot of displacement contours (symmetric) at various time spans are shown in FIG. 30. The locations of impulse load and receiver are shown in FIG. 30. It is shown that the stress wave propagates through the sample and reaches the receiver at about 0.6 ms. The wave reflection at the bottom boundary is clearly visualized at time 0.8 ms and 0.9 ms.

Figure 31:
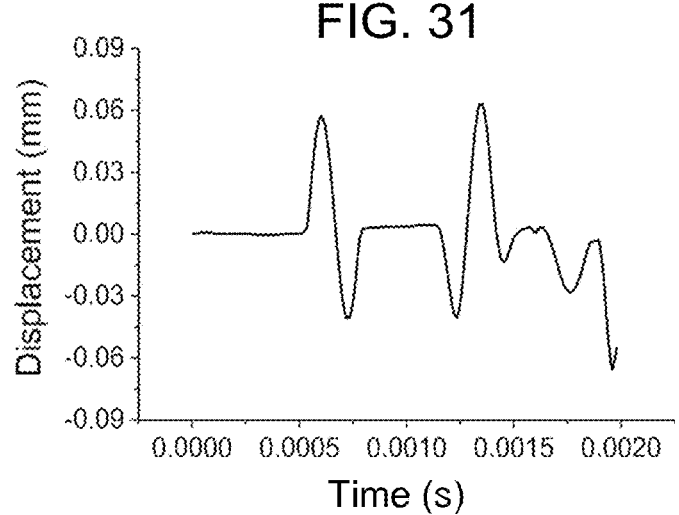
FIG. 31 shows a test soil's dynamic response, as calculated at a receiver location under the third impulse load.

The response measured at the receiver location is summarized in FIG. 31. In the laboratory ultrasonic test, the soil response was only recorded at the receiver location. Thus, in the following inversion process, only the results at the receiver location are used as the input instead of the displacement at the entire domain.

Inversion Algorithm

The inversion algorithm takes the measured displacement at the receiver location (shown in FIG. 31) as the input. The goal of the inversion process is to predict the soil properties including Young's modulus, Poisson's ratio, density and porosity based on the receiver signals. Given the initial guesses for the soil parameters, the inversion algorithm updates the prediction based on the difference between the displacement measured by the receiver and the predicted displacement response.

The update process can be achieved through the gradient-based and gradient-free optimization method. The gradient-based optimization is efficient in large convex problems such as linear least square problems and are commonly used in large optimization problems (e.g. deep learning and adjoint method). Therefore, the gradient based method may be preferred in most cases, especially for convex optimization problems. However, such a method is highly likely to be affected by the local minimum since the gradient at any local minimum is zero. Thus, it is not favorable for non-convex problems.

An analysis was performed to show the nature of the soil characterization optimization problem. It was important to determine whether such application belongs to convex or non-convex problem. Then the corresponding optimization algorithm can be selected based on the nature of the problem. The aim (cost) function is defined as the Euclidean norm between the synthetic and predicted data. The optimization space can be visualized by performing parameter sweep. For example, the optimization space for the porosity and Poisson's ratio is shown in FIG. 32.

Figure 32:
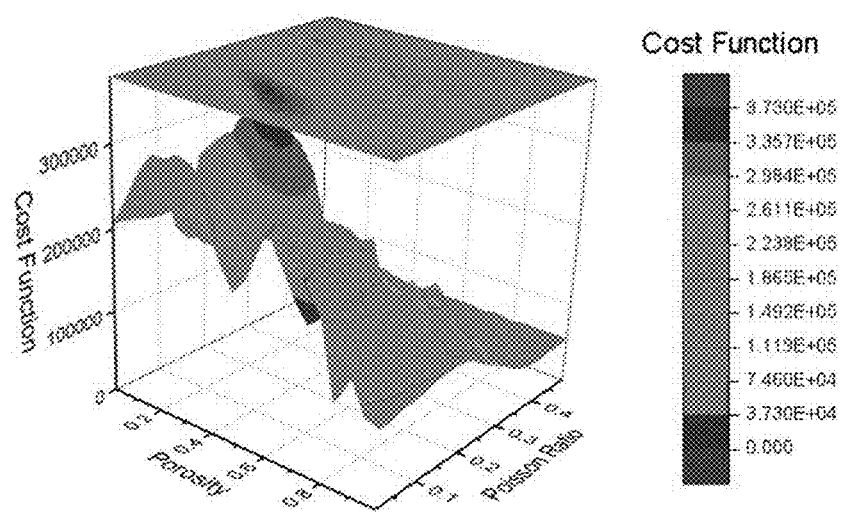
FIG. 32 shows a non-convex optimization space for porosity and Poisson's ratio.

It is shown in FIG. 32 that a multiple local minimum exists in the optimization space. Therefore, the characterization of soil parameters is a non-convex optimization problem. If the gradient-based optimization algorithm is applied, the predictions will be highly dependent on the initial guess, which may lead to erroneous predictions in most cases. To make the estimation robust and accurate, a global optimization algorithm is favorable. In this embodiment, the differential evolution algorithm that is designed for nonlinear and non-differential problems was used. Such an algorithm requires fewer control variables in comparison to other algorithms (e.g. genetic algorithm) and can be easily implemented in parallel computation [3.29].

Figure 33:
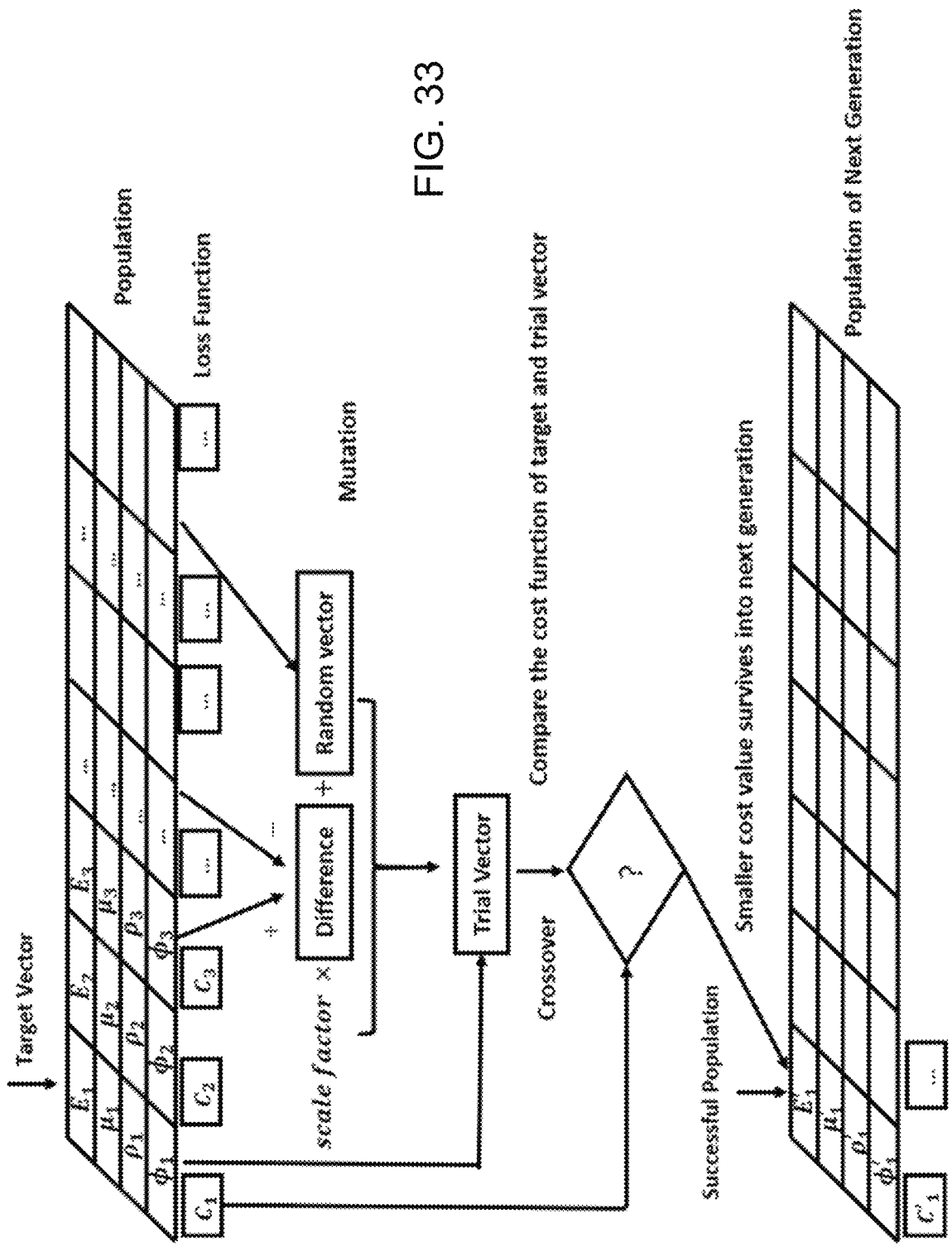
FIG. 33 is a flowchart illustrating a differential evolution algorithm used for optimization of soil parameters in the third embodiment.

A brief description of the differential evolution algorithm is given in FIG. 33. First, a population of candidate solutions are generated randomly; Then by moving around in the search space through a combination of the existing temporary solutions, a series of better solutions is expected to be obtained. In the differential evolution, the mutation constant is taken in the range of 0.5 to 1 and the recombination constant is recommended to be 0.9 [3.30].

Inversion Results

Figure 34:
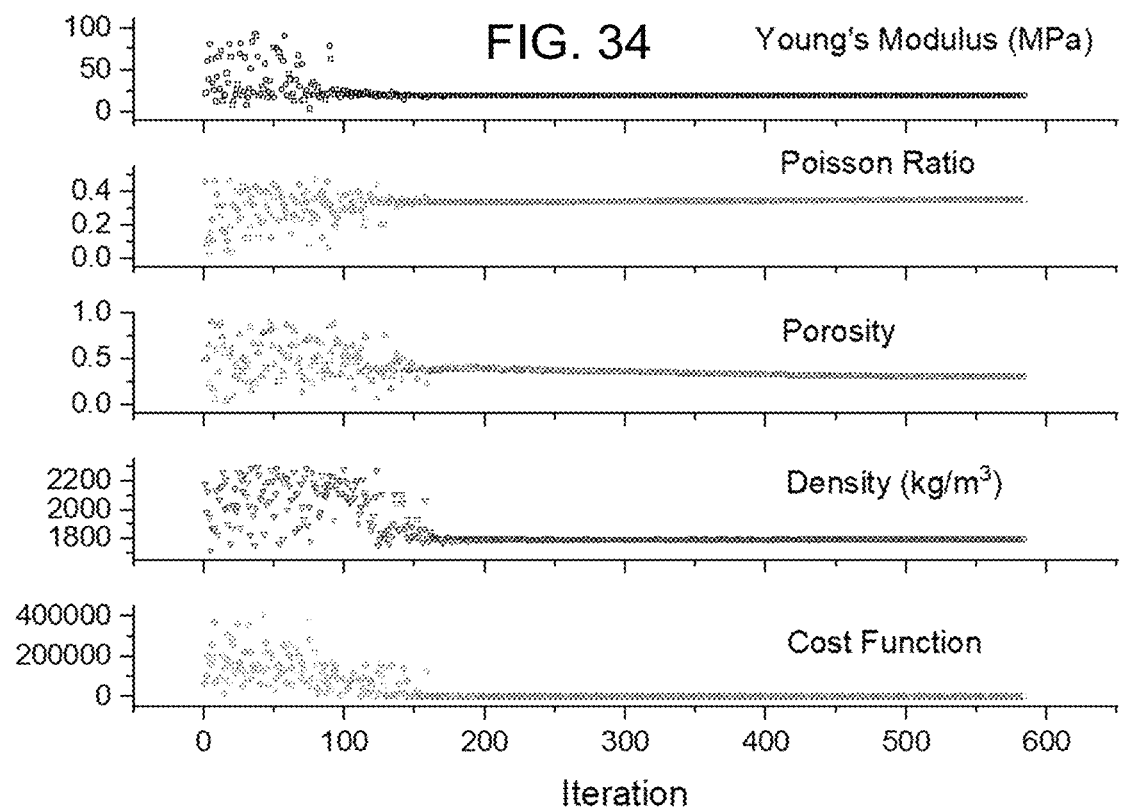
FIG. 34 shows updates of each soil parameter through execution of the differential evolution algorithm.

Combining the synthetic data (as the input) shown in FIG. 31 and the differential evolution algorithm described above, the updates of the soil parameters and the corresponding values of the cost function are shown in FIG. 34. The iteration number shows the number of times that the forward problem was solved independently. After 200 iterations, the differential evolution algorithm stabilized. The predicted soil parameters were as follows: Young's modulus was 20 MPa; Poisson's ratio was 0.35; density was 1800 kg/m$^3$; porosity was 0.3 and loss function was 0. It can be seen that the prediction of soil parameters based on the transmitted wave measured by the receiver (as shown in FIG. 31) was exactly the same as the original input.

Figure 35:
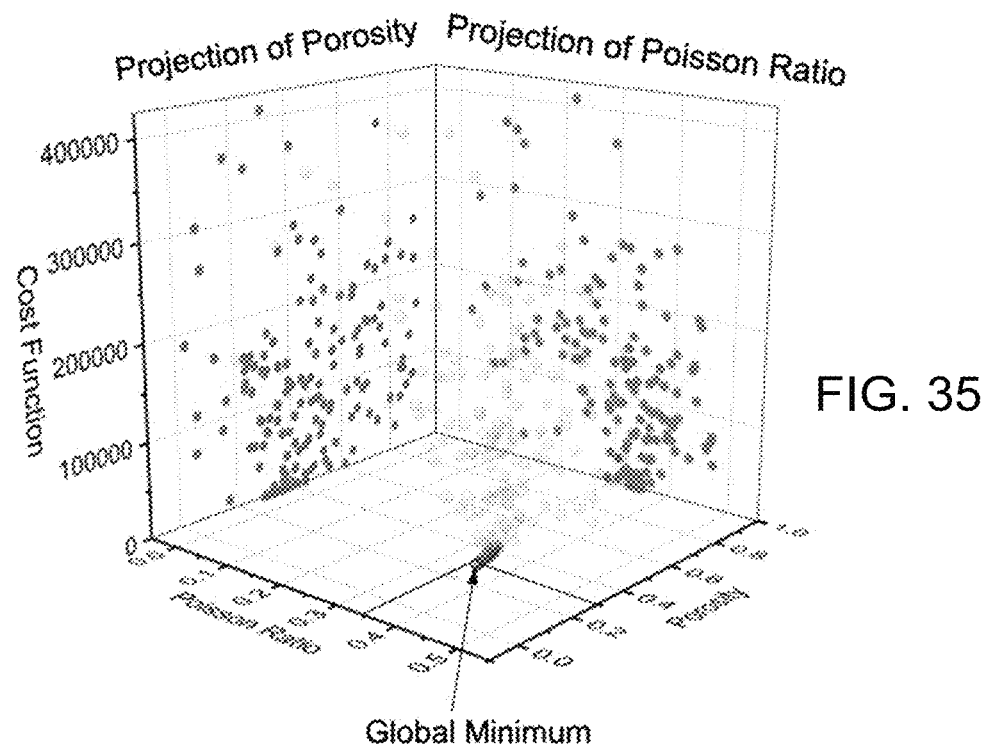
FIG. 35 shows updates of Poisson's ratio and porosity through execution of the differential evolution algorithm.
Figure 36:
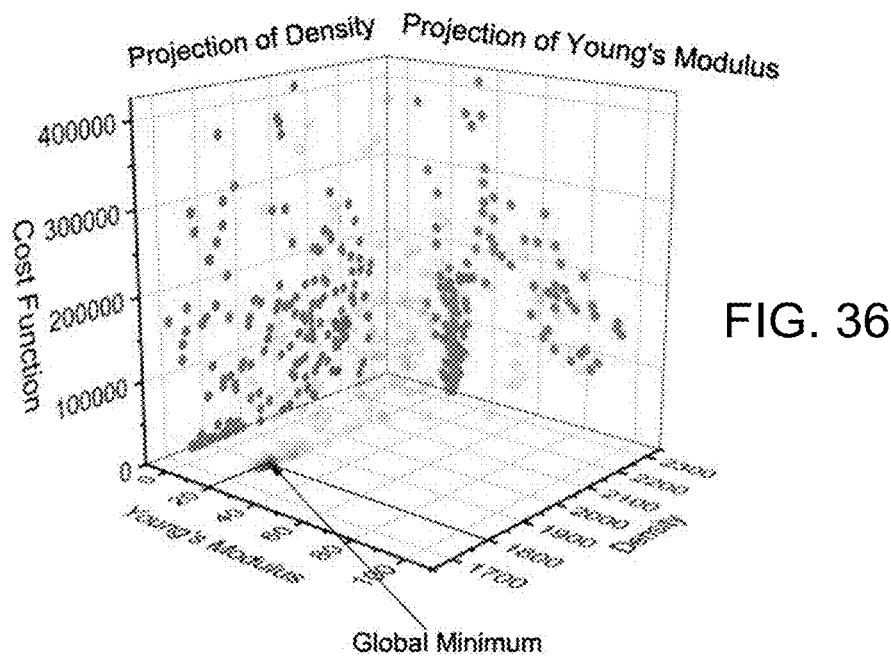
FIG. 36 shows updates of Young's modulus and density through execution of the differential evolution algorithm.

The differential evolution algorithm successfully found the global minimum, despite of the existence of multiple local minimum. The spatial distribution of soil parameters updates are shown in FIGS. 35 and 36. Through the projection of each parameter, it can be seen that Young's modulus was relatively easier to update. For the other three parameters (Poisson's ratio, density and porosity), there were multiple locations where cost function is close to zero. Thus, it took more number of iterations to update to the true values. However, it can be seen such a multidimensional optimization problem was well handled by the differential evolution algorithm.

Uncertainty Analysis

Figure 37A:
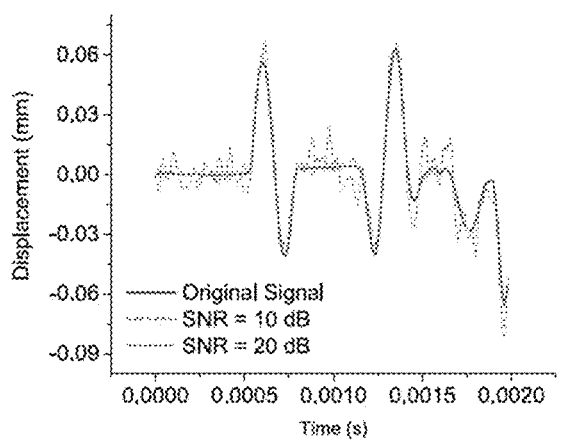
FIG. 37A show noisy data of varying signal to noise ratio, and 37B shows a normal distributed probability density function of the signal to noise ratio.
Figure 37B:
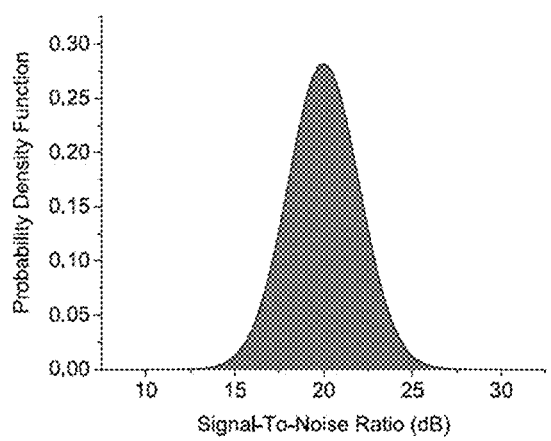

The predicted soil properties (Young's modulus, Poisson's ratio, density and porosity) are likely to be affected by the noise level of the measurement data, which could be introduced by the sensor measurement errors and ambient noise. In an uncertainty analysis, random white noise was added to measured displacement data with targeted signal-to-noise (SRN) ratio. For example, the noisy data with 10 and 20 dB of SRN is shown in FIG. 37A. A normal distributed probability density function of SRN was used as the input to account the uncertainty introduced by noise, as shown in FIG. 37B. It was assumed that there is a 28% possibility to have a SRN of 20 dB in measured data.

Figure 38A:
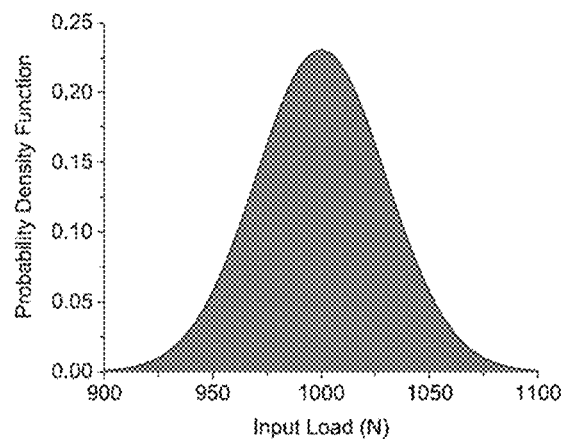
FIGS. 38A and 38B show probability density functions for input load and hydraulic conductivity, respectively.
Figure 38B:
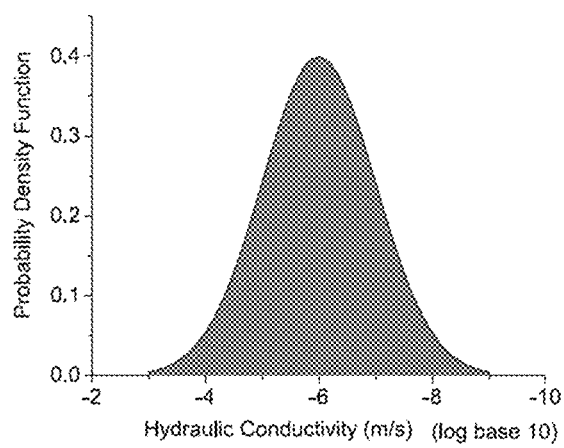
Figure 39:
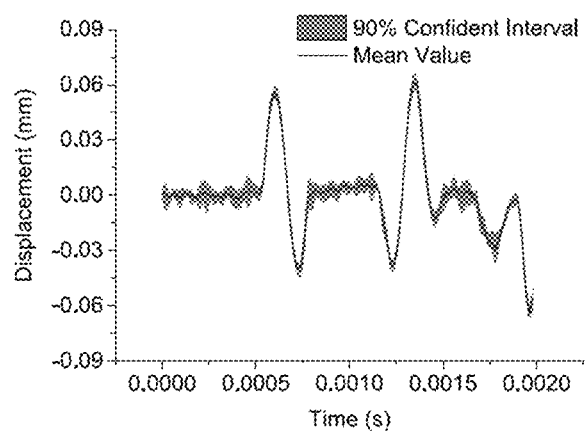
FIG. 39 shows a 90% confidence interval for displacement at the receiver location in the third embodiment.

In addition, the uncertainty can be introduced by the unknown coupling performance in the interface of piezoelectric sensors and soil specimens. The input electricity signal does not necessarily generate the desired input pressure. To account for such uncertainties, the magnitude of input load is assumed to be in normal distribution, as shown in FIG. 38A. The uncertainty also comes from the inherent soil property assumptions made in soil specimen during the inversion analysis, such as hydraulic conductivity. Thus, a normal probability distribution is also applied to account such uncertainty, as shown in FIG. 38B.

The generalized Polynomial Chaos Expansions (PCE) method developed by [3.31] was used for the uncertainty analysis in this case study. The PCE technique, as a rigorous uncertainty quantification method, provided reliable numerical estimates of uncertain physical quantities. It was also reported that the PCE is much faster than Monte Carlo methods when the number of uncertainty parameters are lower than 20 [3.32]. The 90% confident interval of the displacement at the receiver location is calculated through the PCE technique, shown in FIG. 39.

Based on the inversion analysis, the predicted soil properties in the 90% confidence interval are shown in Table 3.1. Then, the variation ratio is calculated by comparing the mean values (obtained through uncertainty analysis) with the original predictions. It is found the prediction of porosity could be affected by the uncertainty introduced by the white Gaussian noise, coupling effect between transmitter and soil specimen as well as other factors. However, various signal processing methods can be used to improve the noisy measurements.

TABLE 3.1

The soil parameter variation rangebased on uncertainty analysis

| Soil Properties | Lower Bound | Upper Bound | Variation Ratio |
|---|---|---|---|
| Young's Modulus (MPa) | 20.42 | 20.92 | 3.3% |
| Poisson Ratio | 0.352 | 0.354 | 0.3% |
| Density (kg/m$^3$) | 1813.59 | 1878.58 | 2.6% |
| Porosity | 0.26 | 0.27 | 11.7% |

Third Embodiment Case Study Summary

In this case study, an ultrasonic-based system and methodology for characterization of soil specimens was developed for the instant measurement of soil properties including Young's modulus and Poisson's ratio (compression/shear wave velocity), density and porosity. The developed meshless semi-analytical algorithm reduced the computational effort significantly in comparison to standard numerical techniques such as the finite element method. One advantage of such a solution was that the dynamic response is evaluated at the receiver location only rather than the entire domain. The soil response in other locations was not measured in the real application and did not play a role in the soil characterization.

It was concluded that high-frequency impulse loads (with predominant frequency of up to 5 kHz) was required to trigger the effect of porosity for soils with relatively low Young's modulus (e.g clay, silt and sand). For stiffer materials, such as very dense gravels, an impulse load with predominant frequency of 0.5 MHz was required to characterize their porous nature. The characterization of soil properties proved to be a highly non-convex optimization problem in this case study. The differential evolution algorithm, as a global optimization method, was found efficient and effective in finding the optimum soil properties, such that the difference between the predicted and measured stress waves was minimized. In conclusion, the developed method in interpreting dynamic response of saturated soil can be used for the immediate characterization of Young's modulus, Poisson's ratio, density and porosity for a given soil specimen.

Fourth Working Embodiment (Saturated Soil)

Methodology Overview

Figure 40:
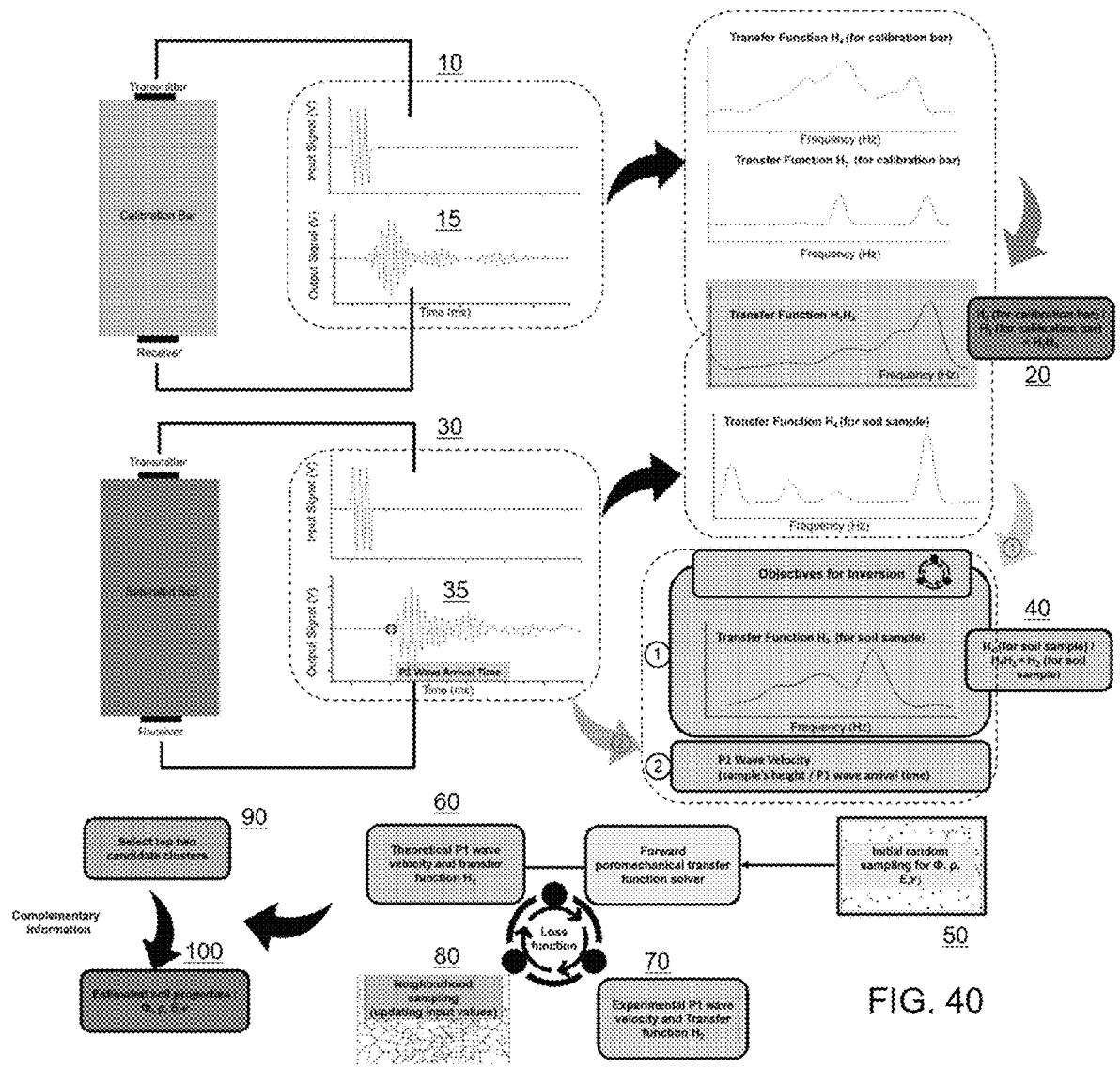
FIG. 40 is a combined block and flowchart diagram illustrating a workflow sequence executed in the fourth embodiment using the QUS system thereof.

FIG. 40 shows an overview of a proposed Quantitative Ultrasound (QUS) sensing system and methodology for the ultrasonic characterization of saturated soil samples using the inventive spectral element poromechanical approach in a manner that improves on the third embodiment in similar fashion to the way the second embodiment improved on the first. Firstly, the ultrasonic test is performed with a calibration bar, like that of the second embodiment, at step 10. Based on the ultrasonic measurements for the calibration bar at step 15, the product of transfer function $H_1$ and $H_3$ is determined at step 20, as described previously for the second embodiment. Then, from the ultrasonic measurements for saturated soils performed at step 35, the experimental P1 wave velocity and transfer function $H_2$ are obtained at step 40. A random sample of soil properties is initially generated at step 50 to ensure that soil parameters are not affected by a local minimum. Then the forward spectral element multiphase poromechanical transfer function for saturated soil is used to compute the theoretical P1 wave velocity and transfer function $H_2$ at step 60. Then the samples are ranked based on the objective (loss) function between the experimental and theoretical values at step 70. Based on the ranking of each sample, the Voronoi polygons (Neighborhood sampling method) are used to generate better samples with a smaller objective function until the solution converges at step 80. In the preferred embodiment, the best two candidate clusters are selected at step 90 based on the ranking of the loss function, from which the most likely physical and mechanical properties of the saturated soil test sample are obtained, taking into consideration other complementary information of the test sample at step 100.

System Calibration

In the QUS system of the fourth embodiment, the output voltage measured at the ultrasonic receiver can be related to the input voltage exciting the ultrasonic transducer in the frequency domain, as shown in Equation 4.1:

$$\underbrace{\frac{Force\ (\omega)}{Voltage_{in}(\omega)}}_{H_1} \times \underbrace{\frac{Displacement\ (\omega)}{Force\ (\omega)}}_{H_2} \times \underbrace{\frac{Voltage_{out}(\omega)}{Displacement\ (\omega)}}_{H_3} = \quad (4.1)$$

$$\underbrace{\frac{Voltage_{out}(\omega)}{Voltage_{in}(\omega)}}_{H_4}$$

Referring again to FIG. 12, the transfer function $H_2$, which is calculated by means of a modified fourth embodiment of the spectral element poromechanical solver, is defined in Equation 4.28 further below. The transfer function $H_2$ is dependent on the properties of the soil sample, sample geometry, and the transducer diameter. Based on Equation 4.28, the transfer function $H_2$ is independent of the distribution of the applied force to the soil sample in both time and frequency domains. Hence, in the ultrasonic sensing system (as explained in FIG. 12 and Equation 4.1), the transfer function $H_2$ can be determined given the testing material properties, sample geometry and transducer diameter. The transfer function $H_4$ can be measured based on the input and output electrical signals in the frequency domain. Therefore, despite the unknown induced force of the ultrasonic transmitter under an electrical impulse, we can still determine the product of $H_1$ and $H_3$ given the transfer function $H_2$.

Fourth Embodiment Methodology: Poromechanical Transfer Function

By assuming the infinitesimal deformation of solid skeleton, the dynamic poroelastic governing equations are written as follows:

$$\mu u_{i,jj} + (\lambda_c + \mu) u_{j,ji} + \alpha M w_{j,ji} = -\rho b_i + \rho \ddot{u}_i + \rho_f \ddot{w}_i, \quad (4.1a)$$

$$\alpha M u_{j,ji} + M w_{j,ji} = -f + \rho_f \ddot{u}_i + m \ddot{w}_i + b \dot{w}_i, \quad (4.1b)$$

where u is the displacement vector of the solid skeleton; w is the fluid displacement relative to the solid skeleton; $\lambda$ and $\mu$ are the Lamé constants; $\alpha$ is the Biot coefficient, p is the pore-water pressure; M is $$1 \Big/ \left( \frac{\Phi}{K_f} + \frac{\alpha - \Phi}{K_S} \right)$$

in which $K_f$ is the bulk modulus of the fluid; $K_s$ is the bulk modulus of the solid skeleton and $\varphi$ is the porosity. $\lambda_c = \lambda + \alpha^2 M$; $m = \rho_f \beta / \varphi$ in which ß is the tortuosity which is used to describe the diffusion properties in porous media, and $\rho_f$ is the density of pore-water, taken as 1000 kg/m³. The drag-force damping coefficient b is calculated as [4.21]:

$$b = \eta / \kappa F, \quad (4.2)$$

where $\eta$ is the fluid dynamic viscosity and $\kappa$ is the permeability coefficient; F is the viscous correction factor [4.22]:

$$F(\omega) = \sqrt{1 + \frac{i}{2} M_i \frac{\omega}{\omega_c}}, \quad \omega_c = \frac{\eta \phi}{2\pi \beta \rho_j \kappa}, \quad (4.3)$$

in which $M_i$ is taken as 1; $i = \sqrt{-1}$ and $\omega$ is the angular frequency.

The governing equations can be written in frequency domain through the Fourier transform by performing convolution with $e^{-i\omega t}$ in which $\omega$ is the frequency and t denotes time variable. The governing equations in Laplace domain can be obtained by replacing $\omega$ with $-is$ where s is the Laplace variable.

To obtain the analytical solution, the Helmholtz decomposition is used to decouple the P and S waves. The displacement vector is usually expressed in terms of a scalar potential ($\varphi$) and a vector potential ($\vec{\psi} = [\psi_r, \psi_\theta, \psi_z]$), as shown in Eqs. 4.4a and 4.4b. In axisymmetric conditions, only the components in r and z directions are considered. Since P wave exits in solid skeleton and fluid, two P wave potentials are used, $\varphi_s$ and $\varphi_f$, respectively.

$$\vec{u}(r,z) = \nabla \phi_s(r,z) + \nabla \times \vec{\psi}_s(r,z) \text{ and } \nabla \cdot \vec{\psi}_s(r,z) = 0, \quad (4.4a)$$

$$\vec{w}(r,z) = \nabla \phi_f(r,z) + \nabla \times \vec{\psi}_f(r,z) \text{ and } \nabla \cdot \vec{\psi}_f(r,z) = 0, \quad (4.4b)$$

The governing equations in frequency domain in terms of potentials are finally obtained as shown in Eqs. 4.5a-4.5d:

$$(\lambda_c + 2\mu)\nabla^2 \hat{\phi}_s(r,z) + \alpha M \nabla^2 \hat{\phi}_f(r,z) = -\rho \omega^2 \hat{\phi}_s(r,z) - \rho_f \omega^2 \hat{\phi}_f(r,z), \quad (4.5a)$$

$$-\mu \nabla^2 \vec{\hat{\psi}}_s(r,z) = \rho \omega^2 \vec{\hat{\psi}}_s(r,z) + \rho_f \omega^2 \vec{\hat{\psi}}_f(r,z), \quad (4.5b)$$

$$\alpha M \nabla^2 \hat{\phi}_s(r,z) + M \nabla^2 \hat{\phi}_f(r,z) = -\omega^2(\rho_f \hat{\phi}_s(r,z) + \rho_m \hat{\phi}_f(r,z)), \quad (4.5c)$$

$$0 = \rho_f \omega^2 \vec{\hat{\psi}}_s(r,z) + \rho_m \omega^2 \vec{\hat{\psi}}_f(r,z), \quad (4.5d)$$

where $\rho_m = m - ib/\omega$; $\hat{\ }$ represents the terms in frequency domain.

Solution of dilation wave (p waves) using eigen decomposition The equations in terms of P wave potentials (Eqs. 4.5a and 4.5b) in a matrix form is shown as:

$$\underbrace{\begin{bmatrix} \lambda_c + 2\mu & \alpha M \\ \alpha M & M \end{bmatrix}}_{K_p} \begin{Bmatrix} \nabla^2 \hat{\phi}_s(r,z) \\ \nabla^2 \hat{\phi}_f(r,z) \end{Bmatrix} = -\omega^2 \underbrace{\begin{bmatrix} \rho & \rho_f \\ \rho_f & \rho_m \end{bmatrix}}_{M} \begin{Bmatrix} \hat{\phi}_s(r,z) \\ \hat{\phi}_f(r,z) \end{Bmatrix}. \quad (4.6)$$

It can be seen from Eq. 4.6 that $\hat{\Phi}_s$ is and $\hat{\Phi}_f$ are coupled in the governing equations. The diagonalization of such a matrix is required to decouple the system. The Eq. 4.6 is then rearranged into:

$$\begin{Bmatrix} \nabla^2 \hat{\phi}_s(r,z) \\ \nabla^2 \hat{\phi}_f(r,z) \end{Bmatrix} = \underbrace{\begin{bmatrix} k_{11} & k_{12} \\ k_{21} & k_{22} \end{bmatrix}}_{K} \begin{Bmatrix} \hat{\phi}_s(r,z) \\ \hat{\phi}_f(r,z) \end{Bmatrix}, \quad (4.7)$$

where $$k_{11} = \frac{\omega^2(\rho - \alpha \rho_f)}{M\alpha^2 - 2\mu - \lambda_c}, \quad k_{12} = \frac{\omega^2(\rho_f - \alpha \rho_m)}{M\alpha^2 - 2\mu - \lambda_c},$$

$$k_{21} = \frac{\omega^2((2\mu + \lambda_c)\rho_f - M\alpha \rho)}{M(M\alpha^2 - 2\mu - \lambda_c)}, \quad k_{22} = \frac{\omega^2((2\mu + \lambda_c)\rho_m - M\alpha \rho_f)}{M(M\alpha^2 - 2\mu - \lambda_c)}.$$

The K matrix can be rewritten using the Eigen decomposition method:

$$K = PDP^{-1}, \quad (4.8)$$

where P is the eigenvector matrix and D is the eigenvalue matrix of the K matrix:

$$P = \frac{1}{k_{21}} \left\{ -\frac{\left(\sqrt{(k_{11} - k_{22})^2 + 4k_{12}k_{21}} - \right)}{\frac{k_{11} + k_{22})}{2}} \quad \frac{\left(\sqrt{(k_{11} - k_{22})^2 + 4k_{12}k_{21}} + \right)}{\frac{k_{11} - k_{22})}{2}} \right\},$$

$$D = \left\{ \begin{array}{cc} \frac{1}{2}\left(-\left(\sqrt{(k_{11} - k_{22})^2 + 4k_{12}k_{21}} + \right) \atop k_{11} + k_{22}\right) & 0 \\ 0 & \frac{1}{2}\left(\sqrt{(k_{11} - k_{22})^2 + 4k_{12}k_{21}} + \atop k_{11} - k_{22}\right) \end{array} \right\}.$$

It should be noted that Eq. 4.8 is still valid after neglecting the term $1/k_{21}$ in the eigenvector matrix P due to the existence of the term $P^{-1}$. Introducing Eq. (4.8 into Eq. 4.7 and by multiplying $P^{-1}$ and P in the left and right sides, respectively, we can obtain:

$$P^{-1} \nabla^2 \vec{\hat{\phi}}(r,z) P = DP^{-1} \vec{\hat{\phi}}(r,z) P. \quad (4.9)$$

By setting $\vec{\phi}(r, z) = P\vec{y}(r, z)$ in which $\vec{y}(r, z) = [\hat{\phi}_{p1}(r, z), \hat{\phi}_{p2}(r, z)]$, the system is finally decoupled as:

$$\nabla^2 \vec{y}(r,z) = D\vec{y}(r,z). \tag{4.10}$$

Under axisymmetric conditions, Eq. 4.10 for $\vec{y}(r, z) = [\hat{\phi}_{p1}(r, z), \hat{\phi}_{p2}(r, z)]$ in cylindrical coordinates is written as:

$$\left(\frac{\partial^2 \hat{\phi}_{p1}(r, z)}{\partial r^2} + \frac{1}{r}\frac{\partial \hat{\phi}_{p1}}{\partial r} + \frac{\partial^2 \hat{\phi}_{p1}(r, z)}{\partial z^2}\right) - D_{11}\hat{\phi}_{p1}(r, z) = 0, \tag{4.11a}$$

$$\left(\frac{\partial^2 \hat{\phi}_{p2}(r, z)}{\partial r^2} + \frac{1}{r}\frac{\partial \hat{\phi}_{p2}}{\partial r} + \frac{\partial^2 \hat{\phi}_{p2}(r, z)}{\partial z^2}\right) - D_{22}\hat{\phi}_{p2}(r, z) = 0. \tag{4.11b}$$

Since the variables $\hat{\Phi}_{p1}(r, z)$ and $\hat{\Phi}_{p2}(r, z)$ are a function of r and z in the cylindrical coordinates, the separation of variable $\hat{\Phi}_{p1} = \hat{R}(r)Z(z)$ can be used. By setting the both sides equal to $-k^2$ where k is the wavenumber in the radial direction, we can obtain the following equations:

$$\frac{d^2 \hat{R}(r)}{dr^2} + \frac{1}{r}\frac{d\hat{R}(r)}{dr} + k^2\hat{R}(r) = 0, \tag{4.12a}$$

$$\frac{d^2 \hat{Z}(z)}{dz^2} - (k^2 + D_{11})\hat{Z}(z) = 0. \tag{4.12b}$$

The solutions to Eqs. 4.12a and 4.12b are:

$$\hat{R}(r) = C_1 J_0(kr), \tag{4.13a}$$

$$\hat{R}(z) = C_2 e^{-\sqrt{k^2+D_{11}}z}, \tag{4.13b}$$

in which $J_0$ is the Bessel function of the first kind; $C_1$ and $C_2$ are the coefficients to be determined from the boundary conditions. Similarly, the solution for $\hat{\Phi}_{p1}$ can be obtained. The solution for $\vec{y} = [\hat{\Phi}_{p1}, \hat{\Phi}_{p2}]$ is summarized as:

$$\hat{\phi}_{p1}(r, z) = A e^{-\sqrt{k^2+D_{11}}z} J_0(kr), \tag{4.14a}$$

$$\hat{\phi}_{p2}(r, z) = B e^{-\sqrt{k^2+D_{22}}z} J_0(kr). \tag{4.14b}$$

where A and B are the coefficients to be determined from the boundary conditions. For simplicity, the term $\sqrt{k^2+D_{11}}$ and $\sqrt{k^2+D_{22}}$ is denoted as $k_{p1}$ and $k_{p2}$, respectively.

Since $\vec{\Phi} = P\vec{y}$, the solution for $\hat{\Phi}_s$ and $\hat{\Phi}_f$ can be finally obtained as:

$$\hat{\phi}_s(r, z) = p_{11} A e^{-\sqrt{k^2+D_{11}}z} J_0(kr) + p_{12} B e^{-\sqrt{k^2+D_{22}}z} J_0(kr), \tag{4.15a}$$

$$\hat{\phi}_f(r, z) = p_{21} A e^{-\sqrt{k^2+D_{11}}z} J_0(kr) + p_{22} B e^{-\sqrt{k^2+D_{22}}z} J_0(kr). \tag{4.15b}$$

Solution of Rotational Wave (S Wave)

The rotational wave is governed by Eqs. 4.5c and 4.5d. By replacing by $\vec{\psi}_f$ by $\vec{\psi}_s$, we obtain $$\nabla^2 \vec{\hat{\psi}}_s(r, z) - \frac{\left(\frac{\rho_f^2}{\rho_m} - \rho\right)\omega^2}{\mu}\vec{\hat{\psi}}_s(r, z) = 0. \tag{4.16}$$

Under axisymmetric conditions, the solution for Eq. 4.16 in the cylindrical coordinates is obtained as:

$$\hat{\psi}_s(r, z) = C e^{-\sqrt{k^2 + \frac{\left(\frac{\rho_f^2}{\rho_m} - \rho\right)\omega^2}{\mu}} z} J_1(k, r), \tag{4.17}$$

where C is the coefficient to be determined from the boundary conditions and $J_1$ is the Bessel function of the first kind of order one. For simplicity, the term $$\sqrt{k^2 + \frac{\left(\frac{\rho_f^2}{\rho_m} - \rho\right)\omega^2}{\mu}}$$

is denoted as $k_s$.

Displacement, Stress and Pore-Water Pressure in Terms of Potentials

In the cylindrical coordinates (r, θ, z), considering the axisymmetric conditions, the vector potential ψ has only the component in the θ direction that does not vanish. For simplicity, the vector potential ψ in the θ direction is denoted as $\hat{\Phi}_s$ and $\hat{\Phi}_f$ for solid skeleton and porewater, respectively. This property reduces the displacement to the following forms:

$$\hat{u}_r(r, z) = \frac{\partial \hat{\phi}_s(r, z)}{\partial r} - \frac{\partial \hat{\psi}_s(r, z)}{\partial z}, \tag{4.18a}$$

$$\hat{u}_z(r, z) = \frac{\partial \hat{\phi}(r, z)}{\partial z} + \frac{1}{r}\frac{\partial (r\hat{\psi}_s(r, z))}{\partial r},$$

$$\hat{w}_r(r, z) = \frac{\partial \hat{\phi}_f(r, z)}{\partial r} - \frac{\partial \hat{\phi}_f(r, z)}{\partial z}, \tag{4.18b}$$

$$\hat{w}_z(r, z) = \frac{\partial \hat{\phi}_f(r, z)}{\partial z} + \frac{1}{r}\frac{\partial (r\hat{\psi}_f(r, z))}{\partial r}.$$

The effective stress and pore-water pressure are written as:

$$\hat{\sigma}'_{zr}(r, z) = \mu\left(\frac{\partial \hat{u}_r(r, z)}{\partial z} + \frac{\partial \hat{u}_z(r, z)}{\partial r}\right), \tag{4.19a}$$

$$\hat{\sigma}'_{zz}(r, z) = \lambda\left(\frac{\partial \hat{u}_r(r, z)}{\partial r} + \frac{\hat{u}_r(r, z)}{r} + \frac{\partial \hat{u}_z(r, z)}{\partial z}\right) + 2\mu\frac{\partial \hat{u}_z(r, z)}{\partial z}, \tag{4.19b}$$

$$p(r, z) = -\alpha M\left(\frac{\partial^2 \hat{\phi}_s(r, z)}{\partial r^2} + \frac{1}{r}\frac{\partial^2 \hat{\phi}_s(r, z)}{\partial r} + \frac{\partial^2 \hat{\phi}_s(r, z)}{\partial z^2}\right) - M\left(\frac{\partial^2 \hat{\phi}_f(r, z)}{\partial r^2} + \frac{1}{r}\frac{\partial \hat{\phi}_f(r, z)}{\partial r} + \frac{\partial^2 \hat{\phi}_f(r, z)}{\partial z^2}\right) \tag{4.19c}$$

Spectral Element Formulation for Dynamic Poroelasticity

In u-w formulation (displacement of solid and relative displacement of porewater), the displacement components $w_r$ and $w_z$ are linearly dependent. In this example, only $w_z$ is used in the stiffness matrix. For two-node elements where a layer has a finite thickness, the matrix for the displacement components is written as follows:

$$\begin{bmatrix} \hat{u}_{r1}(r,z) \\ \hat{u}_{z1}(r,z) \\ \hat{w}_{z1}(r,z) \\ \hat{u}_{r2}(r,z) \\ \hat{u}_{z2}(r,z) \\ \hat{w}_{z2}(r,z) \end{bmatrix} = \underbrace{\begin{bmatrix} -kp_{11} & -kp_{12} & k_s & -e^{-hkp1}kp_{11} & -e^{hkp2}kp_{12} & -e^{-hk_s}k_s \\ -k_{p1}p_{11} & -k_{p2}p_{12} & k & -e^{-hkp1}k_{p1}p_{11} & -e^{hkp2}k_{p2}p_{12} & e^{-hk_s}k \\ -k_{p1}p_{21} & -k_{p2}p_{22} & -\frac{\rho_f}{\rho_m}k & e^{-hkp1}k_{p1}p_{21} & e^{-hkp2}k_{p2}p_{22} & -\frac{\rho_f}{\rho_m}e^{-hk_s}k \\ -e^{-hkp1}kp_{11} & -e^{-hkp2}kp_{12} & e^{-hk_1}k_s & -kp_{11} & -kp_{12} & -k_s \\ -e^{-hkp1}k_{p1}p_{11} & -e^{-hkp2}k_{p2}p_{12} & e^{-hk_s}k & k_{p1}p_{11} & k_{p2}p_{12} & k \\ -e^{-hkp1}p_{21} & -e^{-hkp2}k_{p2}p_{22} & -\frac{\rho_f}{\rho_m}e^{-hk_s}k & k_{p1}p_{21} & k_{p2}p_{22} & -\frac{\rho_k}{\rho_m}k \end{bmatrix}}_{S'_1}\begin{bmatrix} A_1 \\ B_1 \\ C_1 \\ A_2 \\ B_2 \\ C_2 \end{bmatrix}. \quad (4.20)$$

Similarly, the matrix for effective stress components and porewater pressure in frequency domain is shown in Eq. 4.21 in which the components for matrix S' can be found in Appendix E.

$$\begin{bmatrix} \hat{\sigma}'_{zr1}(r,z) \\ \hat{\sigma}'_{zz1}(r,z) \\ \hat{P}_1(r,z) \\ \hat{\sigma}'_{zr2}(r,z) \\ \hat{\sigma}'_{zz2}(r,z) \\ \hat{P}_2(r,z) \end{bmatrix} = \underbrace{\begin{bmatrix} m_{11} & m_{12} & m_{13} & m_{14} & m_{15} & m_{16} \\ m_{21} & m_{22} & m_{23} & m_{24} & m_{25} & m_{26} \\ m_{31} & m_{32} & m_{33} & m_{34} & m_{35} & m_{36} \\ m_{41} & m_{42} & m_{43} & m_{44} & m_{45} & m_{46} \\ m_{51} & m_{52} & m_{53} & m_{54} & m_{55} & m_{56} \\ m_{61} & m_{62} & m_{63} & m_{64} & m_{65} & m_{66} \end{bmatrix}}_{S'_2}\begin{bmatrix} A_1 \\ B_1 \\ C_1 \\ A_2 \\ B_2 \\ C_2 \end{bmatrix}. \quad (4.21)$$

According to the Cauchy stress principle, the traction force ($[T_{rz1}, T_{z1}, T_1, T_{rz2}, T_{z2}, T_2]$) is taken as the dot product between the stress tensor and the unit vector along the outward normal direction. Due to the convention that the upward direction is negative, the upper boundary becomes $([-\hat{\sigma}_{rz1}, -\hat{\sigma}_{zz1}, \hat{p}_1]^T)$. Similarly, to make the sign consistent, the N matrix is applied to matrix $S'_2 \cdot S'^{-1}_1$. In the future, the matrix $N \cdot S'_2 \cdot S'^{-1}_1$ will be denoted as $G_i$ matrix, in which i denotes the layer number.

$$\begin{Bmatrix} T_{rz1} \\ T_{z1} \\ T_1 \\ T_{rz2} \\ T_{z2} \\ T_2 \end{Bmatrix}_i = \begin{Bmatrix} -\hat{\sigma}_{zr1}(r,z) \\ -\hat{\sigma}_{zz1}(r,z) \\ -\hat{P}_1(r,z) \\ \hat{\sigma}_{zr2}(r,z) \\ \hat{\sigma}_{zz2}(r,z) \\ \hat{P}_2(r,z) \end{Bmatrix}_i = \underbrace{N \cdot S'_2 \cdot S'^{-1}_1}_{G_1} \cdot \begin{Bmatrix} \hat{u}_{r1}(r,z) \\ \hat{u}_{z1}(r,z) \\ \hat{w}_{z1}(r,z) \\ \hat{u}_{r2}(r,z) \\ \hat{u}_{z2}(r,z) \\ \hat{w}_{z2}(r,z) \end{Bmatrix}_i, \quad (4.22)$$

where $$N = \begin{bmatrix} -1 & 0 & 0 & 0 & 0 & 0 \\ 0 & -1 & 0 & 0 & 0 & 0 \\ 0 & 0 & -1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}. \quad (4.23)$$

After obtaining the stiffness matrix for each element, the global stiffness matrix can be obtained by applying the continuity conditions between the layer interfaces. The stiffness assembling method is the same as that shown in FIG. 11. The global stiffness is denoted as H matrix for simplicity. An example of the global stiffness matrix for a two layer system is provided in Appendix F.

Transfer Function $H_2$ for Saturated Soils

In the ultrasonic tests, a vertical impulse load $f(t, r)$ is applied to one end of the soil specimen. The surface is assumed to be permeable, which implies the porewater pressure at the surface is zero. Under such conditions, the displacements in the frequency domain can be written as:

$$\begin{Bmatrix} 0 \\ \hat{f}(s,r) \\ 0 \\ \vdots \\ 0 \end{Bmatrix} = \{H\} \begin{Bmatrix} \hat{u}_{r1} \\ \hat{u}_{z1} \\ \hat{w}_{z1} \\ \vdots \\ \hat{w}_{zn} \end{Bmatrix}. \quad (4.24)$$

The impulse load $f$ is firstly defined in time domain and can decomposed into two independent functions in terms of time variable $f_n(t)$ and radial variable $f_r(r)$:

$$f(t,r) = f_n(t) f_r(r). \quad (4.25)$$

The mathematical expression for the function $f_n(t)$ depends mainly on the type of impulse loads created by the signal generator. In this example, a sinusoidal impulse function is used as the external load to simulate the applied load. The load with amplitude of one is mathematically described in Eq. 4.26.

$$f_n(t) = \sin(2\pi ft)[1 - H(t - 1/f)], \quad (4.26)$$

where t(s) is time and $f$(Hz) is the frequency; H( ) is the Heaviside step function.

Meanwhile, the function $f_r(r)$ is normally written using the Fourier-Bessel series:

$$f_r(r) = \sum_{m=1}^{\infty} F_m J_0(k_m r), \quad (4.27)$$

where $$F_m(m) = \frac{2r_0 \sin(r_0 k_m)}{r_\infty^2 k_m J_1^2(r_\infty k_m)} \frac{n+1-m}{n+1},$$

where $r_0$ is the radius of the contact area; $k_m$ is the mode number; n is the total mode number $r_\infty$ is the diameter of the soil specimen.

The transfer function $H_2$ (independent of the applied load distribution $f_n$) is defined as follows:

$$H_2 := \frac{u_{z2}(\omega)}{f_n(\omega)} = \sum_{m=1}^{\infty} \hat{u}_{z2} F_m J_0(k_m r) \quad (4.28)$$

Inversion

The distance between the experimentally measured and numerically predicted P1 wave velocity as well as the Euclidean norm between the experimental and numerical transfer functions $H_2$ may be used as the components of the loss function. The inversion problem can thus be formulated as follows:

$$\begin{cases} \text{minimize } f(x) = \frac{1}{2}\sum_{k=1}^{N} w(y_i - \overline{y}_i(x))^2 + (1-w)\left|(V_{p1} - \overline{V}_{p1})\right| \\ \text{subject to } a_i \le x_i \le b_i, i = 1, \ldots, m \end{cases} \quad (4.29)$$

where $f$ is the loss function; $x=(x_1, x_2, \ldots x_m)$ is the optimization variable (e.g., Young's modulus, Poisson's ratio, density and porosity); the constant $a_i$ and $b_i$ are the limits or bounds for each variable; m is the total number of variables; y and $\overline{y}$ are the numerical and experimental normalized transfer functions $H_2$. $V_{p1}$ and $\overline{V}_{p1}$ are the numerical and experimental P1 wave velocities, respectively; w the weight for the $L_2$ norm to balance the contribution of transfer function and P1 wave velocity.

System Architecture and Workflow

The same system 12 shown in FIG. 23A for calibration and characteristic determination of a permafrost or frozen soil sample in the second embodiment can likewise be used in the saturated soil context of the fourth embodiment. Ultrasonic signal by a function generator 14 and ultrasonic transmitter 16 may be selectively and periodically generated to impart energy in the form of an ultrasonic wave through a saturated soil sample 12 and to generate ultrasonic waves within sample 12. In one example, ultrasonic receiver 18 positioned or positionable oppositely of said ultrasonic transmitter measures the included response in sample 12 in terms of electrical voltage signal. Receiver amplifier 22 amplify and denoise the measured signals by ultrasonic receiver 18. Function generator 14 is in electrical communication with computing device 24 which controls the actuation of ultrasonic source 14, ultrasonic transmitter 16. Ultrasonic receiver 18 and receiver amplifier 22 are in electrical communication with computing device 24 for transmission of received ultrasonic signals thereto.

Computing device 24 comprises one or more processors 26, non-volatile computer-readable memory 28 for storing data associated with the ultrasonic signals transmitted from receiver amplifier 22, and for storing computer readable statements and instructions executable by the processor(s) 26 to at least, via input/output module 32 control the actuation of ultrasonic source by function generator 14 and ultrasonic transmitter 16, and receive the detected ultrasonic signals from ultrasonic receiver 18 and receiver amplifier 22; and determine the characteristics of a permafrost or frozen soil sample 12 based on the methodology described above. Accordingly, through analysis of these detected ultrasonic signals, the characteristics of saturated soil sample 12, such as the porosity, as well as the shear modulus and bulk modulus may be determined. These results may be stored locally in the local memory 28 of the computing device 24, displayed to a user thereof via a screen 34 or other display of integrated or connected relation to the computing device 24, and/or transmitted over the internet or other network to a remote storage location 36 (dedicated storage server, cloud storage server, etc.) for storage thereat, and later retrieval therefrom by the same or a different computing device. While the illustrated example shows a singular computing device that not only interacts with the local equipment 14, 16, 18, 22 to perform and log the results of the ultrasonic test, but also locally executes the multiphase poromechanical model to derive the sample characteristics, it will be appreciated that a distributed architecture dividing these tasks, or any subcomponents thereof, among a plurality of networked computing devices may alternatively be employed. The same computer setup may be employed in either of the two working embodiments detailed above.

Figure 41:
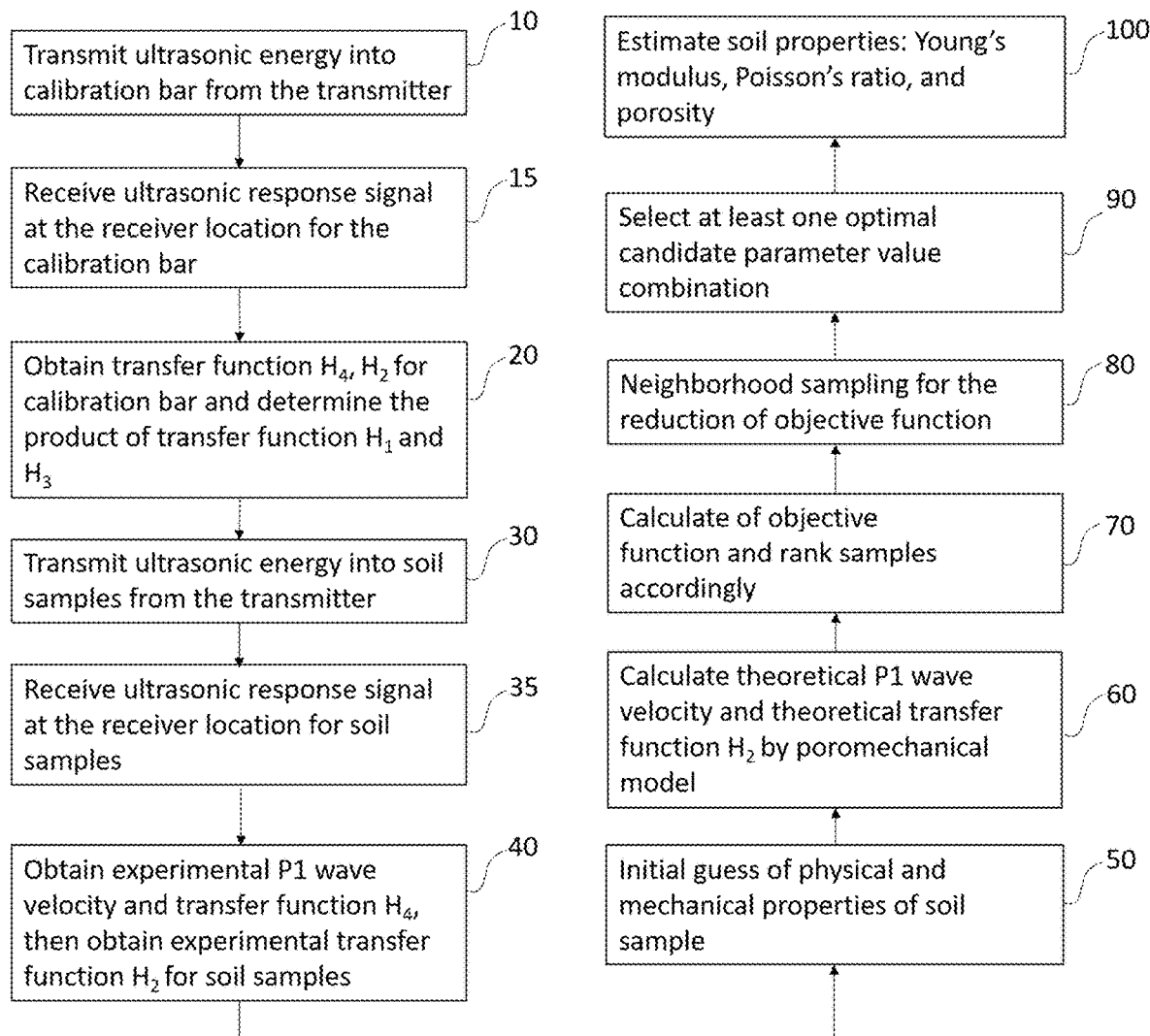
FIG. 41 shows a general workflow schematic for ultrasonic characterization of saturated sample using the system architecture of FIG. 23A.

Turning to FIG. 41, illustrated therein is the general workflow executed by the system of FIG. 23A in the case of the fourth working embodiment. Firstly, at step 10, ultrasonic signal by function generator 14 and ultrasonic transmitter 16 is generated to selectively and/or periodically impart energy in the form of an ultrasonic wave through a calibration bar 12. For example, the generated signal comprises a known amplitude, frequency and duration.

At step 15, ultrasonic receiver 18 measures the included response in a calibration bar 12 in terms of electrical voltage signal.

At step 20, computing device 24 obtains transfer function $H_4$, $H_2$ FOR the calibration bar and then calculate the product of transfer function $H_1$ and $H_3$.

At step 30, ultrasonic signal by function generator 14 and ultrasonic transmitter 16 is generated to selectively and/or periodically impart energy in the form of an ultrasonic wave through a saturated soil sample 12.

At step 35, ultrasonic receiver 18 measures the included response of a saturated soil sample 12 in terms of electrical voltage signal, then amplified and denoised by receiver amplifier 22.

At step 40, computing device 24 obtains experimental P1 wave velocity and transfer function $H_4$, then computes transfer function $H_2$ for a saturated soil sample.

At step 50, initial estimates of the physical and mechanical properties of a saturated soil sample 12 are postulated.

At step 60, computing device 24 uses a forward poromechanical transfer function model to compute the theoretical P1 wave velocity and transfer function $H_2$.

At step 70, samples within a parameter space of the poromechanical transfer function model are ranked based on the objective function between the experimental measurement and theoretical prediction in terms of P1 wave velocity and transfer function $H_2$.

At step 80, a Neighborhood sampling for the reduction of objective function is performed.

At step 90, computing device 24 selects at least one optimal candidate parameter value combination to obtain the most likely physical and mechanical properties of a saturated soil sample 12, and displays and stores such results.

The results from step 90 may be preliminary results with multiple candidates requiring further consideration and final section, whether in fully automated fashion executed by the system, or by human intervention. In such instances, at additional step 100, the final estimate of physical and mechanical properties of a saturated soil sample 12 is determined taking into consideration other complementary information of the test sample, and these final results are then displayed and stored.

APPENDIX A: CALCULATION OF P1 WAVE VELOCITY (FROZEN SOIL & PERMAFROST)

The P1 wave velocity ($v_{p1}$) is determined by a third degree characteristic equation:

$$\Lambda^3 \tilde{R} - \Lambda^2\left((\rho_{11}\tilde{R}_{iW} + \rho_{22}\tilde{R}_{si} + \rho_{33}\tilde{R}_{sw}) - 2(R_{11}R_{33}\rho_{23} + R_{33}R_{12}\rho_{12})\right) + \quad (A.1)$$
$$\Lambda((R_{11}\tilde{\rho}_{iW} + R_{22}\tilde{\rho}_{si} + R_{33}\tilde{\rho}_{sw}) - 2(\rho_{11}\rho_{23}R_{23} + \rho_{33}\rho_{12}R_{12})) - \tilde{\rho} = 0$$

-continued where $$\bar{R} = R_{11}R_{22}R_{33} - R_{23}^2 R_{11} - R_{12}^2 R_{33}$$

$$\bar{R}_{sw} = R_{11}R_{22} - R_{12}^2$$

$$\bar{R}_{iw} = R_{22}R_{33} - R_{23}^2$$

$$\bar{R}_{si} = R_{11}R_{33}$$

$$\bar{\rho} = \rho_{11}\rho_{22}\rho_{33} - \rho_{23}^2 \rho_{11} - \rho_{12}^2 \rho_{33}$$

$$\bar{\rho}_{sw} = \rho_{11}\rho_{22} - \rho_{12}^2$$

$$\bar{\rho}_{iw} = \rho_{22}\rho_{33} - \rho_{23}^2$$

$$\bar{\rho}_{si} = \rho_{11}\rho_{33}$$

The roots of the third degree characteristic equation, denoted as $\Lambda_1$, $\Lambda_2$ and $\Lambda_3$, can be found by computing the eigenvalues of the companion matrix. The velocities of the three types of P-wave ($V_{p1} > V_{p2} > V_{p3}$) are given in the Equation A.2. The P1 wave velocity ($V_{p1}$) is the fastest one among those three velocities.

$$V_{p1} = \sqrt{\frac{1}{\Lambda_1}}; \; V_{p2} = \sqrt{\frac{1}{\Lambda_2}}; \; V_{p3} = \sqrt{\frac{1}{\Lambda_3}} \quad (A.2)$$

APPENDIX B: SPECTRAL ELEMENT MULTIPHASE POROMECHANICAL MODEL (FROZEN SOIL & PERMAFROST)

Kinematics Assumptions

The Green-Lagrange strain tensor ($\epsilon_{ij}$) for infinitesimal deformations expressed as displacement vector $u_i^1$, $u_i^2$ and $u_i^3$ for solid skeleton, pore water and pore ice are shown in Equation B.1.

$$\begin{cases} \epsilon_{ij}^1 = \frac{1}{2}(u_{i,j}^1 + u_{j,i}^1) \\ \epsilon_{ij}^2 = \frac{1}{3}\epsilon_{kk}^2 \delta_{ij}(\epsilon_{kk}^2 = u_{k,k}^2) \\ \epsilon_{ij}^3 = \frac{1}{2}(u_{i,j}^3 + u_{j,i}^3) \end{cases} \quad (B.1)$$

where $\delta_{ij}$ is the identity tensor. The strain tensor of pore water $\epsilon_{ij}^2$ is diagonal since the shear deformation does not exist in pore water component.

Constitutive Model

The constitutive models defined as the relation between the stress and strain tensors for solid skeleton, pore water and pore ice are given in Equation B.2:

$$\begin{cases} \sigma_{ij}^1 = (K_1\theta_1 + C_{12}\theta_2 + C_{13}\theta_3)\delta_{ij} + 2\mu_1 d_{ij}^1 + \mu_{13} d_{ij}^3 \\ \sigma^2 = C_{12}\theta_1 + K_2\theta_2 + C_{23}\theta_3 \\ \sigma_{ij}^3 = (K_3\theta_3 + C_{23}\theta_2 + C_{13}\theta_1)\delta_{ij} + 2\mu_3 d_{ij}^3 + \mu_{13} d_{ij}^1 \end{cases} \quad (B.2)$$

in which $\sigma^1$, $\sigma^2$ and $\sigma^3$ are the effective stress, pore water pressure and ice pressure, respectively. The definition of each term (e.g., $K_1$, $C_{12}$, $C_{13}$, $\mu_1$, $\mu_{13}$, $K_2$, $C_{23}$, $K_3$, $\mu_3$) in Equation B.2 is given in Appendix C. The term $\theta_m$, $d_{ij}^m$ and $\epsilon_{ij}^m$ (m, ranging from 1 to 3, represents the different phases) are defined as follows:

$$\begin{cases} \theta_m = \epsilon_{kk}^m \\ d_{ij}^m = \epsilon_{ij}^m - \frac{1}{3}\delta_{ij}\theta_m \\ \epsilon_{ij}^m = \frac{1}{2}(u_{i,j}^m + u_{j,i}^m). \end{cases}$$

Conservation Laws

The momentum conservation considers the acceleration of each component and the existing relative motion of the pore ice and pore water phases with respect to the solid skeleton. The momentum conservation for the three phases is given by Equation B.3.

$$\begin{cases} \sigma_{ij,j}^1 = \rho_{11}\ddot{u}_i^1 + \rho_{12}\ddot{u}_i^2 + \rho_{13}\ddot{u}_i^3 - b_{12}(\dot{u}_i^2 - \dot{u}_i^1) - b_{13}(\dot{u}_i^3 - \dot{u}_i^1) \\ \sigma_{,i}^2 = \rho_{12}\ddot{u}_i^1 + \rho_{22}\ddot{u}_i^2 + \rho_{23}\ddot{u}_i^3 + b_{12}(\dot{u}_i^2 - \dot{u}_i^1) + b_{23}(\dot{u}_i^2 - \dot{u}_i^3) \\ \sigma_{ij,j}^3 = \rho_{13}\ddot{u}_i^1 + \rho_{23}\ddot{u}_i^2 + \rho_{33}\ddot{u}_i^3 - b_{23}(\dot{u}_i^2 - \dot{u}_i^3) + b_{13}(\dot{u}_i^3 - \dot{u}_i^1). \end{cases} \quad (B.3)$$

in which the expressions for the density terms ($\rho_{ij}$ or $\bar{\rho}$ in matrix form) and viscous matrix ($b_{ij}$ or $\bar{b}$ in matrix form) are given in Appendix C; ü and u̇ is represent second and first derivative of displacement vectors with respect to time; the subscript i represents the component in r, θ and z direction in cylindrical coordinates.

Through the infinitesimal kinematic assumptions, the stress-strain constitutive model and conversation of momentum, the field equation can be written in the matrix form, as shown in Equation B.4.

$$\bar{\rho}\begin{bmatrix}\ddot{u}_i^1 \\ \ddot{u}_i^2 \\ \ddot{u}_i^3\end{bmatrix} + \bar{b}\begin{bmatrix}\dot{u}_i^1 \\ \dot{u}_i^2 \\ \dot{u}_i^3\end{bmatrix} = \bar{R}\nabla\nabla\cdot\begin{bmatrix}u_i^1 \\ u_i^2 \\ u_i^3\end{bmatrix} - \bar{\mu}\nabla\times\nabla\times\begin{bmatrix}u_i^1 \\ u_i^2 \\ u_i^3\end{bmatrix}. \quad (B.4)$$

in which the matrix $\bar{R}$ and $\bar{\mu}$ are given in Appendix C.

By performing divergence operation ($\nabla\cdot$) and curl operation ($\nabla\times$) on both sides of Equation B.4, the field equation in the frequency domain can be written as Equation B.5.

$$\begin{cases} -\bar{\rho}\omega^2\nabla\cdot\begin{bmatrix}u_i^1\\u_i^2\\u_i^3\end{bmatrix} - \bar{b}i\omega\nabla\cdot\begin{bmatrix}u_i^1\\u_i^2\\u_i^3\end{bmatrix} = \bar{R}\nabla^2\nabla\cdot\begin{bmatrix}u_i^1\\u_i^2\\u_i^3\end{bmatrix} \\ -\bar{\rho}\omega^2\nabla\times\begin{bmatrix}u_i^1\\u_i^2\\u_i^3\end{bmatrix} - \bar{b}i\omega\nabla\times\begin{bmatrix}u_i^1\\u_i^2\\u_i^3\end{bmatrix} = \bar{\mu}\nabla^2\nabla\times\begin{bmatrix}u_i^1\\u_i^2\\u_i^3\end{bmatrix} \end{cases} \quad (B.5)$$

Using the Helmholtz decomposition theorem allows us to decompose the displacement field, $\bar{u}$ (equivalent to $u_i$), into the longitudinal potential and transverse vector components as follows, $$\begin{cases} \bar{u}^1 = \nabla\phi_1 + \nabla\times\bar{\psi}_1 \text{ and } \nabla\cdot\bar{\psi}_1 = 0 \\ \bar{u}^2 = \nabla\phi_2 + \nabla\times\bar{\psi}_2 \text{ and } \nabla\cdot\bar{\psi}_2 = 0 \\ \bar{u}^3 = \nabla\phi_3 + \nabla\times\bar{\psi}_3 \text{ and } \nabla\cdot\bar{\psi}_3 = 0 \end{cases} \quad (B.6)$$

By substituting Equation B.6 into the field equation of motion, Equation B.5, we obtain two sets of uncoupled partial differential equations relative to the compressional wave P related to the Helmholtz scalar potentials, and to the shear wave S related to the Helmholtz vector potential, respectively (Equation B.7). In the axi-symmetric condition, only the second components exits in vector $\overline{\psi}$, which is denoted as $\psi$ in the future. It should be mentioned that the field equations in Laplace domain can be easily obtained by replacing $\omega$ with $i \cdot s$ ($i^2 = -1$ and s the Laplace variable).

$$\begin{cases} -\overline{\rho}\omega^2 \begin{bmatrix} \phi_1 \\ \phi_2 \\ \phi_3 \end{bmatrix} - \overline{b}i\omega \begin{bmatrix} \phi_1 \\ \phi_2 \\ \phi_3 \end{bmatrix} = \overline{R}\nabla^2 \begin{bmatrix} \phi_1 \\ \phi_2 \\ \phi_3 \end{bmatrix} \\ -\overline{\rho}\omega^2 \begin{bmatrix} \psi_1 \\ \psi_2 \\ \psi_3 \end{bmatrix} - \overline{b}i\omega \begin{bmatrix} \psi_1 \\ \psi_2 \\ \psi_3 \end{bmatrix} = \overline{\mu}\nabla^2 \begin{bmatrix} \psi_1 \\ \psi_2 \\ \psi_3 \end{bmatrix} \end{cases} \quad (B.7)$$

Solution for the Longitudinal Waves (P Waves) by Eigen Decomposition Equation (B.7) shows that $\phi_1$, $\phi_2$ and $\phi_3$ are coupled in the field equations. The diagonalization of such a matrix is required to decouple the system. Equation B.7 is then rearranged into Equation (B.8):

$$\nabla^2 \begin{bmatrix} \phi_1 \\ \phi_2 \\ \phi_3 \end{bmatrix} = \underbrace{-\overline{R}^{-1}(\overline{\rho}\omega^2 + \overline{b}i\omega)}_{\overline{K}} \begin{bmatrix} \phi_1 \\ \phi_2 \\ \phi_3 \end{bmatrix} \quad (B.8)$$

where the $\overline{K}$ matrix can be rewritten using the Eigen decomposition:

$$\overline{K} = \overline{P}\overline{D}\overline{P}^{-1} \quad (B.9)$$

where $\overline{P}$ is the eigenvector and $\overline{D}$ is the eigenvalue matrix of $\overline{K}$.

By setting $\overline{\phi} = \overline{P}\overline{y}$, where $\overline{y} = [\phi_{p1}, \phi_{p2}, \phi_{p3}]$, we can obtain $\nabla^2 \overline{y} = \overline{D}\overline{y}$. The equation of longitudinal wave has been decoupled. In cylindrical coordinates, the solution for $\overline{y} = [\phi_{p1}, \phi_{p2}, \phi_{p3}]$ is summarized as follows:

$$\begin{cases} \phi_{p1}(r,z) = Ae^{-\sqrt{k^2 + D_{11}}\, z} J_0(kr) \\ \phi_{p2}(r,z) = Be^{-\sqrt{k^2 + D_{22}}\, z} J_0(kr) \\ \phi_{p3}(r,z) = Ce^{-\sqrt{k^2 + D_{33}}\, z} J_0(kr) \end{cases} \quad (B.10)$$

where k is the wave number; coefficient A, B and C will be determined by boundary conditions; $D_{11}$, $D_{22}$, and $D_{33}$ are the diagonal components of $\overline{D}$; $J_0$ is the Bessel function of the first kind. For simplicity, The term $\sqrt{k^2+D_{11}}$, $\sqrt{k^2+D_{22}}$ and $\sqrt{k^2+D_{33}}$ is denoted as $k_{p1}$, $k_{p2}$ and $k_{p3}$, respectively.

Now, the P wave potentials can be written as:

$$\begin{Bmatrix} \phi_1 \\ \phi_2 \\ \phi_3 \end{Bmatrix} = \begin{Bmatrix} p_{11} & p_{12} & p_{13} \\ p_{21} & p_{22} & p_{23} \\ p_{31} & p_{32} & p_{33} \end{Bmatrix} \begin{Bmatrix} \phi_{p1} \\ \phi_{p2} \\ \phi_{p3} \end{Bmatrix} \quad (B.11)$$

where $p_{ij}$ are the components for the eigenvector of $\overline{P}$.

Solution for Shear Waves (S Waves)

The solutions for the S wave potentials can be solved in a similar manner. The Equation B.12 is firstly rearranged into Equation B.13:

$$-\overline{\rho}\omega^2 \begin{bmatrix} \psi_1 \\ \psi_2 \\ \psi_3 \end{bmatrix} - \overline{b}i\omega \begin{bmatrix} \psi_1 \\ \psi_2 \\ \psi_3 \end{bmatrix} = \overline{\mu}\nabla^2 \begin{bmatrix} \psi_1 \\ \psi_2 \\ \psi_3 \end{bmatrix} \quad (B.12)$$

$$\underbrace{-\overline{\rho}\omega^2 - \overline{b}i\omega}_{\overline{A}} \begin{bmatrix} \psi_1 \\ \psi_2 \\ \psi_3 \end{bmatrix} = \overline{\mu}\nabla^2 \begin{bmatrix} \psi_1 \\ \psi_2 \\ \psi_3 \end{bmatrix} \quad (B.13)$$

Since $\psi_w$ can be expressed as a function of $\psi_s$ and $\psi_i$ (shown in Equation B.14), the Equation B.13 is further simplified and rearranged into Equation B.15:

$$\begin{cases} A_{21}\psi_1 + A_{22}\psi_2 + A_{23}\psi_3 = 0 \\ \psi_2 = -\dfrac{A_{21}\psi_1 + A_{23}\psi_3}{A_{22}} \end{cases} \quad (B.14)$$

$$\nabla^2 \begin{bmatrix} \psi_1 \\ \psi_3 \end{bmatrix} = \underbrace{\begin{bmatrix} \mu_{11} & \mu_{13} \\ \mu_{13} & \mu_{33} \end{bmatrix}^{-1} \overline{C}}_{\overline{N}} \begin{bmatrix} \psi_1 \\ \psi_3 \end{bmatrix}. \quad (B.15)$$

where $$\overline{C} = \begin{pmatrix} A_{11} - \dfrac{A_{12}A_{21}}{A_{22}} & A_{13} - \dfrac{A_{32}A_{23}}{A_{22}} \\ A_{31} - \dfrac{A_{32}A_{21}}{A_{22}} & A_{33} - \dfrac{A_{32}A_{23}}{A_{22}} \end{pmatrix}$$

The $\overline{N}$ matrix can be rewritten using the eigen decomposition ($\overline{N} = \overline{Q}\,\overline{G}\,\overline{Q}^{-1}$), where $\overline{Q}$ is the eigenvector and $\overline{G}$ is the eigenvalue matrix of $\overline{N}$. By setting $\overline{\psi} = \overline{Q}\,\overline{y}'$ where $\overline{y}' = [\psi_{s1}, \psi_{i1}]$, we can obtain:

$$\psi_{s1} = Ee^{-\sqrt{k^2 + G_{11}}\, z} J_1(kr) \quad (B.16)$$

$$\psi_{i1} = Fe^{-\sqrt{k^2 + G_{22}}\, z} J_1(kr) \quad (B.17)$$

where $J_1$ is the Bessel function of the first kind with order 1. $G_{11}$ and $G_{22}$ are the diagonal components of matrix $\overline{G}$. For simplicity, the term $\sqrt{k^2+G_{11}}$ and $\sqrt{k^2+G_{22}}$ is denoted as $k_{s1}$ and $k_{s2}$.

Finally, the solution of S wave potentials can be written as:

$$\begin{Bmatrix} \psi_1 \\ \psi_3 \end{Bmatrix} = \begin{Bmatrix} Q_{11} & Q_{12} \\ Q_{21} & Q_{22} \end{Bmatrix} \begin{Bmatrix} \psi_{s1} \\ \psi_{i1} \end{Bmatrix} \quad (B.18)$$

where $Q_{ij}$ are the components for eigenvector of $\overline{Q}$.

Layer Element with Finite Thickness

By including both incident wave and reflected wave, the potentials for a layer with finite thickness can be written in Equation B.19:

$$\begin{bmatrix} u_{r1}^1 \\ u_{z1}^1 \\ u_{z1}^2 \\ u_{r1}^3 \\ u_{z1}^3 \\ u_{r2}^1 \\ u_{z2}^1 \\ u_{z2}^2 \\ u_{r2}^3 \\ u_{z2}^3 \end{bmatrix} = [S_1] \begin{bmatrix} A_1 \\ B_1 \\ C_1 \\ E_1 \\ F_1 \\ A_2 \\ B_2 \\ C_2 \\ E_2 \\ F_2 \end{bmatrix} \quad (B.19)$$

where the components of $S_1$ is given in Appendix D; the subscript 1 and 2 represent the nodes for the upper and lower layer, respectively. The coefficient A to F is determined by the boundary condition.

The matrix of effective stress, pore water pressure and pore ice pressure in the frequency domain is shown in Equation B.20 in which the components for matrix $S_2$ can be found in the Appendix D.

$$\begin{bmatrix} \sigma_{r1}^1 \\ \sigma_{z1}^1 \\ p_1 \\ \sigma_{r1}^3 \\ \sigma_{z1}^3 \\ \sigma_{r2}^1 \\ \sigma_{r2}^1 \\ p_2 \\ \sigma_{r2}^3 \\ \sigma_{z2}^3 \end{bmatrix} = [S_2] \begin{bmatrix} A_1 \\ B_1 \\ C_1 \\ E_1 \\ F_1 \\ A_2 \\ B_2 \\ C_2 \\ E_2 \\ F_2 \end{bmatrix} \quad (B.20)$$

According to the Cauchy stress principle, the traction force (T) is taken as the dot product between the stress tensor and the unit vector along the outward normal direction. Due to the convection that the upward direction is negative, the upper boundary becomes negative. Similarly, to make the sign consistent, the N matrix is applied to matrix $S_2 \cdot S_1^{-1}$. In the future, the matrix $N \cdot S_2 \cdot S_1^{-1}$ will be denoted as the G matrix.

$$\begin{bmatrix} T_{r1}^1 \\ T_{z1}^1 \\ T_1 \\ T_{r1}^3 \\ T_{z1}^3 \\ T_{r2}^1 \\ T_{z2}^1 \\ T_2 \\ T_{r2}^3 \\ T_{z2}^3 \end{bmatrix} = \begin{bmatrix} -\sigma_{r1}^1 \\ -\sigma_{z1}^1 \\ -p_1 \\ -\sigma_{r1}^3 \\ -\sigma_{z1}^3 \\ \sigma_{r2}^1 \\ \sigma_{z2}^1 \\ p_2 \\ \sigma_{r2}^3 \\ \sigma_{z2}^3 \end{bmatrix} = \underbrace{N \cdot S_2 \cdot S_1^{-1}}_{G} \begin{bmatrix} u_{r1}^1 \\ u_{z1}^1 \\ u_{z1}^2 \\ u_{r1}^3 \\ u_{z1}^3 \\ u_{r2}^1 \\ u_{z2}^1 \\ u_{z2}^2 \\ u_{r2}^3 \\ u_{z2}^3 \end{bmatrix} \quad (B.21)$$

where $$N = \begin{bmatrix} -1 & 0 & 0 & 0 & 0 & 0 & 0 & 0 & 0 & 0 \\ 0 & -1 & 0 & 0 & 0 & 0 & 0 & 0 & 0 & 0 \\ 0 & 0 & -1 & 0 & 0 & 0 & 0 & 0 & 0 & 0 \\ 0 & 0 & 0 & -1 & 0 & 0 & 0 & 0 & 0 & 0 \\ 0 & 0 & 0 & 0 & -1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{bmatrix} \quad (B.22)$$

The radial component of the applied load decomposed from the external load is defined as:

$$f_r(r) = \sum_{m=1}^{\infty} F_m J_0(k_m r) \quad (B.23)$$

where $$F_m(m) = \frac{2r_0 \sin(r_0 k_m)}{r_\infty^2 k_m J_1^2(r_\infty k_m)}$$

where $r_0$ is the radius of the contacting area of the ultrasonic transmitter; n is the total mode number; $r_\infty$ is the diameter of the soil sample.

APPENDIX C: PARAMETERS DEFINITION IN THREE-PHASE POROMECHANICAL MODEL (FROZEN SOIL & PERMAFROST)

The matrices $\bar{\rho}, \bar{b}, \bar{R}, \bar{\mu}$ and $\bar{A}$ are defined as follows:

$$\bar{\rho} = \begin{bmatrix} \rho_{11} & \rho_{12} & \rho_{13} \\ \rho_{12} & \rho_{22} & \rho_{23} \\ \rho_{13} & \rho_{23} & \rho_{33} \end{bmatrix} \bar{b} = \begin{bmatrix} b_{12}+b_{13} & -b_{12} & -b_{13} \\ -b_{12} & b_{12}+b_{23} & -b_{23} \\ -b_{13} & -b_{23} & b_{13}+b_{23} \end{bmatrix}$$

$$\bar{R} = \begin{bmatrix} R_{11} & R_{12} & R_{13} \\ R_{12} & R_{22} & R_{23} \\ R_{13} & R_{23} & R_{33} \end{bmatrix} \bar{\mu} = \begin{bmatrix} \mu_{11} & 0 & \mu_{13} \\ 0 & 0 & 0 \\ \mu_{13} & 0 & \mu_{33} \end{bmatrix}$$

$$\bar{A} = -\begin{pmatrix} \omega((b_{12}+b_{13})i+\rho_{11}\omega) & \omega(\rho_{12}\omega-b_{12}i) & \omega(\rho_{13}\omega-b_{13}i) \\ \omega(\rho_{12}\omega-b_{12}i) & \omega((b_{12}+b_{23})i+\rho_{22}\omega) & \omega(\rho_{23}\omega-b_{23}i) \\ \omega(\rho_{13}\omega-b_{13}i) & \omega(\rho_{23}\omega-b_{23}i) & \omega((b_{13}+b_{23})i+\rho_{33}\omega) \end{pmatrix}$$

$$a_{12} = r_{12} \frac{\phi_s(\phi_w \rho_w + \phi_i \rho_i)}{\phi_w \rho_w(\phi_w + \phi_i)} + 1$$

$$a_{23} = r_{23} \frac{\phi_s(\phi_w \rho_w + \phi_s \rho_s)}{\phi_w \rho_w(\phi_w + \phi_s)} + 1$$

$$a_{13} = r_{13} \frac{\phi_i(\phi_s \rho_s + \phi_i \rho_i)}{\phi_s \rho_s(\phi_s + \phi_i)} + 1$$

$$a_{31} = r_{31} \frac{\phi_s(\phi_s \rho_s + \phi_i \rho_i)}{\phi_i \rho_i(\phi_s + \phi_i)} + 1$$

$\rho_{11} = a_{13}\phi_s\rho_s + (a_{12}-1)\phi_w\rho_w + (a_{31}-1)\phi_i\rho_i$ $\rho_{22} = (a_{12}+a_{23}-1)\phi_w\rho_w$ $\rho_{33} = (a_{13}-1)\phi_s\rho_s + (a_{23}-1)\phi_w\rho_w + a_{31}\phi_i\rho_i$ $\rho_{12} = -(a_{12}-1)\phi_w\rho_w$ $\rho_{13} = -(a_{13}-1)\phi_s\rho_s - (a_{31}-1)\phi_i\rho_i$ $\rho_{23} = -(a_{23}-1)\phi_w\rho_w$ $b_{12}=\eta_w\phi_w^2/\kappa_s$: friction coefficient between the solid skeletal frame and pore water
$b_{23}=\eta_w\phi_w^2/\kappa_i$: friction coefficient between pore water and ice matrix
$b_{13}=b_{13}^0(\phi_i\phi_s)^2$: friction coefficient between the solid skeletal frame and ice matrix
$\kappa_s = \kappa_{s0} s_r^3$
$\kappa_i = \kappa_{i0}\phi^3/[(1-s_r^2)(1-\phi)^3]$
$R_{11}=[(1-c_1)\phi_s]^2 K_{av}+K_{sm}+4\mu_{11}/3$
$R_{22}=\phi_w^2 K_{av}$
$R_{33}=[(1-c_3)\phi_i]^2 K_{av}+K_{im}+4\mu_{33}/3$
$R_{12}=(1-c_1)\phi_s\phi_w K_{av}$
$R_{13}=(1-c_1)(1-c_3)\phi_s\phi_i K_{av}+2\mu_{13}/3$
$R_{23}=(1-c_3)\phi_w\phi_i K_{av}$
$\mu_{11}=[(1-g_1)\phi_s]^2\mu_{av}+\mu_{sm}$
$\mu_{33}=[(1-g_3)\phi_i]^2\mu_{av}+\mu_{im}$
$\mu_{13}=(1-g_1)(1-g_3)\mu_{av}$
$c_1=K_{sm}/(\phi_s K_s)$: consolidation coefficient for the solid skeletal frame
$c_3=K_{im}/(\phi_i K_i)$: consolidation coefficient for the ice
$g_1=\mu_{sm}/(\phi_s\mu_s)$
$g_3=\mu_{im}/(\phi_i\mu_i)$
$K_{im}=\phi_i K_i/[1+\alpha(1-\phi_i)]$: bulk modulus of the matrix formed by the ice $\mu_{im}=\phi_i\mu_i/[1+\alpha\gamma(1-\phi_i)]$: shear modulus of the matrix formed by the ice $K_{sm}=(1-\phi_w-\xi\phi_i)K_s/[1+\alpha(\phi_w+\xi\phi_i)]$: bulk modulus of the matrix formed by the solid skeletal frame $\mu_{sm}=(1-\phi_w-\xi\phi_i)\mu_s/[1+\alpha\gamma(\phi_w+\xi\phi_i)]$: shear modulus of the solid skeletal frame $Sc_2=C_{13}-\frac{1}{3}\mu_{13}$
$Sc_3=K_3-\frac{2}{3}\mu_{13}$
$Sc_4=C_{13}-\frac{1}{3}\mu_{13}$
$K_1=[(1-c_1)\phi_s]^2K_{av}+K_{sm}$
$K_3=[(1-c_3)\phi_i]^2K_{av}+K_{im}$

APPENDIX D: SPECTRAL ELEMENT MATRIX COMPONENTS (FROZEN SOIL & PERMAFROST)

The components of the $S_1$ matrix in the Equation B.19 are shown as follows:

$S_1(1, 1) = -kp_{11}$ $S_1(1, 2) = -kp_{12}$ $S_1(1, 3) = -kp_{13}$ $S_1(1, 4) = k_{s1}q_{11}$ $S_1(1, 5) = k_{s2}q_{12}$ $S_1(1, 6) = kp_{11}(-e^{-hk_{p1}})$ $S_1(1, 7) = kp_{12}(-e^{-hk_{p2}})$ $S_1(1, 8) = kp_{13}(-e^{-hk_{p3}})$ $S_1(1, 9) = k_{s1}q_{11}(-e^{-hk_{s1}})$ $S_1(1, 10) = k_{s2}q_{12}(-e^{-hk_{s2}})$ $S_1(2, 1) = -k_{p1}p_{11}$ $S_1(2, 2) = -k_{p2}p_{12}$ $S_1(2, 3) = -k_{p3}p_{13}$ $S_1(2, 4) = kq_{11}$ $S_1(2, 5) = kq_{12}$ $S(2, 6) = e^{-hk_{p1}}k_{p1}p_{11}$ $S_1(2, 7) = e^{-hk_{p2}}k_{p2}p_{12}$ $S_1(2, 8) = e^{-hk_{p3}}k_{p3}p_{13}$ $S_1(2, 9) = e^{-hk_{s1}}kq_{11}$ $S_1(2, 10) = e^{-hk_{s2}}kq_{12}$ $S_1(3, 1) = -k_{p1}p_{21}$ $S(3, 2) = -k_{p2}p_{22}$ $S_1(3, 3) = -k_{p3}p_{23}$ $S_1(3, 4) = k(G_1q_{11} + G_2q_{21})$ $S_1(3, 5) = k(G_1q_{12} + G_2q_{22})$ $S_1(3, 6) = e^{-hk_{p1}}k_{p1}p_{21}$ $S_1(3, 7) = e^{-hk_{p2}}k_{p2}p_{22}$ $S_1(3, 8) = e^{-hk_{p3}}k_{p3}p_{23}$ $S_1(3, 9) = e^{-hk_{s1}}k(G_1q_{11} + G_2q_{21})$ $S_1(3, 10) = e^{-hk_{s2}}k(G_1q_{12} + G_2q_{22})$ $S_1(4, 1) = -k_{p1}p_{21}$   $S(4, 2) = -k_{p2}p_{22}$ $S_1(4, 3) = -k_{p3}p_{23}$   $S_1(4, 4) = k(G_1q_{11} + G_2q_{21})$ $S_1(4, 5) = k(G_1q_{12} + G_2q_{22})$   $S_1(4, 6) = e^{-hk_{p1}}k_{p1}p_{21}$ $S_1(4, 7) = e^{-hk_{p2}}k_{p2}p_{22}$   $S_1(4, 8) = e^{-hk_{p3}}k_{p3}p_{23}$ $S_1(4, 9) = e^{-hk_{s1}}k(G_1q_{11} + G_2q_{21})$   $S_1(4, 10) = e^{-hk_{s2}}k(G_1q_{12} + G_2q_{22})$ $S_1(5, 1) = -k_{p1}p_{21}$   $S(5, 2) = -k_{p2}p_{22}$ $S_1(5, 3) = -k_{p3}p_{23}$   $S_1(5, 4) = k(G_1q_{11} + G_2q_{21})$ $S_1(5, 5) = k(G_1q_{12} + G_2q_{22})$   $S_1(5, 6) = e^{-hk_{p1}}k_{p1}p_{21}$ $S_1(5, 7) = e^{-hk_{p2}}k_{p2}p_{22}$   $S_1(5, 8) = e^{-hk_{p3}}k_{p3}p_{23}$ $S_1(5, 9) = e^{-hk_{s1}}k(G_1q_{11} + G_2q_{21})$   $S_1(5, 10) = e^{-hk_{s2}}k(G_1q_{12} + G_2q_{22})$ $S_1(6, 1) = -k_{p1}p_{21}$   $S(6, 2) = -k_{p2}p_{22}$ $S_1(6, 3) = -k_{p3}p_{23}$   $S_1(6, 4) = k(G_1q_{11} + G_2q_{21})$ $S_1(6, 5) = k(G_1q_{12} + G_2q_{22})$   $S_1(6, 6) = e^{-hk_{p1}}k_{p1}p_{21}$ $S_1(6, 7) = e^{-hk_{p2}}k_{p2}p_{22}$   $S_1(6, 8) = e^{-hk_{p3}}k_{p3}p_{23}$ $S_1(6, 9) = e^{-hk_{s1}}k(G_1q_{11} + G_2q_{21})$   $S_1(6, 10) = e^{-hk_{s2}}k(G_1q_{12} + G_2q_{22})$ $S_1(7, 1) = -k_{p1}p_{21}$   $S(7, 2) = -k_{p2}p_{22}$ $S_1(7, 3) = -k_{p3}p_{23}$   $S_1(7, 4) = k(G_1q_{11} + G_2q_{21})$ $S_1(7, 5) = k(G_1q_{12} + G_2q_{22})$   $S_1(7, 6) = e^{-hk_{p1}}k_{p1}p_{21}$ $S_1(7, 7) = e^{-hk_{p2}}k_{p2}p_{22}$   $S_1(7, 8) = e^{-hk_{p3}}k_{p3}p_{23}$ $S_1(7, 9) = e^{-hk_{s1}}k(G_1q_{11} + G_2q_{21})$   $S_1(7, 10) = e^{-hk_{s2}}k(G_1q_{12} + G_2q_{22})$ $S_1(8, 1) = -k_{p1}p_{21}$   $S(8, 2) = -k_{p2}p_{22}$ $S_1(8, 3) = -k_{p3}p_{23}$   $S_1(8, 4) = k(G_1q_{11} + G_2q_{21})$ $S_1(8, 5) = k(G_1q_{12} + G_2q_{22})$   $S_1(8, 6) = e^{-hk_{p1}}k_{p1}p_{21}$ $S_1(8, 7) = e^{-hk_{p2}}k_{p2}p_{22}$   $S_1(8, 8) = e^{-hk_{p3}}k_{p3}p_{23}$ $S_1(8, 9) = e^{-hk_{s1}}k(G_1q_{11} + G_2q_{21})$   $S_1(8, 10) = e^{-hk_{s2}}k(G_1q_{12} + G_2q_{22})$ $S_1(9, 1) = -k_{p1}p_{21}$   $S(9, 2) = -k_{p2}p_{22}$ $S_1(9, 3) = -k_{p3}p_{23}$   $S_1(9, 4) = k(G_1q_{11} + G_2q_{21})$ $S_1(9, 5) = k(G_1 q_{12} + G_2 q_{22})$  $S_1(9, 6) = e^{-hk_{p1}} k_{p1} p_{21}$ $S_1(9, 7) = e^{-hk_{p2}} k_{p2} p_{22}$  $S_1(9, 8) = e^{-hk_{p3}} k_{p3} p_{23}$ $S_1(9, 9) = e^{-hk_{s1}} k(G_1 q_{11} + G_2 q_{21})$  $S_1(9, 10) = e^{-hk_{s2}} k(G_1 q_{12} + G_2 q_{22})$ $S_1(10, 1) = -k_{p1} p_{21}$  $S(10, 2) = -k_{p2} p_{22}$ $S_1(10, 3) = -k_{p3} p_{23}$  $S_1(10, 4) = k(G_1 q_{11} + G_2 q_{21})$ $S_1(10, 5) = k(G_1 q_{12} + G_2 q_{22})$  $S_1(10, 6) = e^{-hk_{p1}} k_{p1} p_{21}$ $S_1(10, 7) = e^{-hk_{p2}} k_{p2} p_{22}$  $S_1(10, 8) = e^{-hk_{p3}} k_{p3} p_{23}$ $S_1(10, 9) = e^{-hk_{s1}} k(G_1 q_{11} + G_2 q_{21})$  $S_1(10, 10) = e^{-hk_{s2}} k(G_1 q_{12} + G_2 q_{22})$

The components of the $S_2$ stress matrix in the Equation B.20 are shown as follows:

$S_2(1, 1) = k k_{p1}(2 p_{11} \mu_1 + p_{31} \mu_{13})$ $S_2(1, 2) = k k_{p2}(2 p_{12} \mu_1 + p_{32} \mu_{13})$ $S_2(1, 3) = k k_{p3}(2 p_{13} \mu_1 + p_{33} \mu_{13})$ $S_2(1, 4) = -\frac{1}{2}(k^2 + k_{s1}^2)(2 q_{11} \mu_1 + q_{21} \mu_{13})$ $S_2(1, 5) = -\frac{1}{2}(k^2 + k_{s2}^2)(2 q_{12} \mu_1 + q_{22} \mu_{13})$ $S_2(1, 6) = -e^{-hk_{p1}} k k_{p1}(2 p_{11} \mu_1 + p_{31} \mu_{13})$ $S_2(1, 7) = e^{-hk_{p2}} k k_{p2}(2 p_{12} \mu_1 + p_{32} \mu_{13})$ $S_2(1, 8) = -e^{-hk_{p3}} k k_{p3}(2 p_{13} \mu_1 + p_{33} \mu_{13})$ $S_2(1, 9) = -\frac{1}{2} e^{-hk_{s1}} (k^2 + k_{s1}^2)(2 q_{11} \mu_1 + q_{21} \mu_{13})$ $S_2(1, 10) = -\frac{1}{2} e^{-hk_{s2}} (k^2 + k_{s2}^2)(2 q_{12} \mu_1 + q_{22} \mu_{13})$ $S_2(2, 1) = -(p_{11} S_{c1} + p_{31} S_{c2}) k^2 + C_{12}(k_{p1}^2 - k^2) p_{21} + k_{p1}^2 (p_{11}(S_{c1} + 2\mu_1) + p_{31}(S_{c2} + \mu_{13}))$ $S_2(2, 2) = -(p_{12} S_{c1} + p_{32} S_{c2}) k^2 + C_{12}(k_{p2}^2 - k^2) p_{22} + k_{p2}^2 (p_{12}(S_{c1} + 2\mu_1) + p_{32}(S_{c2} + \mu_{13}))$ $S_2(2, 3) = -(p_{13} S_{c1} + p_{33} S_{c2}) k^2 + C_{12}(k_{p3}^2 - k^2) p_{23} + k_{p3}^2 (p_{13}(S_{c1} + 2\mu_1) + p_{33}(S_{c2} + \mu_{13}))$ $S_2(2, 4) = k k_{s1}(2 q_{11} \mu_1 + q_{21} \mu_{13})$ $S_2(2, 5) = k k_{s2}(2 q_{12} \mu_1 + q_{22} \mu_{13})$ $S_2(2, 6) = e^{-hk_{p1}} \big(-(p_{11} S_{c1} + p_{31} S_{c2}) k^2 + C_{12}(k_{p1}^2 - k^2) p_{21} + k_{p1}^2 (p_{11}(S_{c1} + 2\mu_1) + p_{31}(S_{c2} + \mu_{13}))\big)$ $S_2(2, 7) = e^{-hk_{p2}} \big(-(p_{12} S_{c1} + p_{32} S_{c2}) k^2 + C_{12}(k_{p2}^2 - k^2) p_{22} + k_{p2}^2 (p_{12}(S_{c1} + 2\mu_1) + p_{32}(S_{c2} + \mu_{13}))\big)$ $S_2(2, 8) = e^{-hk_{p3}} \big(-(p_{13} S_{c1} + p_{33} S_{c1}) k^2 + C_{12}(k_{p3}^2 - k^2) p_{23} + k_{p3}^2 (p_{13}(S_{c1} + 2\mu_1) + p_{33}(S_{c2} + \mu_{13}))\big)$ $S_2(2, 9) = e^{-hk_{s1}} k k_{s1}(2 q_{11} \mu_1 + q_{21} \mu_{13})$ $S_2(2, 10) = e^{-hk_{s2}} k k_{s2}(2 q_{12} \mu_1 + q_{22} \mu_{13})$ $S_2(3, 1) = (k_{p1} - k)(k + k_{p1})(C_{12} p_{11} + k_2 p_{21} + C_{23} p_{31})$ $S_2(3, 2) = -(k - k_{p2})(k + k_{p2})(C_{12} p_{12} + k_2 p_{22} + C_{23} p_{32})$ $S_2(3, 3) = -(k - k_{p3})(k + k_{p3})(C_{12} p_{13} + k_2 p_{23} + C_{23} p_{33})$ $S_2(3, 4) = 0$ $S_2(3, 5) = 0$ $S_2(3, 6) = e^{-hk_{p1}}(k_{p1} - k)(k + k_{p1})(C_{12} p_{11} + k_2 p_{21} + C_{23} p_{31})$ $S_2(3, 7) = e^{-hk_{p2}}(k_{p2} - k)(k + k_{p2})(C_{12} p_{12} + k_2 p_{22} + C_{23} p_{32})$ $S_2(3, 8) = e^{-hk_{p3}}(k_{p3} - k)(k + k_{p3})(C_{12} p_{13} + k_2 p_{23} + C_{23} P_{33})$ $S_2(3, 9) = 0$ $S_2(3, 10) = 0$ $S_2(4, 1) = k k_{p1}(p_{11} \mu_{13} + 2 p_{31} \mu_3)$ $S_2(4, 2) = k k_{p2}(p_{12} \mu_{13} + 2 p_{32} \mu_3)$ $S_2(4, 3) = k k_{p3}(p_{13} \mu_{13} + 2 P_{33} \mu_3)$ $S_2(4, 4) = -\frac{1}{2}(k^2 + k_{s1}^2)(q_{11} \mu_{13} + 2 q_{21} \mu_3)$ $S_2(4, 5) = -\frac{1}{2}(k^2 + k_{s2}^2)(q_{12} \mu_{13} + 2 q_{22} \mu_3)$ $S_2(4, 6) = -e^{-hk_{p1}} k k_{p1}(p_{11} \mu_{13} + 2 p_{31} \mu_3)$ $S_2(4, 7) = -e^{-hk_{p2}} k k_{p2}(p_{12} \mu_{13} + 2 p_{32} \mu_3)$ $S_2(4, 8) = -e^{-hk_{p3}} k k_{p3}(p_{13} \mu_{13} + 2 P_{33} \mu_3)$ $S_2(4, 9) = -\frac{1}{2} e^{-hk_{s1}}(k^2 + k_{s1}^2)(q_{11} \mu_{13} + 2 q_{21} \mu_3)$ $S_2(4, 10) = -\frac{1}{2} e^{-hk_{s2}}(k^2 + k_{s2}^2)(q_{12} \mu_{13} + 2 q_{22} \mu_3)$ $S_2(5, 1) = -(p_{31} S_{c3} + p_{11} S_{c4}) k^2 + C_{23}(k_{p1}^2 - k^2) p_{21} + k_{p1}^2 (p_{11}(S_{c4} + \mu_{13}) + p_{31}(S_{c3} + 2\mu_3))$ $S_2(5, 2) = -(p_{32} S_{c3} + p_{12} S_{c4}) k^2 + C_{23}(k_{p2}^2 - k^2) p_{22} + k_{p2}^2 (p_{12}(S_{c4} + \mu_{13}) + p_{32}(S_{c3} + 2\mu_3))$ $S_2(5, 3) = -(P_{33} S_{c3} + p_{13} S_{c4}) k^2 + C_{23}(k_{p3}^2 - k^2) p_{23} + k_{p3}^2 (p_{13}(S_{c4} + \mu_{13}) + p_{33}(S_{c3} + 2\mu_3))$ $S_2(5, 4) = -k k_{s1}(q_{11} \mu_{13} + 2 q_{21} \mu_3)$ $S_2(5, 5) = -k k_{s2}(q_{12} \mu_{13} + 2 q_{22} \mu_3)$ $S_2(5, 6) = e^{-hk_{p1}} \big(-(p_{31} S_{c3} + p_{11} S_{c4}) k^2 + C_{23}(k_{p1}^2 - k^2) p_{21} + k_{p1}^2 (p_{11}(S_{c4} + \mu_{13}) + p_{31}(S_{c3} + 2\mu_3))\big)$ $S_2(5, 7) = e^{-hk_{p2}} \big(-(p_{32} S_{c3} + p_{12} S_{c4}) k^2 + C_{23}(k_{p2}^2 - k^2) p_{22} + k_{p2}^2 (p_{12}(S_{c4} + \mu_{13}) + p_{32}(S_{c3} + 2\mu_3))\big)$ -continued $S_2(5,8) = e^{-hk_{p3}}\{-(P_{33}S_{c3} + p_{13}S_{c4})k^2 + C_{23}(k_{p3}^2 - k^2)p_{23} +$
$\qquad\qquad k_{p3}^2(p_{13}(S_{c4} + \mu_{13}) + p_{33}(S_{c3} + 2\mu_3))\}$ $S_2(5,9) = e^{-hk_{s1}} kk_{s1}(q_{11}\mu_{13} + 2q_{21}\mu_3)$ $S_2(5,10) = e^{-hk_{s2}} kk_{s2}(q_{12}\mu_{13} + 2q_{22}\mu_3)$ $S_2(6,1) = kk_{p1} e^{-hk_{p1}} (2\mu_1 p_{11} + \mu_{13} p_{31})$ $S_2(6,2) = kk_{p2} e^{-hk_{p2}} (2\mu_1 p_{12} + \mu_{13} p_{32})$ $S_2(6,3) = kk_{p3} e^{-hk_{p3}} (2\mu_1 p_{13} + \mu_{13} p_{33})$ $S_2(6,4) = -\dfrac{1}{2} e^{-hk_{s1}} (k^2 + k_{s1}^2)(2\mu_1 q_{11} + \mu_{13} q_{21})$ $S_2(6,5) = -\dfrac{1}{2} e^{-hk_{s2}} (k^2 + k_{s2}^2)(2\mu_1 q_{12} + \mu_{13} q_{22})$ $S_2(6,6) = -kk_{p1}(2\mu_1 p_{11} + \mu_{13} p_{31})$ $S_2(6,7) = -kk_{p2}(2\mu_1 p_{12} + \mu_{13} p_{32})$ $S_2(6,8) = -kk_{p3}(2\mu_1 p_{13} + \mu_{13} p_{33})$ $S_2(6,9) = -\dfrac{1}{2}(k^2 + k_{s1}^2)(2\mu_1 q_{11} + \mu_{13} q_{21})$ $S_2(6,10) = -\dfrac{1}{2}(k^2 + k_{s2}^2)(2\mu_1 q_{12} + \mu_{13} q_{22})$ $S_2(7,1) = e^{-hk_{p1}}\{-(p_{11}S_{c1} + p_{31}S_{c2})k^2 +$
$\qquad\qquad C_{12}(k_{p1}^2 - k^2)p_{21} + k_{p1}^2(p_{11}(S_{c1} + 2\mu_1) + p_{31}(S_{c2} + \mu_{13}))\}$ $S_2(7,2) = e^{-hk_{p2}}\{-(p_{12}S_{c1} + p_{32}S_{c2})k^2 +$
$\qquad\qquad C_{12}(k_{p2}^2 - k^2)p_{22} + k_{p2}^2(p_{12}(S_{c1} + 2\mu_1) + p_{32}(S_{c2} + \mu_{13}))\}$ $S_2(7,3) = e^{-hk_{p3}}\{-(p_{13}S_{c1} + p_{33}S_{c2})k^2 +$
$\qquad\qquad C_{12}(k_{p3}^2 - k^2)p_{23} + k_{p3}^2(p_{13}(S_{c1} + 2\mu_1) + p_{33}(S_{c2} + \mu_{13}))\}$ $S_2(7,4) = -e^{-hk_{s1}} kk_{s1}(2q_{11}\mu_1 + q_{21}\mu_{13})$ $S_2(7,5) = -e^{-hk_{s2}} kk_{s2}(2q_{12}\mu_1 + q_{22}\mu_{13})$ $S_2(7,6) = -(p_{11}S_{c1} + p_{31}S_{c2})k^2 +$
$\qquad\qquad C_{12}(k_{p1}^2 - k^2)p_{21} + k_{p1}^2(p_{11}(S_{c1} + 2\mu_1) + p_{31}(S_{c2} + \mu_{13}))$ $S_2(7,7) = -(p_{12}S_{c1} + p_{32}S_{c2})k^2 +$
$\qquad\qquad C_{12}(k_{p2}^2 - k^2)p_{22} + k_{p2}^2(p_{12}(S_{c1} + 2\mu_1) + p_{32}(S_{c2} + \mu_{13}))$ $S_2(7,8) = -(p_{13}S_{c1} + p_{33}S_{c2})k^2 +$
$\qquad\qquad C_{12}(k_{p3}^2 - k^2)p_{23} + k_{p3}^2(p_{13}(S_{c1} + 2\mu_1) + p_{33}(S_{c2} + \mu_{13}))$ $S_2(7,9) = kk_{s1}(2q_{11}\mu_1 + q_{21}\mu_{13})$ $S_2(7,10) = kk_{s2}(2q_{12}\mu_1 + q_{22}\mu_{13})$ $S_2(8,1) = e^{-hk_{p1}}(k_{p1} - k)(k + k_{p1})(C_{12}p_{11} + k_2 p_{21} + C_{23}p_{31})$ $S_2(8,2) = e^{-hk_{p2}}(k_{p2} - k)(k + k_{p2})(C_{12}p_{12} + k_2 p_{22} + C_{23}p_{32})$ $S_2(8,3) = e^{-hk_{p3}}(k_{p3} - k)(k + k_{p3})(C_{12}p_{13} + k_2 p_{23} + C_{23}p_{33})$ $S_2(8,4) = 0$ $S_2(8,5) = 0$ $S_2(8,6) = (k_{p1} - k)(k + k_{p1})(C_{12}p_{11} + k_2 p_{21} + C_{23}p_{31})$ $S_2(8,7) = (k_{p2} - k)(k + k_{p2})(C_{12}p_{12} + k_2 p_{22} + C_{23}p_{32})$ $S_2(8,8) = (k_{p3} - k)(k + k_{p3})(C_{12}p_{13} + k_2 p_{23} + C_{23}P_{33})$ $S_2(8,9) = 0$ $S_2(8,10) = 0$ $S_2(9,1) = kk_{p1} e^{-hk_{p1}} (\mu_{13} p_{11} + 2\mu_3 p_{31})$ $S_2(9,2) = kk_{p2} e^{-hk_{p2}} (\mu_{13} p_{12} + 2\mu_3 p_{32})$ $S_2(9,3) = kk_{p3} e^{-hk_{p3}} (\mu_{13} p_{13} + 2\mu_3 p_{33})$ $S_2(9,4) = -\dfrac{1}{2} e^{-hk_{s1}} (k^2 + k_{s1}^2)(\mu_{13} q_{11} + 2\mu_3 q_{21})$ $S_2(9,5) = -\dfrac{1}{2} e^{-hk_{s2}} (k^2 + k_{s2}^2)(\mu_{13} q_{12} + 2\mu_3 q_{22})$ $S_2(9,6) = -kk_{p1}(\mu_{13} p_{11} + 2\mu_3 p_{31})$ $S_2(9,7) = -kk_{p2}(\mu_{13} p_{12} + 2\mu_3 p_{32})$ $S_2(9,8) = -kk_{p3}(\mu_{13} p_{13} + 2\mu_3 p_{33})$ $S_2(9,9) = -\dfrac{1}{2}(k^2 + k_{s1}^2)(\mu_{13} q_{11} + 2\mu_3 q_{21})$ $S_2(9,10) = -\dfrac{1}{2}(k^2 + k_{s2}^2)(\mu_{13} q_{12} + 2\mu_3 q_{22})$ $S_2(10,1) = e^{-hk_{p1}}\{-(p_{31}S_{c3} + p_{11}S_{c4})k^2 +$
$\qquad\qquad C_{23}(k_{p1}^2 - k^2)p_{21} + k_{p1}^2(p_{11}(S_{c4} + \mu_{13}) + p_{31}(S_{c3} + 2\mu_3))\}$ $S_2(10,2) = e^{-hk_{p2}}\{-(p_{32}S_{c3} + p_{12}S_{c4})k^2 +$
$\qquad\qquad C_{23}(k_{p2}^2 - k^2)p_{22} + k_{p2}^2(p_{12}(S_{c4} + \mu_{13}) + p_{32}(S_{c3} + 2\mu_3))\}$ $S_2(10,3) = e^{-hk_{p3}}\{-(P_{33}S_{c3} + p_{13}S_{c4})k^2 +$
$\qquad\qquad C_{23}(k_{p3}^2 - k^2)p_{23} + k_{p3}^2(p_{13}(S_{c4} + \mu_{13}) + p_{33}(S_{c3} + 2\mu_3))\}$ $S_2(10,4) = -e^{-hk_{s1}} kk_{s1}(q_{11}\mu_{13} + 2q_{21}\mu_3)$ $S_2(10,5) = -e^{-hk_{s2}} kk_{s2}(q_{12}\mu_{13} + 2q_{22}\mu_3)$ $S_2(10,6) = -(p_{31}S_{c3} + p_{11}S_{c4})k^2 +$
$\qquad\qquad C_{23}(k_{p1}^2 - k^2)p_{21} + k_{p1}^2(p_{11}(S_{c4} + \mu_{13}) + p_{31}(S_{c3} + 2\mu_3))$ $S_2(10,7) = -(p_{32}S_{c3} + p_{12}S_{c4})k^2 +$
$\qquad\qquad C_{23}(k_{p2}^2 - k^2)p_{22} + k_{p2}^2(p_{12}(S_{c4} + \mu_{13}) + p_{32}(S_{c3} + 2\mu_3))$ $S_2(10,8) = -(P_{33}S_{c3} + p_{13}S_{c4})k^2 +$
$\qquad\qquad C_{23}(k_{p3}^2 - k^2)p_{23} + k_{p3}^2(p_{13}(S_{c4} + \mu_{13}) + p_{33}(S_{c3} + 2\mu_3))$ $S_2(10,9) = kk_{s1}(q_{11}\mu_{13} + 2q_{21}\mu_3)$ $S_2(10,10) = kk_{s2}(q_{12}\mu_{13} + 2q_{22}\mu_3).$

APPENDIX E: SPECTRAL ELEMENT MATRIX COMPONENTS (SATURATED SOIL)

In the third embodiment, the components of the matrix S' for effective stress components and porewater pressure in frequency domain are shown as follows:

$m_{11} = 2kk_{p1}p_{11}\mu$ 
$m_{12} = 2kk_{p2}p_{12}\mu$ 
$m_{13} = -(k^2 + k_s^2)\mu$ $m_{14} = -2e^{-hk_{p1}}kk_{p1}p_{11}\mu$ 
$m_{15} = -2e^{-hk_{p2}}kk_{p2}p_{12}\mu$ 
$m_{16} = -e^{-hk_s}(k^2 + k_s^2)\mu$ $m_{21} = p_{11}(k_{p1}^2(\lambda + 2\mu) - k^2\lambda)$ 
$m_{22} = p_{12}(k_{p2}^2(\lambda + 2\mu) - k^2\lambda)$ 
$m_{23} = -2kk_s\mu$ $m_{24} = e^{-hk_{p1}}p_{11}(k_{p1}^2(\lambda + 2\mu) - k^2\lambda)$ 
$m_{25} = e^{-hk_{p2}}p_{12}(k_{p2}^2(\lambda + 2\mu) - k^2\lambda)$ 
$m_{26} = 2e^{-hk_s}kk_s\mu$ $m_{31} = (k - k_{p1})(k + k_{p1})M(p_{21} + p_{11}\alpha)$ 
$m_{32} = (k - k_{p2})(k + k_{p2})M(p_{22} + p_{12}\alpha)$ 
$m_{33} = 0$ $m_{34} = e^{-hk_{p1}}(k - k_{p1})(k + k_{p1})M(p_{21} + p_{11}\alpha)$ 
$m_{35} = e^{-hk_{p2}}(k - k_{p2})(k + k_{p2})M(p_{22} + p_{12}\alpha)$ 
$m_{36} = 0$ $m_{41} = 2e^{-hk_{p1}}kk_{p1}p_{11}\mu$ 
$m_{42} = 2e^{-hk_{p2}}kk_{p2}p_{12}\mu$ 
$m_{43} = -e^{-hk_s}(k^2 + k_s^2)\mu$ $m_{41} = -2kk_{p1}p_{11}\mu$ 
$m_{43} = -2kk_{p2}p_{12}\mu$ 
$m_{46} = -(k^2 + k_s^2)\mu$ $m_{51} = e^{-hk_{p1}}p_{11}(k_{p1}^2(\lambda + 2\mu) - k^2\lambda)$ 
$m_{52} = e^{-hk_{p2}}p_{12}(k_{p2}^2(\lambda + 2\mu) - k^2\lambda)$ 
$m_{53} = -2e^{-hk_s}\mu$ $m_{54} = p_{11}(k_{p1}^2(\lambda + 2\mu) - k^2\lambda)$ 
$m_{55} = p_{12}(k_{p2}^2(\lambda + 2\mu) - k^2\lambda)$ 
$m_{56} = 2kk_s\mu$ $m_{61} = e^{-hk_{p1}}(k - k_{p1})(k + k_{p1})M(p_{21} + p_{11}\alpha)$ 
$m_{62} = e^{-hk_{p2}}(k - k_{p2})(k + k_{p2})M(p_{22} + p_{12}\alpha)$ 
$m_{63} = 0$ $m_{64} = (k - k_{p1})(k + k_{p1})M(p_{21} + p_{11}\alpha)$ 
$m_{65} = (k - k_{p2})(k + k_{p2})M(p_{22} + p_{12}\alpha)$ 
$m_{66} = 0$

APPENDIX F: STIFFNESS MATRIX OF A TWO-LAYER SYSTEM (SATURATED SOIL)

$$H = \begin{bmatrix}
G_{11}^1 & G_{21}^1 & G_{31}^1 & G_{41}^1 & G_{51}^1 & G_{61}^1 & 0 & 0 & 0 \\
G_{21}^1 & G_{22}^1 & G_{23}^1 & G_{24}^1 & G_{25}^1 & G_{26}^1 & 0 & 0 & 0 \\
G_{31}^1 & G_{32}^1 & G_{33}^1 & G_{34}^1 & G_{35}^1 & G_{36}^1 & 0 & 0 & 0 \\
G_{41}^1 & G_{42}^1 & G_{43}^1 & G_{44}^1+G_{11}^2 & G_{45}^1+G_{12}^2 & G_{46}^1+G_{13}^2 & G_{14}^1 & G_{15}^1 & G_{16}^1 \\
G_{51}^1 & G_{52}^1 & G_{53}^1 & G_{54}^1+G_{21}^2 & G_{55}^1+G_{22}^2 & G_{56}^1+G_{23}^2 & G_{24}^1 & G_{25}^1 & G_{26}^1 \\
G_{61}^1 & G_{62}^1 & G_{63}^1 & G_{64}^1+G_{31}^2 & G_{65}^1+G_{32}^2 & G_{66}^1+G_{33}^2 & G_{34}^1 & G_{35}^1 & G_{36}^1 \\
0 & 0 & 0 & G_{41}^1 & G_{42}^1 & G_{43}^1 & G_{44}^1 & G_{45}^1 & G_{46}^1 \\
0 & 0 & 0 & G_{51}^1 & G_{52}^1 & G_{53}^1 & G_{54}^1 & G_{55}^1 & G_{56}^1 \\
0 & 0 & 0 & G_{61}^1 & G_{62}^1 & G_{63}^1 & G_{64}^1 & G_{65}^1 & G_{66}^1
\end{bmatrix}$$

where $G_1$ and $G_2$ are matrix for the first and second layer, respectively.

APPENDIX G: PHASE VELOCITY (SATURATED SOIL)

The algorithm performs a sweep in a broad range of wavenumbers for a given frequency. A rough interval where roots exist needs to be found first and then the classic Brent's method can be applied to accurately locates the roots. The following notations are used in the algorithm: $\epsilon$ for the wavenumber sweep increment; n for the number of iterations; k for the initial wavenumber, k for the wavenumber at the current step; k' for the wavenumber at the previous step; $f(k)$ gives the determinant value of the stiffness matrix at wavenumber k; $\delta$ for the tolerance used to check if the determinant of the stiffness matrix is close to zero; Brent(k', k) is the Brent's method that takes an internal (k', k) as input where $f(k)$ and $f(k')$ must have different sign; r is the root calculated from Brent function.

The algorithm is shown as follows:

$$\begin{cases} \text{Given } \varepsilon, k_0, \delta, n \\ \text{for } i = 1, 2, \ldots n \\ k' = k \\ k = k + \varepsilon \\ v' = f(k') \\ v = f(k) \\ \text{if } v' \cdot v \leq 0 \\ r = \text{Brent } (k', k) \\ \text{if } |f(r)| < \delta \\ \text{return } r \\ \text{end for} \end{cases} \quad (3.29)$$

APPENDIX H: CALCULATION OF P1 WAVE VELOCITY (SATURATED SOIL)

$$V_{p1} = \sqrt{\left(K_{sk} + \frac{4}{3}G + \phi\right)/((1-\phi)\rho_s + \phi\rho_f)}$$

where $K_{sk}$ is the bulk modulus of the soil skeleton; G is the shear modulus of the soil skeleton; $K_F$ is the bulk modulus of pore water; $\phi$ is the porosity or volumetric water content; $\rho_s$ and $\rho_f$ are the density of soil particles and pore water, respectively.

Since various modifications can be made in my invention as herein above described, and many apparently widely different embodiments of same made, it is intended that all matter contained in the accompanying specification shall be interpreted as illustrative only and not in a limiting sense.

REFERENCES

First Embodiment

[1.1] Eric Brochu, Vlad M Cora, and Nando De Freitas. A tutorial on bayesian optimization of expensive cost functions, with application to active user modeling and hierarchical reinforcement learning. *arXiv preprint arXiv:* 1012.2599, 2010.

[1.2] J Carcione and G Seriani. Seismic velocities in permafrost. In 59*th EAGE Conference & Exhibition,* 1997.

[1.3] Jos'eM Carcione and G'ezaSeriani. Wave simulation in frozen porous media. *Journal of Computational Physics,* 170(2):676-695, 2001.

[1.4] Jos'eM Carcione, Boris Gurevich, and Fabio Cavallini. A generalized biot-gassmann model for the acoustic properties of shaley sandstones. *Geophysical Prospecting,* 48(3):539-557, 2000.

[1.5] Jos'eM Carcione, Juan E Santos, Claudia L Ravazzoli, and Hans B Helle. Wave simulation in partially frozen porous media with fractal freezing conditions. *Journal of Applied Physics,* 94(12):7839-7847, 2003.

[1.6] Shan Dou, Seiji Nakagawa, Douglas Dreger, and Jonathan Ajo-Franklin. A rock-physics investigation of unconsolidated saline permafrost: P-wave properties from laboratory ultrasonic measurements. *Geophysics,* 81(1): WA233-WA245, 2016.

[1.7] Shan Dou, Seiji Nakagawa, Douglas Dreger, and Jonathan Ajo-Franklin. An effective-medium model for p-wave velocities of saturated, unconsolidated saline permafrost. *Geophysics,* 82(3):EN33-EN50, 2017.

[1.8] MB Helgerud, J Dvorkin, A Nur, A Sakai, and T Collett. Elastic-wave velocity in marine sediments with gas hydrates: Effective medium modeling. *Geophysical Research Letters,* 26(13):2021-2024, 1999.

[1.9] MS King, R W Zimmerman, and RF Corwin. Seismic and electrical properties of unconsolidated permafrost. *Geophysical Prospecting,* 36(4):349-364, 1988.

[1.10] Guy T Kuster and M Nafi Toks¨ oz. Velocity and attenuation of seismic waves in two-phase media: Part I theoretical formulations. *Geophysics,* 39(5):587-606, 1974.

[1.11] Ph Leclaire, Fr'ed'aic Cohen-T'enoudji, and Jaime Aguirre-Puente. Extension of biot's theory of wave propagation to frozen porous media. *The Journal of the Acoustical Society of America,* 96(6):3753-3768, 1994.

[1.12] Myung W Lee and William F Waite. Estimating pore-space gas hydrate saturations from well log acoustic data. *Geochemistry, Geophysics, Geosystems,* 9(7), 2008.

[1.13] Jun Matsushima, Makoto Suzuki, Yoshibumi Kato, Takao Nibe, and Shuichi Rokugawa. Laboratory experiments on compressional ultrasonic wave attenuation in partially frozen brines. *Geophysics,* 73 (2):N9-N18, 2008.

[1.14] James Montgomery and Stephen Chen. An analysis of the operation of differential evolution at high and low crossover rates. In *IEEE congress on evolutionary computation,* pages 1-8. IEEE, 2010.

[1.15] Jasper Snoek, Hugo Larochelle, and Ryan P Adams. Practical bayesian optimization of machine learning algorithms. In *Advances in neural information processing systems,* pages 2951-2959, 2012.

[1.16] Anna M Wagner, Nathaniel J Lindsey, Shan Dou, Arthur Gelvin, Stephanie Saari, Christopher Williams, Ian Ekblaw, Craig Ulrich, Sharon Borglin, Alejandro Morales, et al. Permafrost degradation and subsidence observations during a controlled warming experiment. *Scientific reports,* 8(1): 1-9, 2018.

[1.17] Da-yan Wang, Yuan-lin Zhu, Wei Ma, and Yong-hong Niu. Application of ultrasonic technology for physical-mechanical properties of frozen soils. *Cold regions science and technology,* 44(1):12-19, 2006.

Second Embodiment

[2.1] George R. Blake and Gary C. Steinhardt. Particle-size distribution in: Encyclopedia of soil science, 2008.

[2.2] José M Carcione, Boris Gurevich, and Fabio Cavallini. A generalized biot-gassmann model for the acoustic properties of shaley sandstones. *Geophysical Prospecting,* 48(3):539-557, 2000.

[2.3] José M Carcione, Juan E Santos, Claudia L Ravazzoli, and Hans B Helle. Wave simulation in partially frozen porous media with fractal freezing conditions. *Journal of Applied Physics,* 94(12):7839-7847, 2003.

[2.4] José M Carcione and Géza Seriani. Wave simulation in frozen porous media. Journal of Computational Physics, 170(2):676-695, 2001.

[2.5] Mirko Castellini, Simone Di Prima, and Massimo Iovino. An assessment of the best procedure to estimate the soil water retention curve: A comparison with the evaporation method. Geoderma, 320:82-94, 2018.

[2.6] Shan Dou, Seiji Nakagawa, Douglas Dreger, and Jonathan Ajo-Franklin. A rock-physics investigation of unconsolidated saline permafrost: P-wave properties from laboratory ultrasonic measurements. Geophysics, 81(1): WA233-WA245, 2016.

[2.7] Shan Dou, Seiji Nakagawa, Douglas Dreger, and Jonathan Ajo-Franklin. An effective-medium model for p-wave velocities of saturated, unconsolidated saline permafrost. Geophysics, 82(3):EN33-EN50, 2017.

[2.8] Octavian G Duliu. Computer axial tomography in geosciences: an overview. Earth-science reviews, 48(4): 265-281, 1999.

[2.9] American Society for Testing and Materials. Standard Test Methods for Laboratory Determination of Water (Moisture) Content of Soil and Rock by Mass: ASTM D 2216-05. ASTM International, 2005.

[2.10] Qingqing Gu, Lianhua Zhu, Yonghao Zhang, and Haihu Liu. Pore-scale study of counter-current imbibition in strongly water-wet fractured porous media using lattice boltzmann method. Physics of Fluids, 31(8):086602, 2019.

[2.11] Xiaoqiang Gu, Jun Yang, Maosong Huang, and Guangyun Gao. Bender element tests in dry and saturated sand: Signal interpretation and result comparison. Soils and Foundations, 55(5):951-962, 2015.

[2.12] Martti T Hallikainen, Fawwaz T Ulaby, Myron C Dobson, Mohamed A El-Rayes, and Lil-Kun Wu. Microwave dielectric behavior of wet soil-part 1: Empirical models and experimental observations. IEEE Transactions on Geoscience and Remote Sensing, (1):25-34, 1985.

[2.13] Mourad Karray, Mohamed Ben Romdhan, Mahmoud N Hussien, and Yannic Ethier. Measuring shear wave velocity of granular material using the piezoelectric ring-actuator technique (p-rat). Canadian Geotechnical Journal, 52(9):1302-1317, 2015.

[2.14] Michael S King, Robert W Zimmerman, and RF Corwin. Seismic and electrical properties of unconsolidated permafrost. Geophysical Prospecting, 36(4):349-364, 1988.

[2.15] Guy T Kuster and M Nafi Toksöz. Velocity and attenuation of seismic waves in two-phase media: Part i. theoretical formulations. Geophysics, 39(5):587-606, 1974.

[2.16] Ph Leclaire, Frédéric Cohen-Ténoudji, and Jaime Aguirre-Puente. Extension of biot's theory of wave propagation to frozen porous media. The Journal of the Acoustical Society of America, 96(6):3753-3768, 1994.

[2.17] Jong-Sub Lee and J Carlos Santamarina. Bender elements: performance and signal interpretation. Journal of geotechnical and geoenvironmental engineering, 131(9):1063-1070, 2005.

[2.18] Myung W Lee and William F Waite. Estimating pore-space gas hydrate saturations from well log acoustic data. Geochemistry, Geophysics, Geosystems, 9(7), 2008.

[2.19] Hongwei Liu, Pooneh Maghoul, and Ahmed Shalaby. Optimum insulation design for buried utilities subject to frost action in cold regions using the nelder-mead algorithm. International Journal of Heat and Mass Transfer, 130:613-639, 2019.

[2.20] Hongwei Liu, Pooneh Maghoul, and Ahmed Shalaby. Laboratory-scale characterization of saturated soil samples through ultrasonic techniques. Scientific reports, 10(1):1-17, 2020.

[2.21] Hongwei Liu, Giovanni Cascante, Pooneh Maghoul, and Ahmed Shalaby. Experimental investigation and numerical modeling of piezoelectric bender element motion and wave propagation analysis in soils. Canadian Geotechnical Journal, (ja), 2021.

[2.22] Hongwei Liu, Pooneh Maghoul, and Ahmed Shalaby. In-situ characterization of permafrost sites by decomposition of rayleigh waves dispersion relations via a hybrid inverse and poromechanical approach. Proceedings of the National Academy of Sciences, Under Review, 2021.

[2.23] Xu Liu, Stewart Greenhalgh, and Bing Zhou. Transient solution for poro-viscoacoustic wave propagation in double porosity media and its limitations. Geophysical Journal International, 178(1):375-393, 2009.

[2.24] Pooneh Maghoul and Behrouz Gatmiri. Theory of a time domain boundary element development for the dynamic analysis of coupled multiphase porous media. Journal of Multiscale Modelling, 8(03n04):1750007, 2017.

[2.25] Pooneh Maghoul, Behrouz Gatmiri, and Denis Duhamel. Boundary integral formulation and two-dimensional fundamental solutions for dynamic behavior analysis of unsaturated soils. Soil Dynamics and Earthquake Engineering, 31(11):1480-1495, 2011.

[2.26] Pooneh Maghoul, Behrouz Gatmiri, and Denis Duhamel. Wave propagation in unsaturated poroelastic media: Boundary integral formulation and three-dimensional fundamental solution. 2011.

[2.27] Jun Matsushima, Makoto Suzuki, Yoshibumi Kato, Takao Nibe, and Shuichi Rokugawa. Laboratory experiments on compressional ultrasonic wave attenuation in partially frozen brines. Geophysics, 73(2):N9-N18, 2008.

[2.28] Jimmy E Medina, Flavio Buiochi, and Jnlio C Adamowski. Numerical modeling of a circular piezoelectric ultrasonic transducer radiating in water. In ABCM symposium Series in Mechatronics, volume 2, pages 458-464, 2006.

[2.29] Kosuke Noborio. Measurement of soil water content and electrical conductivity by time domain reflectometry: a review. Computers and electronics in agriculture, 31(3): 213-237, 2001.

[2.30] Yann Périard, S José Gumiere, Bernard Long, Alain N Rousseau, and Jean Caron. Use of x-ray ct scan to characterize the evolution of the hydraulic properties of a soil under drainage conditions. Geoderma, 279:22-30, 2016.

[2.31] Proceq. Operating instructions—concrete test hammer n. Technical report, NR-L/LR€, Manual, ver 09 2006, Schwerzenbach, Switzerland, 2006.

[2.32] Malcolm Sambridge. Geophysical inversion with a neighbourhood algorithm—i. searching a parameter space. Geophysical journal international, 138(2):479-494, 1999.

[2.33] Juan E Santos and Dongwoo Sheen. Finite element methods for the simulation of waves in composite saturated poroviscoelastic media. SIAM journal on numerical analysis, 45(1):389-420, 2007.

[2.34] Uwe Schindler, Wolfgang Durner, G Von Unold, L Mueller, and R Wieland. The evaporation method: Extending the measurement range of soil hydraulic properties using the air-entry pressure of the ceramic cup. Journal of plant nutrition and soil science, 173(4):563-572, 2010.

[2.35] Jean Stein and Douglas L Kane. Monitoring the unfrozen water content of soil and snow using time domain reflectometry. Water Resources Research, 19(6): 1573-1584, 1983.

[2.36] Clarke G Topp, James L Davis, and Aa P Annan. Electromagnetic determination of soil water content: Measurements in coaxial transmission lines. Water resources research, 16(3):574-582, 1980.

[2.37] Anna M Wagner, Nathaniel J Lindsey, Shan Dou, Arthur Gelvin, Stephanie Saari, Christopher Williams, Ian Ekblaw, Craig Ulrich, Sharon Borglin, Alejandro Morales, et al. Permafrost degradation and subsidence observations during a controlled warming experiment. Scientific reports, 8(1):1-9, 2018.

[2.38] Da-yan Wang, Yuan-lin Zhu, Wei Ma, and Yong-hong Niu. Application of ultrasonic technology for physical-mechanical properties of frozen soils. Cold regions science and technology, 44(1):12-19, 2006.

[2.39] Yuxin Wu, Seiji Nakagawa, Timothy J Kneafsey, Baptiste Dafflon, and Susan Hubbard. Electrical and seismic response of saline permafrost soil during freeze-thaw transition. Journal of Applied Geophysics, 146:16-26, 2017.

[2.40] Zean Xiao, Yuanming Lai, and Jun Zhang. A thermodynamic model for calculating the unfrozen water content of frozen soil. Cold Regions Science and Technology, 172:103011, 2020.

[2.41] Yanbin Yao and Dameng Liu. Comparison of low-field nmr and mercury intrusion porosimetry in characterizing pore size distributions of coals. Fuel, 95:152-158, 2012.

[2.42] Kenji Yoshikawa and Pier Paul Overduin. Comparing unfrozen water content measurements of frozen soil using recently developed commercial sensors. Cold Regions Science and Technology, 42(3):250-256, 2005.

Third Embodiment

[3.1] DaFonseca, A. V., Ferreira, C. & Fahey, M. A framework interpreting bender element tests, combining time-domain and frequency-domain methods. *Geotech. Test. J.* 32, 91-107 (2008).

[3.2] Arulnathan, R., Boulanger, R. W. & Riemer, M. F. Analysis of bender element tests. *Geotech. Test. J.* 21, 120-131 (1998).

[3.3] Viggiani, G. & Atkinson, J. Interpretation of bender element tests. *Géotechnique* 45, 149-154 (1995).

[3.4] Lee, J.-S. & Santamarina, J. C. Bender elements: performance and signal interpretation. *J. geotechnical geoenvironmental engineering* 131, 1063-1070 (2005).

[3.5] Brocanelli, D. & Rinaldi, V. Measurement of low-strain material damping and wave velocity with bender elements in the frequency domain. *Can. Geotech. J.* 35, 1032-1040 (1998).

[3.6] Greening, P., Nash, D., Benahmed, N., Ferreira, C. & Viana da Fonseca, A. Comparison of shear wave velocity measurements in different materials using time and frequency domain techniques. *Proceedings of deformation characteristics of geomaterials*, Lyon, France 381-386 (2003).

[3.7] O'Donovan, J., O'Sullivan, C. & Marketos, G. Two-dimensional discrete element modelling of bender element tests on an idealised granular material. *Granul. Matter* 14, 733-747 (2012).

[3.8] Arroyo, M., Medina, L. & MuirWood, D. Numerical modelling of scale effects in bender-based pulse tests. *NUMOG VIII*, Pande, G. N. & Pietruszczak, S. (eds) 589-594 (2002).

[3.9] O'Donovan, J., O'sullivan, C., Marketos, G. & Wood, D. M. Analysis of bender element test interpretation using the discrete element method. *Granul. Matter* 17, 197-216 (2015).

[3.10] Biot, M. Theory of elastic waves in a fluid-saturated porous solid. 1. Low frequency range. *J. Acoust. Soc. Am.* 28, 168-178 (1956).

[3.11] Biot, M. A. Theory of propagation of elastic waves in a fluid-saturated porous solid. II. Higher frequency range. *The J. acoustical S. America* 28, 179-191 (1956).

[3.12] Wiebe, T. & Antes, H. A time domain integral formulation of dynamic poroelasticity. *Acta Mech.* 90, 125-137 (1991).

[3.13] Chen, J. Time domain fundamental solution to biot's complete equations of dynamic poroelasticity part ii: three-dimensional solution. *Int. J. Solids Struct.* 31, 169-202 (1994).

[3.14] Chen, J. Time domain fundamental solution to biot's complete equations of dynamic poroelasticity. Part I: Two-dimensional solution. *Int. J. Solids Struct.* 31, 1447-1490 (1994).

[3.15] Maghoul, P., Gatmiri, B. & Duhamel, D. Boundary integral formulation and two-dimensional fundamental solutions for dynamic behavior analysis of unsaturated soils. *Soil Dyn. Earthq. Eng.* 31, 1480-1495 (2011).

[3.16] Maghoul, P., Gatmiri, B. & Duhamel, D. Wave propagation in unsaturated poroelastic media: Boundary integral formulation and three-dimensional fundamental solution. *Comput. Model. Eng. Sci.* 78, 51-76 (2011).

[3.17] Jianwen, L. & Hongbing, Y. Dynamic stiffness matrix of a poroelastic multi-layered site and its green's functions. *Earthq. Eng. Eng. Vib.* 3, 273 (2004).

[3.18] Rajapakse, R. & Senjuntichai, T. Dynamic response of a multi-layered poroelastic medium. *Earthq. engineering & structural dynamics* 24, 703-722 (1995).

[3.19] Panneton, R. & Atalla, N. An efficient finite element scheme for solving the three-dimensional poroelasticity problem in acoustics. *The J. Acoust. Soc. Am.* 101, 3287-3298 (1997).

[3.30] Wenzlau, F. & Müller, T. M. Finite-difference modeling of wave propagation and diffusion in poroelastic media. *Geophysics* 74, T55-T66 (2009).

[3.21] Zhang, Y., Xu, Y. & Xia, J. Analysis of dispersion and attenuation of surface waves in poroelastic media in the exploration-seismic frequency band. *Geophys. J. Int.* 187, 871-888 (2011).

[3.22] Johnson, D. L., Koplik, J. & Dashen, R. Theory of dynamic permeability and tortuosity in fluid-saturated porous media. *J. fluid mechanics* 176, 379-402 (1987).

[3.23] Abate, J. & Valkó, P. P. Multi-precision laplace transform inversion. *Int. J. for Numer. Methods Eng.* 60, 979-993 (2004).

[3.24] Obrzud, R. & Truty, A. The hardening soil model—a practical guidebook z soil. *PC100701 Rep.* (2012).

[3.25] Kézdi, Á. & Réthàti, L. *Handbook of soil mechanics*, vol. 1 (Elsevier Amsterdam, 1974).

[3.26] Prat, M. et al. *La modélisation des ouvrages* (1995).

[3.27] Kulhawy, F. H. & Mayne, P. W. Manual on estimating soil properties for foundation design. Tech. Rep., Electric Power Research Inst., Palo Alto, Calif. (USA); Cornell Univ., Ithaca . . . (1990).

[3.28] Lee, C., Truong, Q. H. & Lee, J.-S. Cementation and bond degradation of rubber-sand mixtures. *Can. Geotech. J.* 47, 763-774 (2010).

[3.29] Storn, R. & Price, K. Differential evolution—a simple and efficient heuristic for global optimization over continuous spaces. *J. global optimization* 11, 341-359 (1997).

[3.30] Montgomery, J. & Chen, S. An analysis of the operation of differential evolution at high and low crossover rates. In *IEEE congress on evolutionary computation*, 1-8 (IEEE, 2010).

[3.31] Xiu, D. & Hesthaven, J. S. High-order collocation methods for differential equations with random inputs. *SIAM J. on Sci. Comput.* 27, 1118-1139 (2005).

[3.32] Crestaux, T., Le Maitre, O. & Martinez, J.-M. Polynomial chaos expansion for sensitivity analysis. *Reliab. Eng. & Syst. Saf* 94, 1161-1172 (2009).

Fourth Embodiment

[4.1] DaFonseca, A. V., Ferreira, C. & Fahey, M. A framework interpreting bender element tests, combining time-domain and frequency-domain methods. *Geotech. Test. J.* 32, 91-107 (2008).

[4.2] Arulnathan, R., Boulanger, R. W. & Riemer, M. F. Analysis of bender element tests. *Geotech. Test. J.* 21, 120-131 (1998).

[4.3] Viggiani, G. & Atkinson, J. Interpretation of bender element tests. *Géotechnique* 45, 149-154 (1995).

[4.4] Lee, J.-S. & Santamarina, J. C. Bender elements: performance and signal interpretation. *J. geotechnical geoenvironmental engineering* 131, 1063-1070 (2005).

[4.5] Brocanelli, D. & Rinaldi, V. Measurement of low-strain material damping and wave velocity with bender elements in the frequency domain. *Can. Geotech. J.* 35, 1032-1040 (1998).

[4.6] Greening, P., Nash, D., Benahmed, N., Ferreira, C. & Viana da Fonseca, A. Comparison of shear wave velocity measurements in different materials using time and frequency domain techniques. *Proceedings of deformation characteristics of geomaterials*, Lyon, France 381-386 (2003).

[4.7] O'Donovan, J., O'Sullivan, C. & Marketos, G. Two-dimensional discrete element modelling of bender element tests on an idealised granular material. *Granul. Matter* 14, 733-747 (2012).

[4.8] Arroyo, M., Medina, L. & MuirWood, D. Numerical modelling of scale effects in bender-based pulse tests. *NUMOG VIII*, Pande, G. N. & Pietruszczak, S. (eds) 589-594 (2002).

[4.9] O'Donovan, J., O'sullivan, C., Marketos, G. & Wood, D. M. Analysis of bender element test interpretation using the discrete element method. *Granul. Matter* 17, 197-216 (2015).

[4.10] Biot, M. Theory of elastic waves in a fluid-saturated porous solid. 1. Low frequency range. *J. Acoust. Soc. Am.* 28, 168-178 (1956).

[4.11] Biot, M. A. Theory of propagation of elastic waves in a fluid-saturated porous solid. 11. Higher frequency range. *The J. acoustical S. America* 28, 179-191 (1956).

[4.12] Wiebe, T. & Antes, H. A time domain integral formulation of dynamic poroelasticity. *Acta Mech.* 90, 125-137 (1991).

[4.13] Chen, J. Time domain fundamental solution to biot's complete equations of dynamic poroelasticity part ii: three-dimensional solution. *Int. J. Solids Struct.* 31, 169-202 (1994).

[4.14] Chen, J. Time domain fundamental solution to biot's complete equations of dynamic poroelasticity. Part I: Two-dimensional solution. *Int. J. Solids Struct.* 31, 1447-1490 (1994).

[4.15] Maghoul, P., Gatmiri, B. & Duhamel, D. Boundary integral formulation and two-dimensional fundamental solutions for dynamic behavior analysis of unsaturated soils. *Soil Dyn. Earthq. Eng.* 31, 1480-1495 (2011).

[4.16] Maghoul, P., Gatmiri, B. & Duhamel, D. Wave propagation in unsaturated poroelastic media: Boundary integral formulation and three-dimensional fundamental solution. *Comput. Model. Eng. Sci.* 78, 51-76 (2011).

[4.17] Jianwen, L. & Hongbing, Y. Dynamic stiffness matrix of a poroelastic multi-layered site and its green's functions. *Earthq. Eng. Eng. Vib.* 3, 273 (2004).

[4.18] Rajapakse, R. & Senjuntichai, T. Dynamic response of a multi-layered poroelastic medium. *Earthq. engineering & structural dynamics* 24, 703-722 (1995).

[4.19] Panneton, R. & Atalla, N. An efficient finite element scheme for solving the three-dimensional poroelasticity problem in acoustics. *The J. Acoust. Soc. Am.* 101, 3287-3298 (1997).

[4.30] Wenzlau, F. & Müller, T. M. Finite-difference modeling of wave propagation and diffusion in poroelastic media. *Geophysics* 74, T55-T66 (2009).

[4.21] Zhang, Y., Xu, Y. & Xia, J. Analysis of dispersion and attenuation of surface waves in poroelastic media in the exploration-seismic frequency band. *Geophys. J. Int.* 187, 871-888 (2011).

[4.22] Johnson, D. L., Koplik, J. & Dashen, R. Theory of dynamic permeability and tortuosity in fluid-saturated porous media. *J. fluid mechanics* 176, 379-402(1987).

[4.23] Abate, J. & Valkó, P. P. Multi-precision laplace transform inversion. *Int. J. for Numer. Methods Eng.* 60, 979-993 (2004).

[4.24] Obrzud, R. & Truty, A. The hardening soil model—a practical guidebook z soil. *PC100701 Rep.* (2012).

[4.25] Kézdi, Á. & Rétháti, L. *Handbook of soil mechanics*, vol. 1 (Elsevier Amsterdam, 1974).

[4.26] Prat, M. et al. *La modélisation des ouvrages* (1995).

[4.27] Kulhawy, F. H. & Mayne, P. W. Manual on estimating soil properties for foundation design. Tech. Rep., Electric Power Research Inst., Palo Alto, Calif. (USA); Cornell Univ., Ithaca . . . (1990).

[4.28] Lee, C., Truong, Q. H. & Lee, J.-S. Cementation and bond degradation of rubber-sand mixtures. *Can. Geotech. J.* 47, 763-774 (2010).

[4.29] Storn, R. & Price, K. Differential evolution—a simple and efficient heuristic for global optimization over continuous spaces. *J. global optimization* 11, 341-359 (1997).

[4.30] Montgomery, J. & Chen, S. An analysis of the operation of differential evolution at high and low crossover rates. In *IEEE congress on evolutionary computation*, 1-8 (IEEE, 2010).

[4.31] Xiu, D. & Hesthaven, J. S. High-order collocation methods for differential equations with random inputs. *SIAM J. on Sci. Comput.* 27, 1118-1139 (2005).

[4.32] Crestaux, T., Le Maitre, O. & Martinez, J.-M. Polynomial chaos expansion for sensitivity analysis. *Reliab. Eng. & Syst. Saf* 94, 1161-1172 (2009).

The invention claimed is:

1. A system for characterization of a permafrost or frozen soil sample of which a plurality of physical parameters is to be measured, said system comprising:

an ultrasonic transmitter operable to emit an input signal through the permafrost or frozen soil sample;

an ultrasonic receiver positioned or positionable oppositely of said ultrasonic transmitter to reside across the permafrost or frozen soil sample therefrom, and operable to generate a sample response signal in response to receipt of said input signal from the ultrasonic transmitter during a test of said permafrost or frozen soil sample;

one or more non-transitory computer readable media having stored thereon:

a data store for storing actual test result data that at least comprises response signal data representative of the sample response signal from the ultrasonic receiver during said test;

a predictive poromechanical model useful for calculating predictions of at least some of the actual test result data based on different combinations of potential parameter values for said physical parameters of said permafrost or frozen soil;

statements and instructions executable by one or more computer processors to perform the following steps:

(a) access said test result data;

(b) run the predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive poromechanical model better approximate the actual test result data than other candidate parameter value combinations;

(c) perform iterative repetitions of step (b), each time using the preferred-candidate parameter value combinations from a prior iteration of step (b) as the input to the predictive poromechanical model, until at least one optimal candidate parameter value combination whose resultant predictive dataset optimally matches the actual test result data is found; and (d) select said at least one optimal candidate parameter value combination as a resultant measurement dataset for quantifying the physical parameters of the permafrost or frozen soil sample.

2. The system of claim 1 wherein a parameter space of the predictive poromechanical model is subdivided into different subspaces, and iteratively applying said machine-learning based optimization in steps (b) and (c) comprises performing iterative inversion within each subspace and thereby deriving a plurality of candidates from among a plurality of the different subspaces, and then selecting said at least one optimal candidate parameter value combination from among said plurality of candidates based on comparative loss function results thereof.

3. The system of claim 1 wherein the at least one optimal candidate parameter value combination comprises two optimal candidate parameter value combinations derived from two candidate clusters.

4. The system of claim 1 wherein step (c) comprises performing said iterative repetitions using a neighbourhood algorithm.

5. The system of claim 1 wherein the response signal data includes, or is processed to derive therefrom, at least: (i) a first arrival time of the input signal at the ultrasonic receiver; and (ii) a length, in time, of at least part of the response signal.

6. The system of claim 1 wherein parameters of the predictive poromechanical model include at least: (i) porosity; (ii) ice content; (iii) unfrozen water content; (iv) bulk modulus; (v) shear modulus; (vi) compressional velocity; and (vii) shear wave velocity.

7. The system of claim 1 wherein:
the data store also stores therein:
as part of the actual test result data, a test-derived voltage/voltage transform function ($H_4$) calculated as a ratio, in a frequency domain, between an output voltage from the ultrasonic receiver and an input voltage to the ultrasonic transmitter during said test;
a calibration-derived product of a force/voltage transform function ($H_1$) and a voltage/displacement transform function ($H_3$), both of which are in the frequency domain, and of which the force/voltage transform function ($H_1$) is a ratio between an induced force at the ultrasonic transmitter and the input voltage to the ultrasonic transmitter during a calibration procedure, and the voltage/displacement transform function ($H_3$) is a ratio between the output voltage from the ultrasonic receiver and a displacement at the ultrasonic receiver during said calibration procedure; and
a calculated displacement/force transform function ($H_2$) that is calculated from said test-derived voltage/voltage transform function ($H_4$) and said calibration-derived product of the force/voltage transform function and said voltage/displacement transform function ($H_1$ & $H_3$), and is representative of a ratio, in the frequency domain, between an output voltage from the ultrasonic receiver and an input voltage to the ultrasonic transmitter; and
in step (b), running the predictive poromechanical model comprises deriving, for each resultant predictive dataset, both a predictive response signal, and a predictive displacement/force transform function.

8. A method for characterizing a permafrost or frozen soil sample having a plurality of physical parameters, said method comprising:
(a) during a test of said permafrost or frozen soil sample
(i) from an ultrasonic transmitter, transmitting an input signal through the permafrost or frozen soil sample;
(ii) at an ultrasonic receiver positioned oppositely of said ultrasonic transmitter across the permafrost or frozen soil sample, receiving said input signal, and generating a sample response signal in response thereto;
(b) digitally storing actual test result data that at least comprises response signal data representative of the sample response signal from the ultrasonic receiver during said test;

(c) through execution by one or more processors of statements and instructions stored in one or more non-transitory computer readable media, perform the following steps:
(i) access said actual test result data;
(ii) run a predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive poromechanical model better approximate the actual test result data than other candidate parameter value combinations;
(iii) perform iterative repetitions of step (c)(ii), each time using the preferred-candidate parameter value combinations from a prior iteration of step (c)(ii) as the input to the predictive poromechanical model, until at least one optimal parameter value combination whose resultant predictive dataset optimally matches the actual test result data is found;
(iv) select said at least one optimal parameter value combination as a resultant measurement dataset for quantifying the physical parameters of the permafrost or frozen soil sample.

9. The method of claim 8 wherein a parameter space of the predictive poromechanical model is subdivided into different subspaces, and iteratively applying said machine-learning based optimization in steps (c)(ii) and (c)(iii) comprises performing iterative inversion within each subspace and thereby deriving a plurality of candidates from among a plurality of the different subspaces, and then selecting said at least one optimal candidate parameter value combination from among said plurality of candidates based on comparative loss function results thereof.

10. The method of claim 8 wherein the at least one optimal candidate parameter value combination comprises two optimal candidate parameter value combinations derived from two candidate clusters.

11. The method of claim 8 wherein step (c)(iii) comprises performing said iterative repetitions using a neighbourhood algorithm.

12. The method of claim 8 wherein the response signal data includes, or is processed to derive therefrom, at least (i) a first arrival time of the input signal at the ultrasonic receiver; and (ii) a length, in time, of at least part of the sample response signal.

13. The method of claim 8 wherein parameters of the predictive poromechanical model include at least: (i) porosity; (ii) ice content; (iii) unfrozen water content; (iv) bulk modulus; (v) shear modulus; (vi) compressional velocity; and (vii) shear wave velocity.

14. The method of claim 8 wherein:
step (b) comprises also digitally storing:
as part of the actual test result data, a test-derived voltage/voltage transform function ($H_4$) calculated as a ratio, in a frequency domain, between an output voltage from the ultrasonic receiver and an input voltage to the ultrasonic transmitter during said test;
a calibration-derived product of a force/voltage transform function ($H_1$) and a voltage/displacement transform function ($H_3$), both of which are in the frequency domain, and of which the force/voltage transform function ($H_1$) is a ratio between an induced force at the ultrasonic transmitter and the input voltage to the ultrasonic transmitter during a calibration procedure, and the voltage/displacement transform function ($H_3$) is a ratio between the output voltage from the ultrasonic receiver and a displacement at the ultrasonic receiver during said calibration procedure; and a calculated displacement/force transform function ($H_2$) that is calculated from said test-derived voltage/voltage transform function ($H_4$) and said calibration-derived product of the force/voltage transform function and said voltage/displacement transform function ($H_1$ & $H_3$), and is representative of a ratio, in the frequency domain, between an output voltage from the ultrasonic receiver and an input voltage to the ultrasonic transmitter; and running the predictive poromechanical model in step (c)(ii) comprises deriving, for each resultant predictive dataset, both a predictive response signal, and a predictive displacement/force transform function.

15. The system of claim 1 wherein the predictive poromechanical model comprises a forward solver having a stiffness matrix formulated with a dot product of $S_2 \cdot S_1^{-1}$, of which:

$S_1$ is a displacement component matrix containing:

$S_1(1,1) = -kp_{11}$  $\quad S_1(1,2) = -kp_{12}$ $S_1(1,3) = -kp_{13}$  $\quad S_1(1,4) = k_{s1}q_{11}$ $S_1(1,5) = k_{s2}q_{12}$  $\quad S_1(1,6) = kp_{11}(-e^{-hk_{p1}})$ $S_1(1,7) = kp_{12}(-e^{-hk_{p2}})$  $\quad S_1(1,8) = kp_{13}(-e^{-hk_{p3}})$ $S_1(1,9) = k_{s1}q_{11}(-e^{-hk_{s1}})$  $\quad S_1(1,10) = k_{s2}q_{12}(-e^{-hk_{s2}})$ $S_1(2,1) = -k_{p1}p_{11}$  $\quad S_1(2,2) = -k_{p2}p_{12}$ $S_1(2,3) = -k_{p3}p_{13}$  $\quad S_1(2,4) = kq_{11}$ $S_1(2,5) = kq_{12}$  $\quad S_1(2,6) = e^{-hk_{p1}}k_{p1}p_{11}$ $S_1(2,7) = e^{-hk_{p2}}k_{p2}p_{12}$  $\quad S_1(2,8) = e^{-hk_{p3}}k_{p3}p_{13}$ $S_1(2,9) = e^{-hk_{s1}}kq_{11}$  $\quad S_1(2,10) = e^{-hk_{s2}}kq_{12}$ $S_1(3,1) = -k_{p1}p_{21}$  $\quad S(3,2) = -k_{p2}p_{22}$ $S_1(3,3) = -k_{p3}p_{23}$  $\quad S_1(3,4) = k(G_1q_{11} + G_2q_{21})$ $S_1(3,5) = k(G_1q_{12} + G_2q_{22})$  $\quad S_1(3,6) = e^{-hk_{p1}}k_{p1}p_{21}$ $S_1(3,7) = e^{-hk_{p2}}k_{p2}p_{22}$  $\quad S_1(3,8) = e^{-hk_{p3}}k_{p3}p_{23}$ $S_1(3,9) = e^{-hk_{s1}}k(G_1q_{11} + G_2q_{21})$  $\quad S_1(3,10) = e^{-hk_{s2}}k(G_1q_{12} + G_2q_{22})$ $S_1(4,1) = -k_{p1}p_{21}$  $\quad S(4,2) = -k_{p2}p_{22}$ $S_1(4,3) = -k_{p3}p_{23}$  $\quad S_1(4,4) = k(G_1q_{11} + G_2q_{21})$ $S_1(4,5) = k(G_1q_{12} + G_2q_{22})$  $\quad S_1(4,6) = e^{-hk_{p1}}k_{p1}p_{21}$ $S_1(4,7) = e^{-hk_{p2}}k_{p2}p_{22}$  $\quad S_1(4,8) = e^{-hk_{p3}}k_{p3}p_{23}$ $S_1(4,9) = e^{-hk_{s1}}k(G_1q_{11} + G_2q_{21})$  $\quad S_1(4,10) = e^{-hk_{s2}}k(G_1q_{12} + G_2q_{22})$ $S_1(5,1) = -k_{p1}p_{21}$  $\quad S(5,2) = -k_{p2}p_{22}$ $S_1(5,3) = -k_{p3}p_{23}$  $\quad S_1(5,4) = k(G_1q_{11} + G_2q_{21})$ $S_1(5,5) = k(G_1q_{12} + G_2q_{22})$  $\quad S_1(5,6) = e^{-hk_{p1}}k_{p1}p_{21}$ $S_1(5,7) = e^{-hk_{p2}}k_{p2}p_{22}$  $\quad S_1(5,8) = e^{-hk_{p3}}k_{p3}p_{23}$ $S_1(5,9) = e^{-hk_{s1}}k(G_1q_{11} + G_2q_{21})$  $\quad S_1(5,10) = e^{-hk_{s2}}k(G_1q_{12} + G_2q_{22})$ $S_1(6,1) = -k_{p1}p_{21}$  $\quad S(6,2) = -k_{p2}p_{22}$ $S_1(6,3) = -k_{p3}p_{23}$  $\quad S_1(6,4) = k(G_1q_{11} + G_2q_{21})$ $S_1(6,5) = k(G_1q_{12} + G_2q_{22})$  $\quad S_1(6,6) = e^{-hk_{p1}}k_{p1}p_{21}$ $S_1(6,7) = e^{-hk_{p2}}k_{p2}p_{22}$  $\quad S_1(6,8) = e^{-hk_{p3}}k_{p3}p_{23}$ $S_1(6,9) = e^{-hk_{s1}}k(G_1q_{11} + G_2q_{21})$  $\quad S_1(6,10) = e^{-hk_{s2}}k(G_1q_{12} + G_2q_{22})$ $S_1(7,1) = -k_{p1}p_{21}$  $\quad S(7,2) = -k_{p2}p_{22}$ $S_1(7,3) = -k_{p3}p_{23}$  $\quad S_1(7,4) = k(G_1q_{11} + G_2q_{21})$ $S_1(7,5) = k(G_1q_{12} + G_2q_{22})$  $\quad S_1(7,6) = e^{-hk_{p1}}k_{p1}p_{21}$ $S_1(7,7) = e^{-hk_{p2}}k_{p2}p_{22}$  $\quad S_1(7,8) = e^{-hk_{p3}}k_{p3}p_{23}$ $S_1(7,9) = e^{-hk_{s1}}k(G_1q_{11} + G_2q_{21})$  $\quad S_1(7,10) = e^{-hk_{s2}}k(G_1q_{12} + G_2q_{22})$ $S_1(8,1) = -k_{p1}p_{21}$  $\quad S(8,2) = -k_{p2}p_{22}$ $S_1(8,3) = -k_{p3}p_{23}$  $\quad S_1(8,4) = k(G_1q_{11} + G_2q_{21})$ $S_1(8,5) = k(G_1q_{12} + G_2q_{22})$  $\quad S_1(8,6) = e^{-hk_{p1}}k_{p1}p_{21}$ $S_1(8,7) = e^{-hk_{p2}}k_{p2}p_{22}$  $\quad S_1(8,8) = e^{-hk_{p3}}k_{p3}p_{23}$ $S_1(8,9) = e^{-hk_{s1}}k(G_1q_{11} + G_2q_{21})$  $\quad S_1(8,10) = e^{-hk_{s2}}k(G_1q_{12} + G_2q_{22})$ $S_1(9,1) = -k_{p1}p_{21}$  $\quad S(9,2) = -k_{p2}p_{22}$ $S_1(9,3) = -k_{p3}p_{23}$  $\quad S_1(9,4) = k(G_1q_{11} + G_2q_{21})$ $S_1(9,5) = k(G_1q_{12} + G_2q_{22})$  $\quad S_1(9,6) = e^{-hk_{p1}}k_{p1}p_{21}$ $S_1(9,7) = e^{-hk_{p2}}k_{p2}p_{22}$  $\quad S_1(9,8) = e^{-hk_{p3}}k_{p3}p_{23}$ $S_1(9,9) = e^{-hk_{s1}}k(G_1q_{11} + G_2q_{21})$  $\quad S_1(9,10) = e^{-hk_{s2}}k(G_1q_{12} + G_2q_{22})$ $S_1(10,1) = -k_{p1}p_{21}$  $\quad S(10,2) = -k_{p2}p_{22}$ $S_1(10,3) = -k_{p3}p_{23}$  $\quad S_1(10,4) = k(G_1q_{11} + G_2q_{21})$ $S_1(10,5) = k(G_1q_{12} + G_2q_{22})$  $\quad S_1(10,6) = e^{-hk_{p1}}k_{p1}p_{21}$ $S_1(10,7) = e^{-hk_{p2}}k_{p2}p_{22}$  $\quad S_1(10,8) = e^{-hk_{p3}}k_{p3}p_{23}$ $S_1(10,9) = e^{-hk_{s1}}k(G_1q_{11} + G_2q_{21})$  $\quad S_1(10,10) = e^{-hk_{s2}}k(G_1q_{12} + G_2q_{22})$ and $S_2$ is a stress component matrix containing:

$S_2(1, 1) = kk_{p1}(2p_{11}\mu_1 + p_{31}\mu_{13})$ $S_2(1, 2) = kk_{p2}(2p_{12}\mu_1 + p_{32}\mu_{13})$ $S_2(1, 3) = kk_{p3}(2p_{13}\mu_1 + p_{33}\mu_{13})$ $S_2(1, 4) = -\frac{1}{2}(k^2 + k_{s1}^2)(2q_{11}\mu_1 + q_{21}\mu_{13})$ $S_2(1, 5) = -\frac{1}{2}(k^2 + k_{s2}^2)(2q_{12}\mu_1 + q_{22}\mu_{13})$ $S_2(1, 6) = -e^{-hk_{p1}}kk_{p1}(2p_{11}\mu_1 + p_{31}\mu_{13})$ $S_2(1, 7) = e^{-hk_{p2}}kk_{p2}(2p_{12}\mu_1 + p_{32}\mu_{13})$ $S_2(1, 8) = -e^{-hk_{p3}}kk_{p3}(2p_{13}\mu_1 + p_{33}\mu_{13})$ $S_2(1, 9) = -\frac{1}{2}e^{-hk_{s1}}(k^2 + k_{s1}^2)(2q_{11}\mu_1 + q_{21}\mu_{13})$ $S_2(1, 10) = -\frac{1}{2}e^{-hk_{s2}}(k^2 + k_{s2}^2)(2q_{12}\mu_1 + q_{22}\mu_{13})$ $S_2(2, 1) = -(p_{11}S_{c1} + p_{31}S_{c2})k^2 + C_{12}(k_{p1}^2 - k^2)p_{21} + k_{p1}^2(p_{11}(S_{c1} + 2\mu_1) + p_{31}(S_{c2} + \mu_{13}))$ $S_2(2, 2) = -(p_{12}S_{c1} + p_{32}S_{c2})k^2 + C_{12}(k_{p2}^2 - k^2)p_{22} + k_{p2}^2(p_{12}(S_{c1} + 2\mu_1) + p_{32}(S_{c2} + \mu_{13}))$ $S_2(2, 3) = -(p_{13}S_{c1} + p_{33}S_{c2})k^2 + C_{12}(k_{p3}^2 - k^2)p_{23} + k_{p3}^2(p_{13}(S_{c1} + 2\mu_1) + p_{33}(S_{c2} + \mu_{13}))$ $S_2(2, 4) = kk_{s1}(2q_{11}\mu_1 + q_{21}\mu_{13})$ $S_2(2, 5) = kk_{s2}(2q_{12}\mu_1 + q_{22}\mu_{13})$ $S_2(2, 6) = e^{-hk_{p1}}\big(-(p_{11}S_{c1} + p_{31}S_{c2})k^2 + C_{12}(k_{p1}^2 - k^2)p_{21} + k_{p1}^2(p_{11}(S_{c1} + 2\mu_1) + p_{31}(S_{c2} + \mu_{13}))\big)$ $S_2(2, 7) = e^{-hk_{p2}}\big(-(p_{12}S_{c1} + p_{32}S_{c2})k^2 + C_{12}(k_{p2}^2 - k^2)p_{22} + k_{p2}^2(p_{12}(S_{c1} + 2\mu_1) + p_{32}(S_{c2} + \mu_{13}))\big)$ $S_2(2, 8) = e^{-hk_{p3}}\big(-(p_{13}S_{c1} + p_{33}S_{c1})k^2 + C_{12}(k_{p3}^2 - k^2)p_{23} + k_{p3}^2(p_{13}(S_{c1} + 2\mu_1) + p_{33}(S_{c2} + \mu_{13}))\big)$ $S_2(2, 9) = e^{-hk_{s1}}kk_{s1}(2q_{11}\mu_1 + q_{21}\mu_{13})$ $S_2(2, 10) = e^{-hk_{s2}}kk_{s2}(2q_{12}\mu_1 + q_{22}\mu_{13})$ $S_2(3, 1) = (k_{p1} - k)(k + k_{p1})(C_{12}p_{11} + k_2p_{21} + C_{23}p_{31})$ $S_2(3, 2) = -(k - k_{p2})(k + k_{p2})(C_{12}p_{12} + k_2p_{22} + C_{23}p_{32})$ $S_2(3, 3) = -(k - k_{p3})(k + k_{p3})(C_{12}p_{13} + k_2p_{23} + C_{23}P_{33})$ $S_2(3, 4) = 0$ $S_2(3, 5) = 0$ $S_2(3, 6) = e^{-hk_{p1}}(k_{p1} - k)(k + k_{p1})(C_{12}p_{11} + k_2p_{21} + C_{23}p_{31})$ $S_2(3, 7) = e^{-hk_{p2}}(k_{p2} - k)(k + k_{p2})(C_{12}p_{12} + k_2p_{22} + C_{23}p_{32})$ $S_2(3, 8) = e^{-hk_{p3}}(k_{p3} - k)(k + k_{p3})(C_{12}p_{13} + k_2p_{23} + C_{23}P_{33})$ $S_2(3, 9) = 0$ $S_2(3, 10) = 0$ $S_2(4, 1) = kk_{p1}(p_{11}\mu_{13} + 2p_{31}\mu_3)$ $S_2(4, 2) = kk_{p2}(p_{12}\mu_{13} + 2p_{32}\mu_3)$ $S_2(4, 3) = kk_{p3}(p_{13}\mu_{13} + 2P_{33}\mu_3)$ $S_2(4, 4) = -\frac{1}{2}(k^2 + k_{s1}^2)(q_{11}\mu_{13} + 2q_{21}\mu_3)$ $S_2(4, 5) = -\frac{1}{2}(k^2 + k_{s2}^2)(q_{12}\mu_{13} + 2q_{22}\mu_3)$ $S_2(4, 6) = -e^{-hk_{p1}}kk_{p1}(p_{11}\mu_{13} + 2p_{31}\mu_3)$ $S_2(4, 7) = -e^{-hk_{p2}}kk_{p2}(p_{12}\mu_{13} + 2p_{32}\mu_3)$ $S_2(4, 8) = -e^{-hk_{p3}}kk_{p3}(p_{13}\mu_{13} + 2P_{33}\mu_3)$ $S_2(4, 9) = -\frac{1}{2}e^{-hk_{s1}}(k^2 + k_{s1}^2)(q_{11}\mu_{13} + 2q_{21}\mu_3)$ $S_2(4, 10) = -\frac{1}{2}e^{-hk_{s2}}(k^2 + k_{s2}^2)(q_{12}\mu_{13} + 2q_{22}\mu_3)$ $S_2(5, 1) = -(p_{31}S_{c3} + p_{11}S_{c4})k^2 + C_{23}(k_{p1}^2 - k^2)p_{21} + k_{p1}^2(p_{11}(S_{c4} + \mu_{13}) + p_{31}(S_{c3} + 2\mu_3))$ $S_2(5, 2) = -(p_{32}S_{c3} + p_{12}S_{c4})k^2 + C_{23}(k_{p2}^2 - k^2)p_{22} + k_{p2}^2(p_{12}(S_{c4} + \mu_{13}) + p_{32}(S_{c3} + 2\mu_3))$ $S_2(5, 3) = -(P_{33}S_{c3} + p_{13}S_{c4})k^2 + C_{23}(k_{p3}^2 - k^2)p_{23} + k_{p3}^2(p_{13}(S_{c4} + \mu_{13}) + p_{33}(S_{c3} + 2\mu_3))$ $S_2(5, 4) = -kk_{s1}(q_{11}\mu_{13} + 2q_{21}\mu_3)$ $S_2(5, 5) = -kk_{s2}(q_{12}\mu_{13} + 2q_{22}\mu_3)$ $S_2(5, 6) = e^{-hk_{p1}}\big(-(p_{31}S_{c3} + p_{11}S_{c4})k^2 + C_{23}(k_{p1}^2 - k^2)p_{21} + k_{p1}^2(p_{11}(S_{c4} + \mu_{13}) + p_{31}(S_{c3} + 2\mu_3))\big)$ $S_2(5, 7) = e^{-hk_{p2}}\big(-(p_{32}S_{c3} + p_{12}S_{c4})k^2 + C_{23}(k_{p2}^2 - k^2)p_{22} + k_{p2}^2(p_{12}(S_{c4} + \mu_{13}) + p_{32}(S_{c3} + 2\mu_3))\big)$ $S_2(5, 8) = e^{-hk_{p3}}\big(-(P_{33}S_{c3} + p_{13}S_{c4})k^2 + C_{23}(k_{p3}^2 - k^2)p_{23} + k_{p3}^2(p_{13}(S_{c4} + \mu_{13}) + p_{33}(S_{c3} + 2\mu_3))\big)$ $S_2(5, 9) = e^{-hk_{s1}}kk_{s1}(q_{11}\mu_{13} + 2q_{21}\mu_3)$ $S_2(5, 10) = e^{-hk_{s2}}kk_{s2}(q_{12}\mu_{13} + 2q_{22}\mu_3)$ $S_2(6, 1) = kk_{p1}e^{-hk_{p1}}(2\mu_1 p_{11} + \mu_{13}p_{31})$ $S_2(6, 2) = kk_{p2}e^{-hk_{p2}}(2\mu_1 p_{12} + \mu_{13}p_{32})$ $S_2(6, 3) = kk_{p3}e^{-hk_{p3}}(2\mu_1 p_{13} + \mu_{13}p_{33})$ $S_2(6, 4) = -\frac{1}{2}e^{-hk_{s1}}(k^2 + k_{s1}^2)(2\mu_1 q_{11} + \mu_{13}q_{21})$ $S_2(6, 5) = -\frac{1}{2}e^{-hk_{s2}}(k^2 + k_{s2}^2)(2\mu_1 q_{12} + \mu_{13}q_{22})$ $S_2(6, 6) = -kk_{p1}(2\mu_1 p_{11} + \mu_{13}p_{31})$ -continued $S_2(6,7) = -kk_{p2}(2\mu_1 p_{12} + \mu_{13} p_{32})$ $S_2(6,8) = -kk_{p3}(2\mu_1 p_{13} + \mu_{13} p_{33})$ $S_2(6,9) = -\frac{1}{2}(k^2 + k_{s1}^2)(2\mu_1 q_{11} + \mu_{13} q_{21})$ $S_2(6,10) = -\frac{1}{2}(k^2 + k_{s2}^2)(2\mu_1 q_{12} + \mu_{13} q_{22})$ $S_2(7,1) = e^{-hk_{p1}}\bigl(-(p_{11}S_{c1} + p_{31}S_{c2})k^2 + C_{12}(k_{p1}^2 - k^2)p_{21} + k_{p1}^2(p_{11}(S_{c1} + 2\mu_1) + p_{31}(S_{c2} + \mu_{13}))\bigr)$ $S_2(7,2) = e^{-hk_{p2}}\bigl(-(p_{12}S_{c1} + p_{32}S_{c2})k^2 + C_{12}(k_{p2}^2 - k^2)p_{22} + k_{p2}^2(p_{12}(S_{c1} + 2\mu_1) + p_{32}(S_{c2} + \mu_{13}))\bigr)$ $S_2(7,3) = e^{-hk_{p3}}\bigl(-(p_{13}S_{c1} + p_{33}S_{c2})k^2 + C_{12}(k_{p3}^2 - k^2)p_{23} + k_{p3}^2(p_{13}(S_{c1} + 2\mu_1) + p_{33}(S_{c2} + \mu_{13}))\bigr)$ $S_2(7,4) = -e^{-hk_{s1}}kk_{s1}(2q_{11}\mu_1 + q_{21}\mu_{13})$ $S_2(7,5) = -e^{-hk_{s2}}kk_{s2}(2q_{12}\mu_1 + q_{22}\mu_{13})$ $S_2(7,6) = -(p_{11}S_{c1} + p_{31}S_{c2})k^2 + C_{12}(k_{p1}^2 - k^2)p_{21} + k_{p1}^2(p_{11}(S_{c1} + 2\mu_1) + p_{31}(S_{c2} + \mu_{13}))$ $S_2(7,7) = -(p_{12}S_{c1} + p_{32}S_{c2})k^2 + C_{12}(k_{p2}^2 - k^2)p_{22} + k_{p2}^2(p_{12}(S_{c1} + 2\mu_1) + p_{32}(S_{c2} + \mu_{13}))$ $S_2(7,8) = -(p_{13}S_{c1} + p_{33}S_{c2})k^2 + C_{12}(k_{p3}^2 - k^2)p_{23} + k_{p3}^2(p_{13}(S_{c1} + 2\mu_1) + p_{33}(S_{c2} + \mu_{13}))$ $S_2(7,9) = kk_{s1}(2q_{11}\mu_1 + q_{21}\mu_{13})$ $S_2(7,10) = kk_{s2}(2q_{12}\mu_1 + q_{22}\mu_{13})$ $S_2(8,1) = e^{-hk_{p1}}(k_{p1} - k)(k + k_{p1})(C_{12}p_{11} + k_2 p_{21} + C_{23}p_{31})$ $S_2(8,2) = e^{-hk_{p2}}(k_{p2} - k)(k + k_{p2})(C_{12}p_{12} + k_2 p_{22} + C_{23}p_{32})$ $S_2(8,3) = e^{-hk_{p3}}(k_{p3} - k)(k + k_{p3})(C_{12}p_{13} + k_2 p_{23} + C_{23}P_{33})$ $S_2(8,4) = 0$ $S_2(8,5) = 0$ $S_2(8,6) = (k_{p1} - k)(k + k_{p1})(C_{12}p_{11} + k_2 p_{21} + C_{23}p_{31})$ $S_2(8,7) = (k_{p2} - k)(k + k_{p2})(C_{12}p_{12} + k_2 p_{22} + C_{23}p_{32})$ $S_2(8,8) = (k_{p3} - k)(k + k_{p3})(C_{12}p_{13} + k_2 p_{23} + C_{23}P_{33})$ $S_2(8,9) = 0$ $S_2(8,10) = 0$ $S_2(9,1) = kk_{p1}e^{-hk_{p1}}(\mu_{13}p_{11} + 2\mu_3 p_{31})$ $S_2(9,2) = kk_{p2}e^{-hk_{p2}}(\mu_{13}p_{12} + 2\mu_3 p_{32})$ $S_2(9,3) = kk_{p3}e^{-hk_{p3}}(\mu_{13}p_{13} + 2\mu_3 p_{33})$ $S_2(9,4) = -\frac{1}{2}e^{-hk_{s1}}(k^2 + k_{s1}^2)(\mu_{13}q_{11} + 2\mu_3 q_{21})$ $S_2(9,5) = -\frac{1}{2}e^{-hk_{s2}}(k^2 + k_{s2}^2)(\mu_{13}q_{12} + 2\mu_3 q_{22})$ $S_2(9,6) = -kk_{p1}(\mu_{13}p_{11} + 2\mu_3 p_{31})$ $S_2(9,7) = -kk_{p2}(\mu_{13}p_{12} + 2\mu_3 p_{32})$ $S_2(9,8) = -kk_{p3}(\mu_{13}p_{13} + 2\mu_3 p_{33})$ $S_2(9,9) = -\frac{1}{2}(k^2 + k_{s1}^2)(\mu_{13}q_{11} + 2\mu_3 q_{21})$ $S_2(9,10) = -\frac{1}{2}(k^2 + k_{s2}^2)(\mu_{13}q_{12} + 2\mu_3 q_{22})$ $S_2(10,1) = e^{-hk_{p1}}\bigl(-(p_{31}S_{c3} + p_{11}S_{c4})k^2 + C_{23}(k_{p1}^2 - k^2)p_{21} + k_{p1}^2(p_{11}(S_{c4} + \mu_{13}) + p_{31}(S_{c3} + 2\mu_3))\bigr)$ $S_2(10,2) = e^{-hk_{p2}}\bigl(-(p_{32}S_{c3} + p_{12}S_{c4})k^2 + C_{23}(k_{p2}^2 - k^2)p_{22} + k_{p2}^2(p_{12}(S_{c4} + \mu_{13}) + p_{32}(S_{c3} + 2\mu_3))\bigr)$ $S_2(10,3) = e^{-hk_{p3}}\bigl(-(P_{33}S_{c3} + p_{13}S_{c4})k^2 + C_{23}(k_{p3}^2 - k^2)p_{23} + k_{p3}^2(p_{13}(S_{c4} + \mu_{13}) + p_{33}(S_{c3} + 2\mu_3))\bigr)$ $S_2(10,4) = -e^{-hk_{s1}}kk_{s1}(q_{11}\mu_{13} + 2q_{21}\mu_3)$ $S_2(10,5) = -e^{-hk_{s2}}kk_{s2}(q_{12}\mu_{13} + 2q_{22}\mu_3)$ $S_2(10,6) = -(p_{31}S_{c3} + p_{11}S_{c4})k^2 + C_{23}(k_{p1}^2 - k^2)p_{21} + k_{p1}^2(p_{11}(S_{c4} + \mu_{13}) + p_{31}(S_{c3} + 2\mu_3))$ $S_2(10,7) = -(p_{32}S_{c3} + p_{12}S_{c4})k^2 + C_{23}(k_{p2}^2 - k^2)p_{22} + k_{p2}^2(p_{12}(S_{c4} + \mu_{13}) + p_{32}(S_{c3} + 2\mu_3))$ $S_2(10,8) = -(P_{33}S_{c3} + p_{13}S_{c4})k^2 + C_{23}(k_{p3}^2 - k^2)p_{23} + k_{p3}^2(p_{13}(S_{c4} + \mu_{13}) + p_{33}(S_{c3} + 2\mu_3))$ $S_2(10,9) = kk_{s1}(q_{11}\mu_{13} + 2q_{21}\mu_3)$ $S_2(10,10) = kk_{s2}(q_{12}\mu_{13} + 2q_{22}\mu_3)$.

16. A system for characterization of a saturated soil sample of which a plurality of physical parameters is to be measured, said system comprising:
   an ultrasonic transmitter operable to emit an input signal through the saturated soil sample;
   an ultrasonic receiver positioned or positionable oppositely of said ultrasonic transmitter to reside across the saturated soil sample therefrom, and operable to generate a sample response signal in response to receipt of said input signal from the ultrasonic transmitter during a test of said saturated soil sample;
   one or more non-transitory computer readable media having stored thereon:
      a data store for storing actual test result data that at least comprises response signal data representative of the sample response signal from the ultrasonic receiver during said test;
      a predictive poromechanical model useful for calculating predictions of at least some of the actual test result data based on different combinations of potential parameter values for said physical parameters of said saturated soil sample;

statements and instructions executable by one or more computer processors to perform the following steps:
(a) access said actual test result data;
(b) run the predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive poromechanical model better approximate the actual test result data than other candidate parameter value combinations;
(c) perform iterative repetitions of step (b), each time using the preferred-candidate parameter value combinations from a prior iteration of step (b) as the input to the predictive poromechanical model, until at least one optimal candidate parameter value combination whose resultant predictive dataset optimally matches the actual test result data is found; and
(d) select said at least one optimal candidate parameter value combination as a resultant measurement dataset for quantifying the physical parameters of the saturated soil sample.

17. A method for characterizing a saturated soil sample having a plurality of physical parameters, said method comprising:
(a) during a test of said saturated soil sample
(i) from an ultrasonic transmitter, transmitting an input signal through the saturated soil sample;
(ii) at an ultrasonic receiver positioned oppositely of said ultrasonic transmitter across the saturated soil sample, receiving said input signal, and generating a sample response signal in response thereto;

(b) digitally storing actual test result data that at least comprises response signal data representative of the sample response signal from the ultrasonic receiver during said test;
(c) through execution by one or more processors of statements and instructions stored in one or more non-transitory computer readable media, perform the following steps:
(i) access said actual test result data;
(ii) run a predictive poromechanical model with a plurality of different candidate parameter value combinations as input to thereby derive a plurality of resultant predictive datasets each representing a predicted test result, and apply machine learning-based optimization to identify preferred-candidate parameter value combinations for which the resultant predictive datasets from the predictive poromechanical model better approximate the actual test result data than other candidate parameter value combinations;
(iii) perform iterative repetitions of step (c)(ii), each time using the preferred-candidate parameter value combinations from a prior iteration of step (c)(ii) as the input to the predictive poromechanical model, until at least one optimal candidate parameter value combination whose resultant predictive dataset optimally matches the actual test result data is found;
(iv) select said at least one optimal candidate parameter value combination as resultant measurement dataset for quantifying the physical parameters of the saturated soil sample.

18. The system of claim 16 wherein the predictive poromechanical model comprises a forward solver having a stiffness matrix formulated with a dot product of $S'_2 \cdot S'^{-1}_1$, of which:

$S'_1$ is a displacement component matrix:

$$\begin{bmatrix} -kp_{11} & -kp_{12} & k_s & -e^{-hk_{p1}}kp_{11} & -e^{-hk_{p2}}kp_{12} & -e^{-hk_s}k_s \\ -k_{p1}p_{11} & -k_{p2}p_{12} & k & e^{-hk_{p1}}k_{p1}p_{11} & e^{-hk_{p2}}k_{p2}p_{12} & e^{-hk_s}k \\ -k_{p1}p_{21} & -k_{p2}p_{22} & -\frac{\rho_f}{\rho_m}k & e^{-hk_{p1}}k_{p1}p_{21} & e^{-hk_{p2}}k_{p2}p_{22} & -\frac{\rho_f}{\rho_m}e^{-hk_s}k \\ -e^{-hk_{p1}}kp_{11} & -e^{-hk_{p2}}kp_{12} & e^{-hk_s}k_s & -kp_{11} & -kp_{12} & -k_s \\ -e^{-hk_{p1}}k_{p1}p_{11} & -e^{-hk_{p2}}k_{p2}p_{12} & e^{-hk_s}k & k_{p1}p_{11} & k_{p2}p_{12} & k \\ -e^{-hk_{p1}}k_{p1}p_{21} & -e^{-hk_{p2}}k_{p2}p_{22} & -\frac{\rho_f}{\rho_m}e^{-hk_s}k & k_{p1}p_{21} & k_{p2}p_{22} & -\frac{\rho_f}{\rho_m}k \end{bmatrix}$$
$S'_1$ and $S_2$ is a stress component and porewater pressure matrix:

$$\begin{bmatrix} m_{11} & m_{12} & m_{13} & m_{14} & m_{15} & m_{16} \\ m_{21} & m_{22} & m_{23} & m_{24} & m_{25} & m_{26} \\ m_{31} & m_{32} & m_{33} & m_{34} & m_{35} & m_{36} \\ m_{41} & m_{42} & m_{43} & m_{44} & m_{45} & m_{46} \\ m_{51} & m_{52} & m_{53} & m_{54} & m_{55} & m_{56} \\ m_{61} & m_{62} & m_{63} & m_{64} & m_{65} & m_{66} \end{bmatrix}$$
$S'_2$ in which:

$$m_{11} = 2kk_{p1}p_{11}\mu$$
$$m_{12} = 2kk_{p2}p_{12}\mu$$
$$m_{13} = -(k^2 + k_s^2)\mu$$
$$m_{14} = -2e^{-hk_{p1}}kk_{p1}p_{11}\mu$$
$$m_{15} = -2e^{-hk_{p2}}kk_{p2}p_{12}\mu$$
$$m_{16} = -e^{-hk_s}(k^2 + k_s^2)\mu$$
$$m_{21} = p_{11}(k_{p1}^2(\lambda + 2\mu) - k^2\lambda)$$
$$m_{22} = p_{12}(k_{p2}^2(\lambda + 2\mu) - k^2\lambda)$$
$$m_{23} = -2kk_s\mu$$
$$m_{24} = e^{-hk_{p1}}p_{11}(k_{p1}^2(\lambda + 2\mu) - k^2\lambda)$$
$$m_{25} = e^{-hk_{p2}}p_{12}(k_{p2}^2(\lambda + 2\mu) - k^2\lambda)$$
$$m_{26} = 2e^{-hk_s}kk_s\mu$$
$$m_{31} = (k - k_{p1})(k + k_{p1})M(p_{21} + p_{11}\alpha)$$
$$m_{32} = (k - k_{p2})(k + k_{p2})M(p_{22} + p_{12}\alpha)$$
$$m_{33} = 0$$
$$m_{34} = e^{-hk_{p1}}(k - k_{p1})(k + k_{p1})M(p_{21} + p_{11}\alpha)$$
$$m_{35} = e^{-hk_{p2}}(k - k_{p2})(k + k_{p2})M(p_{22} + p_{12}\alpha)$$
$$m_{36} = 0$$
$$m_{41} = 2e^{-hk_{p1}}kk_{p1}p_{11}\mu$$
$$m_{42} = 2e^{-hk_{p2}}kk_{p2}p_{12}\mu$$
$$m_{43} = -e^{-hk_s}(k^2 + k_s^2)\mu$$
$$m_{44} = -2kk_{p1}p_{11}\mu$$
$$m_{45} = -2kk_{p2}p_{12}\mu$$
$$m_{46} = -(k^2 + k_s^2)\mu$$
$$m_{51} = e^{-hk_{p1}}p_{11}(k_{p1}^2(\lambda + 2\mu) - k^2\lambda)$$
$$m_{52} = e^{-hk_{p2}}p_{12}(k_{p2}^2(\lambda + 2\mu) - k^2\lambda)$$
$$m_{53} = -2e^{-hk_s}kk_s\mu$$
$$m_{54} = p_{11}(k_{p1}^2(\lambda + 2\mu) - k^2\lambda)$$
$$m_{55} = p_{12}(k_{p2}^2(\lambda + 2\mu) - k^2\lambda)$$
$$m_{56} = 2kk_s\mu$$
$$m_{61} = e^{-hkp1}(k - k_{p1})(k + k_{p1})M(p_{21} + p_{11}\alpha)$$
$$m_{62} = e^{-hkp2}(k - k_{p2})(k + k_{p2})M(p_{22} + p_{12}\alpha)$$
$$m_{63} = 0$$
$$m_{64} = (k - k_{p1})(k + k_{p1})M(p_{21} + p_{11}\alpha)$$
$$m_{65} = (k - k_{p2})(k + k_{p2})M(p_{22} + p_{12}\alpha)$$
$$m_{66} = 0$$

\* \* \* \* \*